(12) United States Patent  
Toyama et al.

(10) Patent No.: US 6,323,959 B1
(45) Date of Patent: Nov. 27, 2001

(54) COLOR IMAGE PROCESSOR

(75) Inventors: Katsuhisa Toyama; Yoshihiko Hirota, both of Toyokawa; Hiroshi Sugiura, Aichi-Ken, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/270,935

(22) Filed: Mar. 16, 1999

(30) Foreign Application Priority Data

Mar. 18, 1998 (JP) .................................................. 10-069002

(51) Int. Cl.[7] .............................. H04N 1/46; G06K 17/00
(52) U.S. Cl. ............................................. 358/312; 358/518
(58) Field of Search .................................. 358/504, 518, 358/520, 527; 382/312, 167, 162

(56) References Cited

U.S. PATENT DOCUMENTS

| | | | |
|---|---|---|---|
| 3,982,825 | * 9/1976 | Mitchell | 350/313 |
| 5,376,993 | * 12/1994 | Kubota | 354/430 |
| 5,838,455 | 11/1998 | Imaizumi et al. | 358/298 |
| 5,850,293 | 12/1998 | Suzuki et al. | 358/298 |
| 5,867,285 | 2/1999 | Hirota et al. | 358/522 |
| 6,101,020 | * 8/2000 | Ori | 359/205 |
| 6,147,816 | * 11/2000 | Ori | 359/794 |

FOREIGN PATENT DOCUMENTS

01077386A * 3/1989 (JP) .............................. H04N/9/077

* cited by examiner

*Primary Examiner*—Jerome Grant, II
(74) *Attorney, Agent, or Firm*—Sidley Austin Brown & Wood

(57) ABSTRACT

An image processor receives color image data and converts them to image data of cyan, magenta, yellow and black necessary for image forming. The received color image data are subjected to color aberration correction, and various image data processing is performed on the image data after the color aberration correction in order to improve the precision of image processing on a color document image. The image data processing includes, for example, a specified color document is decided, automatic color selection and magnification change.

15 Claims, 38 Drawing Sheets

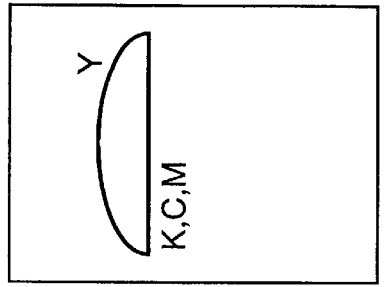
Fig.5A  Shift of subscan drawing position
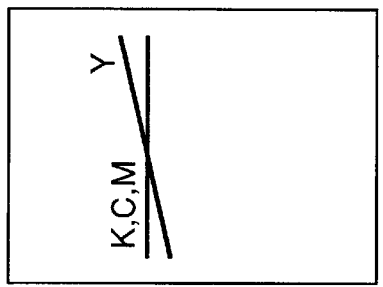
Fig.5B  Skew
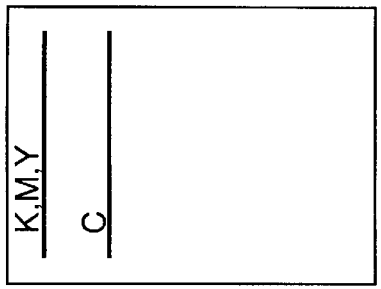
Fig.5C  Bow distortion
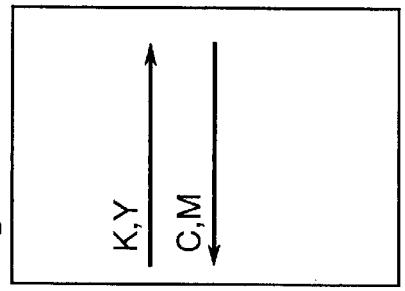
Fig.5D  Distortion of main scan magnification
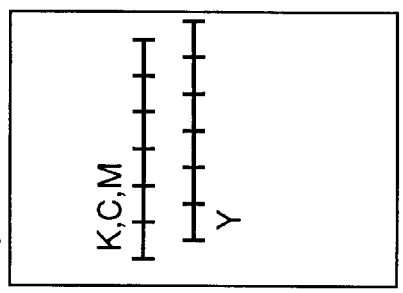
Fig.5E  Shift of main scan drawing position
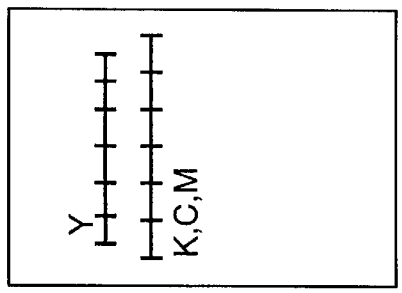
Fig.5F  C,M mirror image

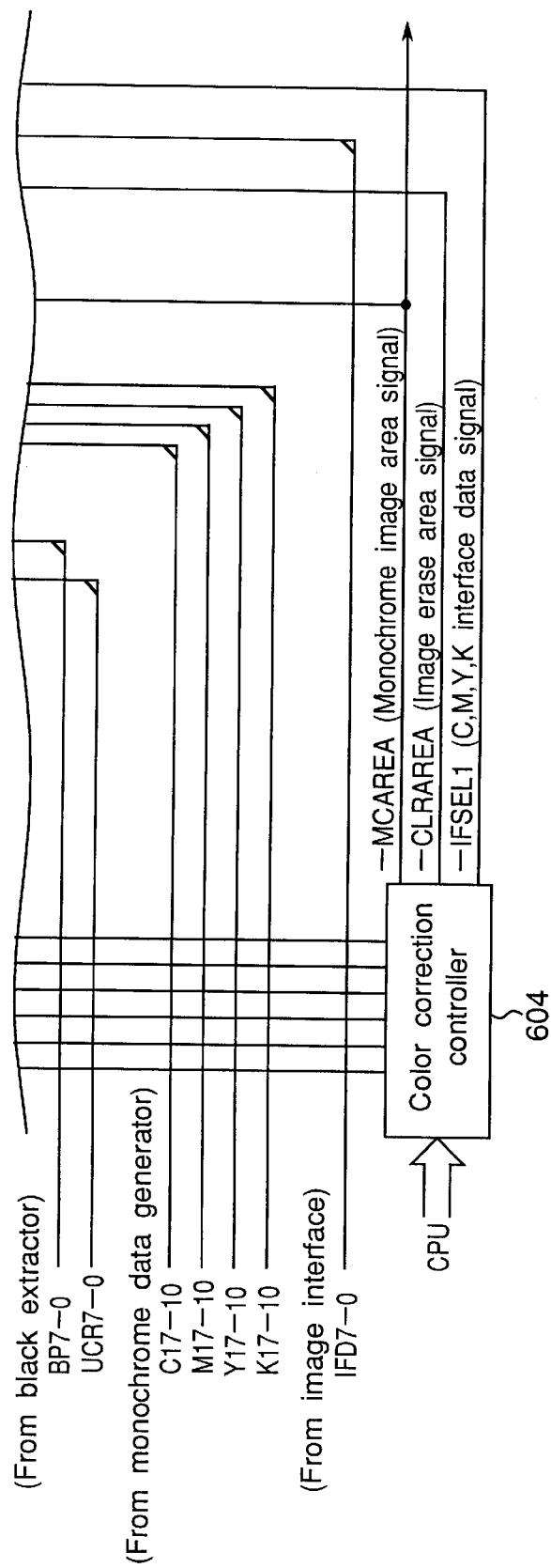

(Before edge enhancement)
(After edge enhancement)

Fig.27
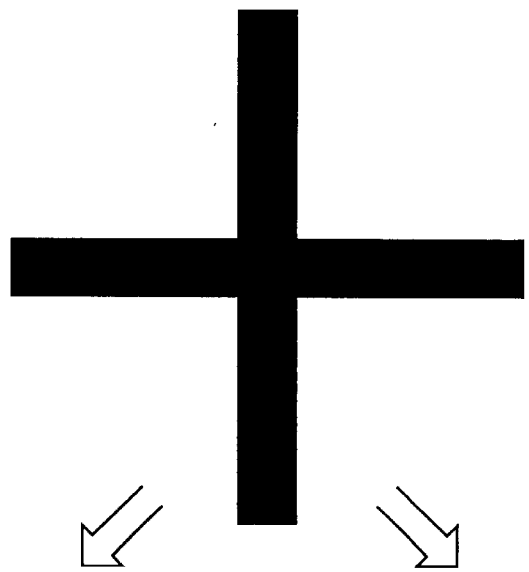
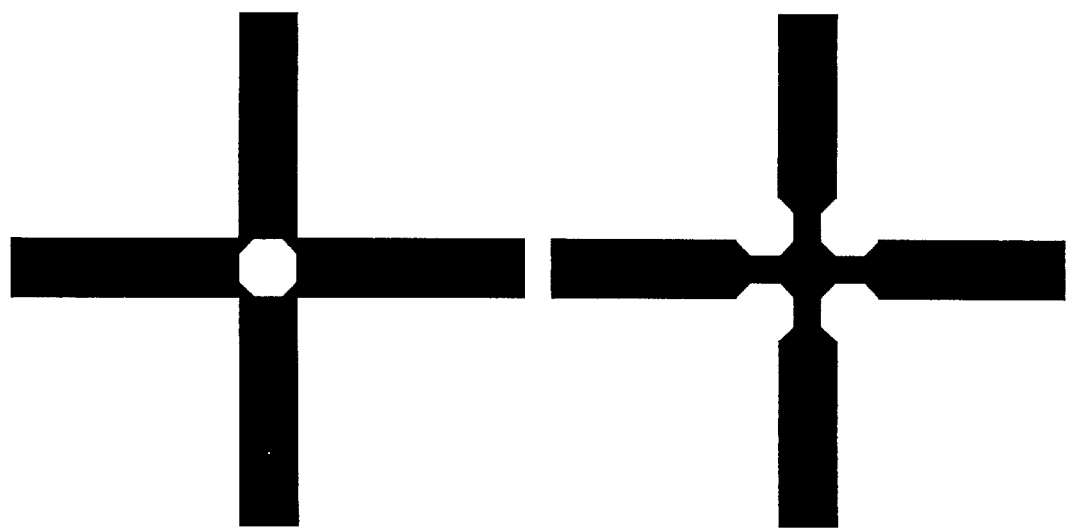
Loss of crossing point
Lines thinned partially at intersection

Fig.31

| -1/4 | 0 | 0 | 0 | -1/4 |
|------|---|---|---|------|
| 0    | 0 | 0 | 0 | 0    |
| 0    | 0 | 0 | 0 | 0    |
| 0    | 0 | 0 | 0 | 0    |
| -1/4 | 0 | 0 | 0 | -1/4 |

Fig.32

| 1/4 | 1/2 | 1/4 |
|-----|-----|-----|

COLOR IMAGE PROCESSOR

This application is based on an application No. 10-69002/1998 filed in Japan, the content of which is incorporated hereinto by reference.

BACKGROUND OF THE INVENTION

1. Field of the Invention

The present invention relates to a color image processor which processes and supplies digital color image data.

2. Description of Prior Art

In an image reader in a digital copying machine or the like, a document image is read as digital image data of red, green and blue. Then, the read digital color image data are subjected to various processing such as magnification change, automatic color decision, or discrimination of a specified color document, and the processed data are supplied, for example, for image forming.

However, prior art image processors have problems. For example, when image discrimination is performed for automatic color decision or discrimination of a specified color document based on the read image data, a pixel is erroneously as a color data even when a monochromatic document is read. Then, discrimination was bad and a ratio of correct discrimination is not sufficient.

SUMMARY OF THE INVENTION

An object of the present invention is to provide an image processor which can process image date with good precision.

In one aspect of the present invention, an image reader comprises a color image sensor which outputs image signals in correspondence to a plurality of colors, and an optical system which focuses an image optically onto the color image sensor. A color aberration corrector corrects image signals received from the color image sensor to cancel a displacement of focal point of the optical images of the colors caused by color aberration of the optical system. Then, various image data processing is performed on the image data after the color aberration correction in order to improve the precision of image processing on a color document image. For example, the image data comprises a magnification changer which changes a magnification power of the image signals corrected by the color aberration corrector. In a different way, the image reader comprises a color decider which decides, based on the image signals corrected by the color aberration corrector, whether the image is a color image or not. In a further way, the image reader comprises an image discriminator which decides, based on image signals corrected by said color aberration corrector, whether the image is a specified image or not.

An advantage of the present invention is that various image data processing can be performed with higher precision of image discrimination by using color aberration correction.

BRIEF DESCRIPTION OF THE DRAWINGS

These and other objects and features of the present invention will become clear from the following description taken in conjunction with the preferred embodiments thereof with reference to the accompanying drawings, and in which:

FIGS. 5A–5F show color shifts caused due to six types of factors;

FIGS. 17A, 17B and 17C are parts of a block diagram of the color corrector;

FIG. 27 is a diagram on image deterioration on a cross portion due to a generation;

FIG. 31 is a diagram of a Laplacian filter;

FIG. 32 is a diagram of a smoothing filter;

DETAILED DESCRIPTION OF THE PREFERRED EMBODIMENTS

Figure 1:
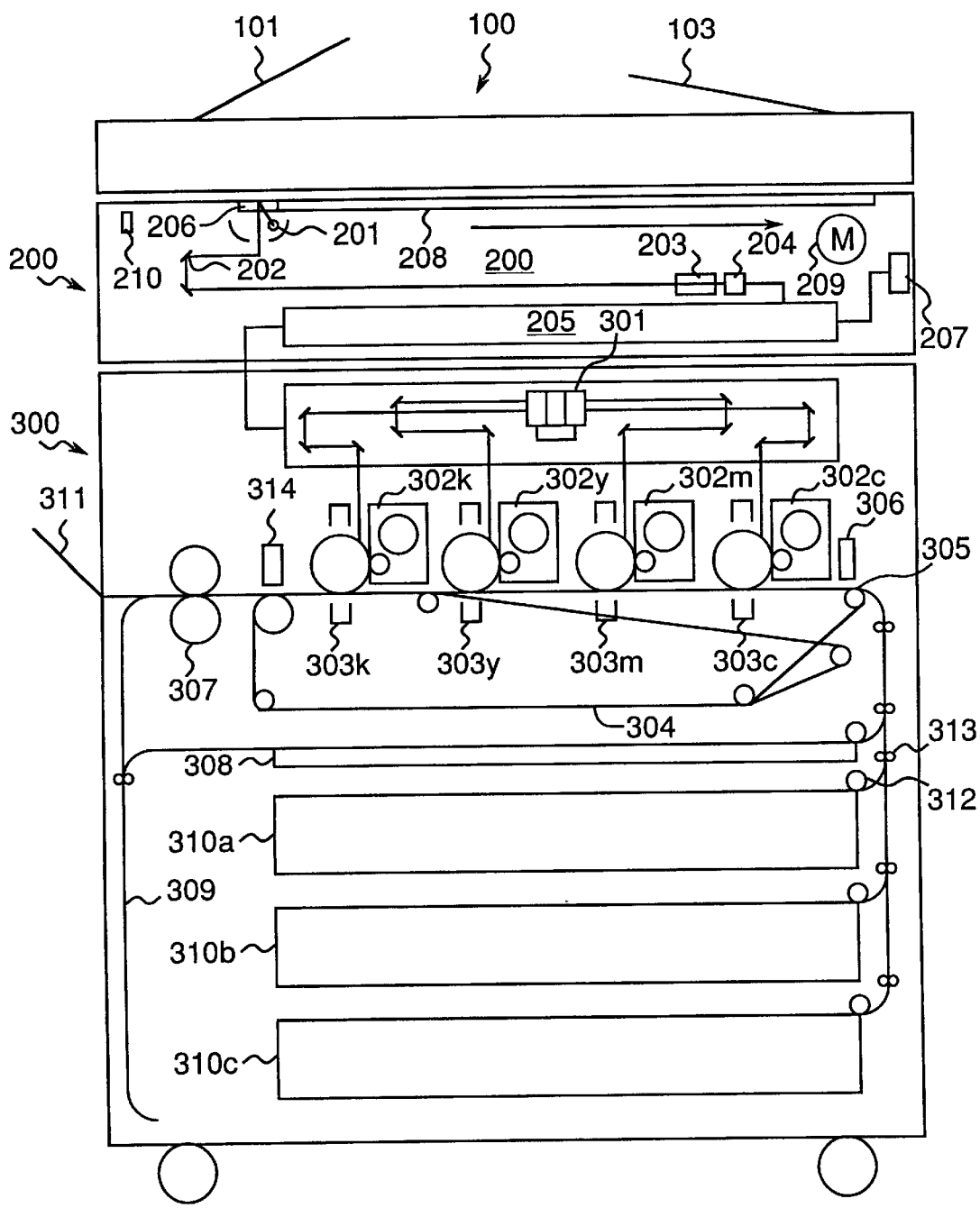
FIG. 1 is a cross sectional view of a color digital copying machine.

Referring now to the drawings, wherein like reference characters designate like or corresponding parts throughout the several views, FIG. 1 shows a whole structure of a color digital copying machine. The copying machine comprises an automatic document feeder 100, an image reader 200 and an image former (printer) 300. Typically, the image reader 200 reads a document which is fed to an image read position by the automatic document feeder 100, and then the read image data is transmitted to the image former 300, whereby an image can be formed (copy function). Also, an interface 207 enables the copying machine to be connected to an external apparatus. Thus, the image data read by the image reader 200 is outputted to the external apparatus (image read function), or conversely the image data received from the external apparatus is sent to the image former 300, whereby the image can be formed (printer function).

Next, the automatic document feeder 100 is described. The automatic document feeder 100 feeds the document set on a tray 101 to the image read position of the image reader 200. After the image read terminates, the document is delivered onto another tray 103.

The document is fed in accordance with a command from an operation panel (not shown). The document is delivered in accordance with a read termination signal from the image reader 200. When a plurality of documents are set, a control signal for these documents is consecutively generated so as to efficiently feed, read and deliver the documents.

The image reader 200 is described. The document on a platen glass plate 208 is illuminated by an exposure lamp 201. A light reflected from the illuminated document is guided by a group 202 of three mirrors to a lens 203 to bring the image into focus on a CCD sensor 204. The CCD sensor consists of three line sensors for red, green and blue arranged in parallel to each other, and the main scan direction is along the line sensors. The exposure lamp 201 and the first mirror scan the document at velocity V in accordance with the magnification power in a direction indicated by an arrow by a scanner motor 209, thereby permitting scanning over the document on the platen glass late 208. The second and third mirrors are moved in the ame direction at velocity V/2 with the scanning of the exposure lamp 201 and the first mirror. The position of the exposure lamp 201 is calculated and controlled in accordance with a scanner home sensor 210 and an amount of movement from home position (the number of steps of the motor). The light reflected from the document, which is incident on the CCD sensor 204, is converted to an electric signal in the sensor. An image processing circuit 205 processes the analog electric signal and converts it to digital image data. Then, the digital image is sent to the interface 207 and the image former 300. A white shading correction plate 209 is located at a different position from the image read position of the platen glass plate 208. The shading correction plate 209 is read in order to create correction data for shading correction prior to the read of image information on the document.

Next, the image former 300 is described. First, exposure and imaging is described.

The image data transmitted from the image reader 200 or the interface 207 is converted to print data of cyan (C), magenta (M), yellow (Y) and black (K). The data is sent to controllers (not shown) of exposure heads. Each exposure head controller allows a laser to emit the light in accordance with the electric signal of the transmitted image data. The emitted light is scanned by a polygon mirror 301 in one dimension. Photoconductors in imaging units 302c, 302m, 302y and 302k are exposed to the light. Elements required for an electrophotography process are arranged around the photoconductor in each imaging unit. The photoconductors for C, M, Y and K rotate clockwise, whereby the processes of image forming are consecutively performed. The imaging units needed for these image forming processes are integrated for each process, and they are detachable from a body. A latent image on the photoconductor in each imaging unit is developed by each color developing unit. A toner image on the photoconductor is transmitted to paper on a paper feeding belt 304 by a transfer chargers 303c, 303m, 303y, 303k located opposite to the photoconductor in the paper feeding belt 304.

Next, paper feeding and fixing is described. A sheet of paper, on which the image is to be transferred, is supplied to a transfer position and the image is formed on the paper in the following sequence. Sheets of paper of various sizes are set in a group of paper cassettes 310a, 310b and 310c. The paper of a desired size is supplied to a feeding path by a paper feeding roller 312 attached to each of the paper feeding cassettes 310a, 310b and 310c. The paper supplied to the feeding path is sent to the paper feeding belt 304 by a pair of feeding rollers 313. A reference mark on the paper feeding belt 304 is detected by a timing sensor 306 so that the paper is timely fed. Resist correcting sensors 312 (three sensors along a main scan direction) are located at the most downstream position of the imaging units. When a resist pattern on the paper feeding belt 304 is formed, these sensors detect the amounts of horizontal and vertical color shifts of C, M, Y and K images, and a print image controller (PIC) corrects a drawing position and an image distortion, thereby preventing the color shift of the C, M, Y and K images on the paper. The toner image transferred on the paper is heated, melted and fixed on the paper by a fixing roller pair 307. Then, the paper is discharged to a tray 311.

For a double-sided copy, the paper having the image fixed by the fixing roller pair 307 is reversed by a paper reversing unit 309 in order to form the image on the back side of the paper. The paper is guided by a double side unit 308 and again fed therefrom. The paper feeding belt 304 can be withdrawn from the C, M and Y imaging units in accordance with a behavior of a belt withdrawing roller 305. Thus, the paper feeding belt 304 can be in no contact with the photoconductor. In forming a monochrome image, the C, M and Y imaging units can stop driving. It is therefore possible to reduce the wear of the photoconductor and the processes around the photoconductor.

Figure 2:
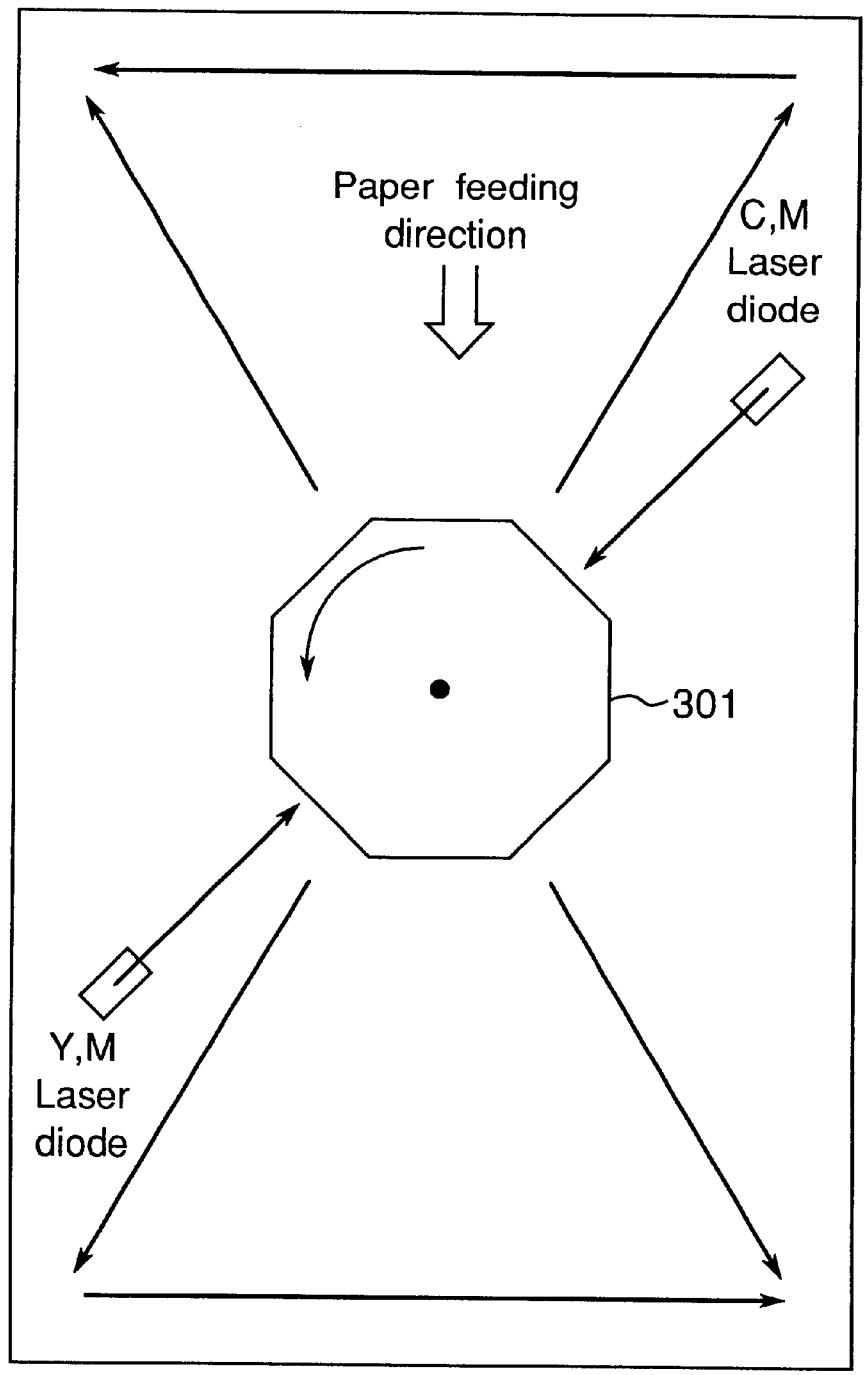
FIG. 2 is a schematic illustration of a constitution of a laser optical system.

FIG. 2 shows a structure of a laser optical system (LD head) including the polygon mirror 301 in top view. Four beams are reflected from the polygon mirror 301. When the photoconductor for each color is exposed to the light, C and M, from the laser, the colors to be painted on the upstream side are thus exposed and scanned in the direction opposite to the direction in which the colors, Y and K, to be painted on the downstream side are exposed and scanned. As described below, the print image controller performs mirror image processing in the direction in which two colors on the upstream side are scanned, thereby solving this problem.

Figure 3A:
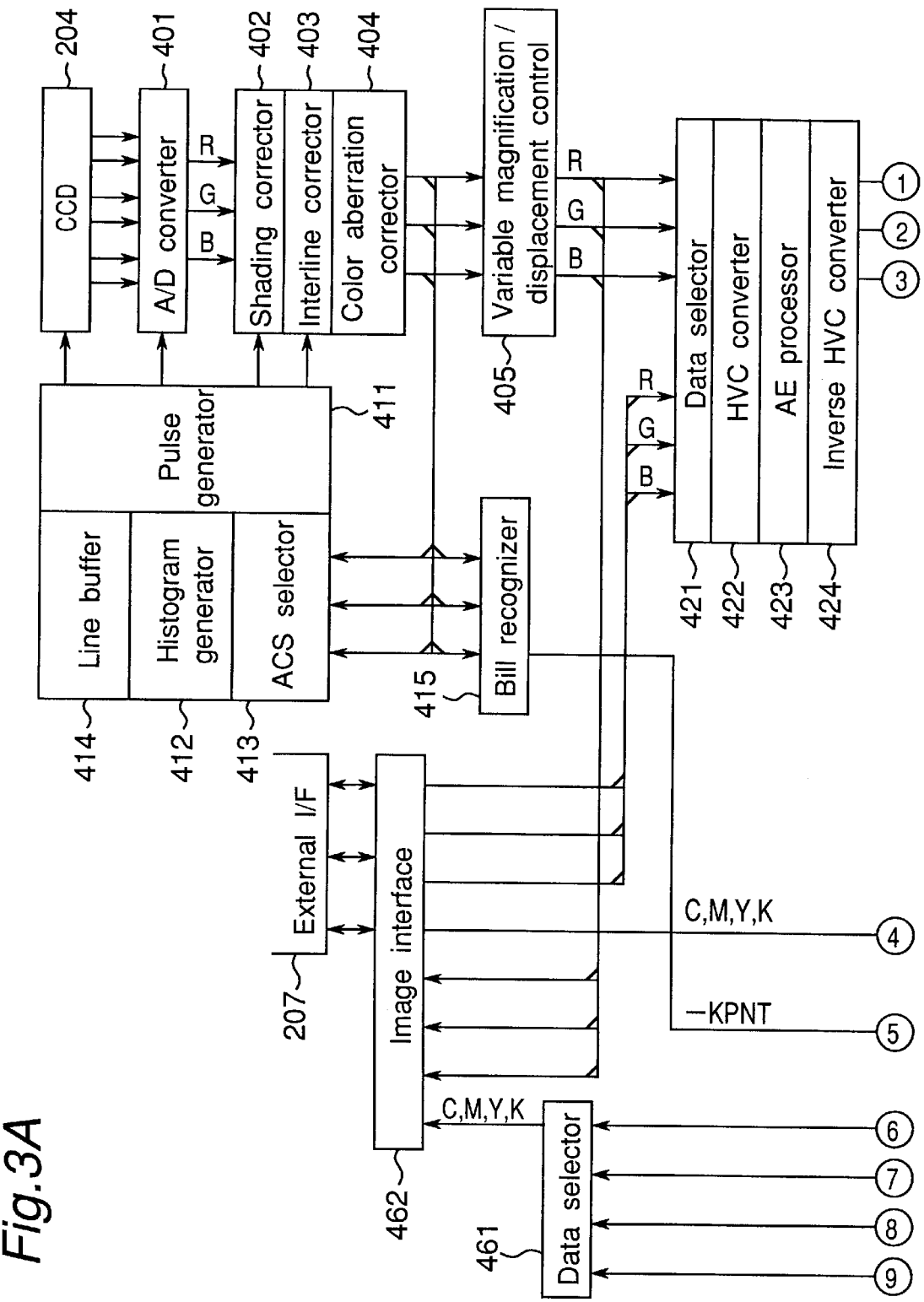
FIGS. 3A and 3B are parts of a block diagram of an image processor.
Figure 3B:
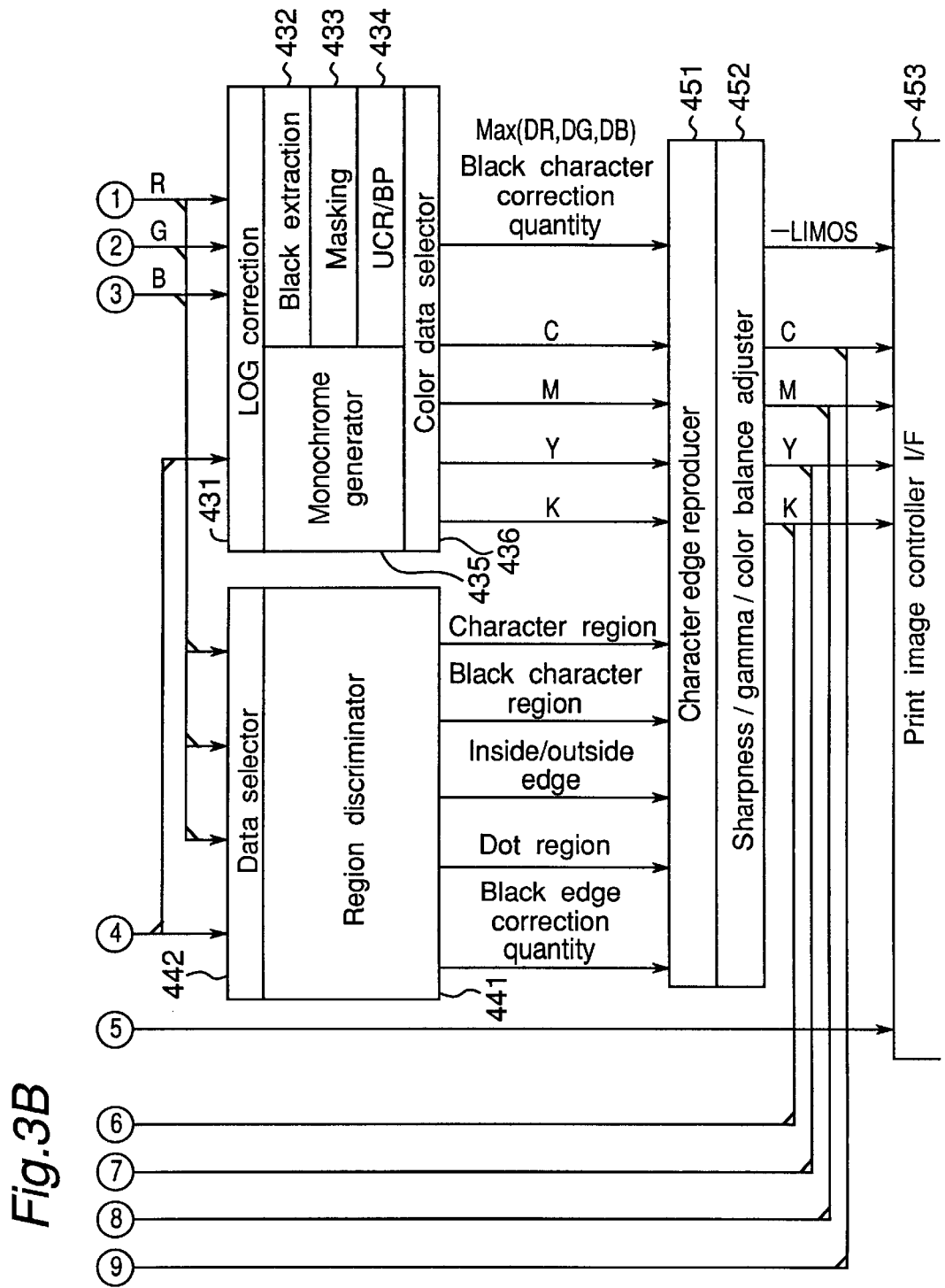

Next, a signal processing by the image reader 200 is described. FIGS. 3A and 3B show a general block diagram of the image processor 205 in the image reader 200. The light reflected from the document surface is formed by a reduction optical system onto an image on the CCD sensor 204, and an analog signal is photoelectrically converted to image data of color information of R, G and B. An A/D converter 401 converts the image data of 400 dpi to 8-bit digital data (256 gradation levels) for each color information of R, G and B by the use of the A/D converter in accordance with a timing signal transmitted from a reference drive pulse generator 411.

In a shading corrector 402, the data obtained by reading the white shading correction plate 209 before reading the document have been stored as reference data in an internal shading memory, independently for each of R, G and B, in order to eliminate a variation in light quantity in the main scan direction in which R, G and B data are scanned in the main scan direction. When the document is scanned, the data is converted to a reciprocal thereof and then multiplied with the read data of the document information, whereby the data is corrected on shading.

In an interline corrector 403, each color data is delayed line by line by the use of an internal field memory in accordance with a scan velocity (depending on the magnification power of subscan). Then, the read positions of the sensor chip for R, G and B are adjusted in the direction in which each sensor chip for R, G and B is scanned.

Due to chroma aberration induced by an optical lens, a phase difference among R, G and B is larger at positions closer to the ends of a document in the main scan direction. This influence causes an error in ACS judgment and black character discrimination to be described below, besides the above-mentioned color shift. Therefore, a chroma aberration corrector 404 corrects the phase difference among R, G and B in accordance with chroma information.

In a variable-magnification/displacement processor 405, two line memories for variable magnification are used for each of the R, G and B data so as to alternately input and output the data line by line, and the write/read timing is independently controlled. Then, the magnification power and displacement in the main scan direction are changed. That is, the reduction is accomplished by thinning the data when the data is written to the memory, while the enlargement is accomplished by increasing a number of the data when the data is read from the memory. Under this control, the interpolation is performed in accordance with the magnification power. For the reduction, the interpolation is performed before the data is written to the memory. For the enlargement, the interpolation is performed after the data is read from the memory. This prevents defects and distortion of the image. Besides the enlargement and the reduction, a combination of the control by this block and the scan control realizes centering of the image, image repeating, consecutive enlargement, reduction in a binding margin, or the like.

In a histogram generator 412 and an automatic color selector (ACS) 413, value data of the document is generated from the R, G and B data obtained by prescan, and the histogram of the value data is created in a memory (histogram memory), before the document is copied. Meanwhile, it is judged in accordance with chroma data whether or not each dot is a color dot, and the number of color dots in each mesh of 512 dots in the document is counted in the memory (ACS memory). Automatic control of copy background level (automatic exposure processing) and automatic color selection (ACS) for judging whether a color copy operation or a monochrome copy operation is selected are performed in accordance with this result.

A line buffer 414 has memories which can store one line of the R, G and B data that are read by the image reader 200. The line buffer 414 monitors the image data for image analysis for automatic sensitivity correction and automatic clamp of the CCD sensor for the A/D converter 401.

In a bill recognizer 415, R, G and B data areas are selected at any time to prevent a normal copy when a security such as a bill (paper money) is put on the platen glass plate 208. It is judged by pattern matching whether or not the document is a bill. As soon as the document is judged as a bill, a central processing unit for controlling the read operation by the image reader 200 and the image processor 205 outputs a black paint signal (−PNT="L") to the print image controller. (The "−" before a reference sign means a signal of negative logic.) The print image controller switches K data to black paint so as to inhibit a normal copy.

An HVC converter 422 temporarily converts the R, G and B data received from a data selector 421 to value (V data) and color difference signals (Cr and Cb data) by a 3*3 matrix operation.

Then, an automatic exposure (AE) processor 423 corrects the V data in accordance with the background level control value and corrects the Cr and Cb data in accordance with chroma level and hue level which are set by the operation panel. Then, an inverse HVC converter 424 reconverts the V, Cr and Cb data to the R, G and B data by an 3*3 inverse matrix operation.

In a color corrector, a logarithm corrector 431 converts the R, G and B data to gradation level data (DR, DG and DB data). Then, a black extractor 432 detects a minimum color level of the DR, DG and DB data as under color component. At the same time, a black extractor 432 detects gradation level difference between maximum and minimum colors of the R, G and B data as document chroma data.

The DR, DG and DB data are subjected to a 3*6 nonlinear matrix operation in a masking operation processor 433. The DR, DG and DB data are converted to the color data (C, M, Y and K data) which match color toners of the printer.

An under color removal/black paint processor (UCR/BP processor) 434 calculates UCR/BP coefficients of the under color component (Min(R, G, B)) in accordance with the document chroma data. The UCR/BP processor 434 determines the amounts of UCR and BP by multiplication. The UCR/BP processor 434 determines a finite difference in the amount of under color removal (UCR) among the C, M and Y data from the C, M and Y data which are subjected to the masking operation. The UCR/BP processor 434 calculates the C, M and Y data and then calculates the BP amount equal to K data. A monochrome data generator 435 creates a value component from the R, G and B data, corrects the data with logarithm operation and outputs the data as black data (DV data). Finally, a color data selector 436 selects the image for color copy, i.e., the C, M, Y and K data or the image for monochrome copy, i.e., the DV data (C, M and Y are white).

A region discriminator 441 detects the difference (Max(R, G, B)−Min(R, G, B)) between the minimum color (Min(R, G, B)) and the maximum color from the R, G and B data which are inputted to the region discriminator 441 through a data selector 442. Then, a black character, a color character, a dot, and the like are discriminated. The region discriminator 441 corrects a character edge for the black character discrimination and transmits the data, as well as the result of the discrimination, to a character edge reproducer 451. At the same time, it generates and transmits an attribute signal for switching a method of reproducing the gradation level to the print image controller and to a print head controller.

The character edge reproducer 451 performs the correction (edge emphasis, smoothing and character edge removal) suitable for each discriminated region fro the C, M, Y and K data received from the color corrector in accordance with the result of the region discrimination. Finally, a sharpness/gamma/color balance adjuster 452 corrects the image of the C, M, Y and K data in accordance with sharpness level, color balance level and gamma level specified with the operation panel. The adjuster 452 transmits a gradation reproduction attribute signal, –LIMOS, to a print image control interface 453. The adjuster 452 sends the C, M, Y and K data through a data selector 461 to an image interface 462.

The image interface 462 allows the image to be inputted and outputted to/from an external apparatus. The image interface 462 is operated so that it can simultaneously receive and send the R, G and B data and it can sequentially receive and send the C, M, Y and K data. The external apparatus can use the color copying machine for the scanner function and for the printer function.

Figure 4A:
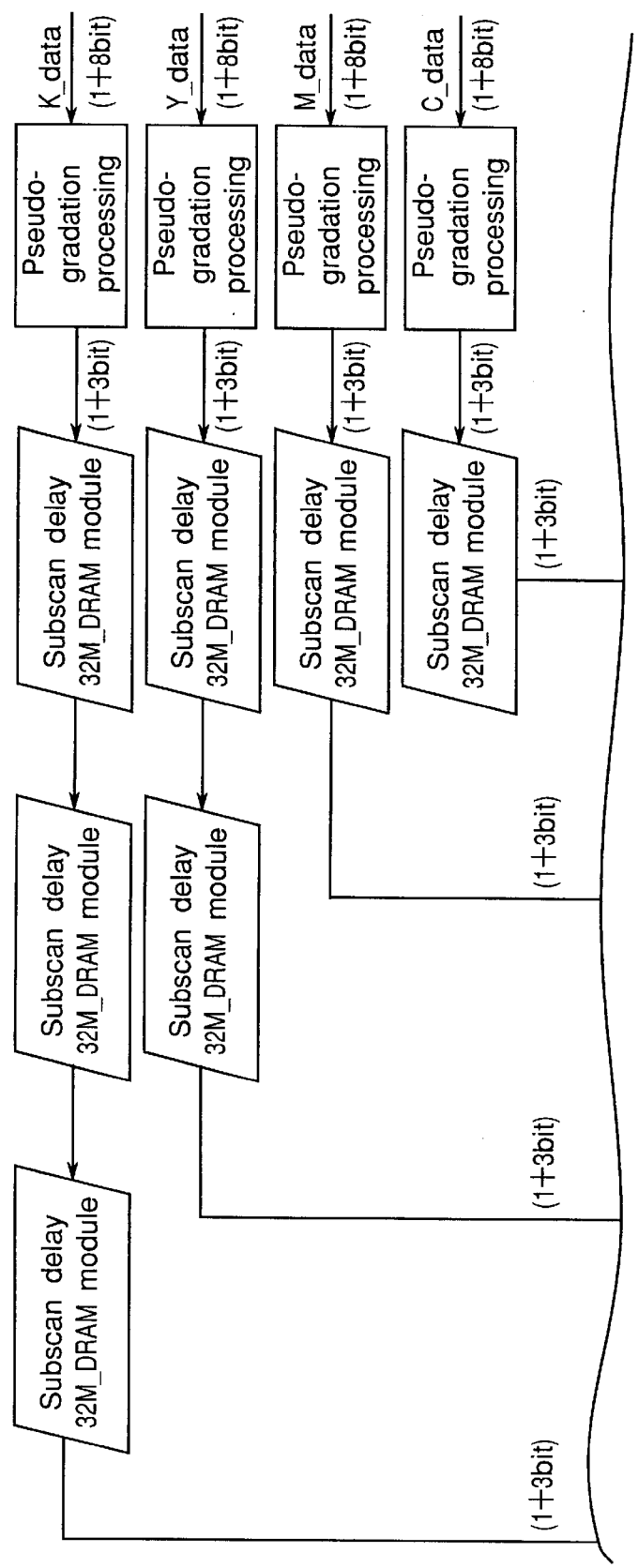
FIGS. 4A and 4B are parts of a diagram on relationship between a system constitution of the copying machine and a print image controller block.
Figure 4B:
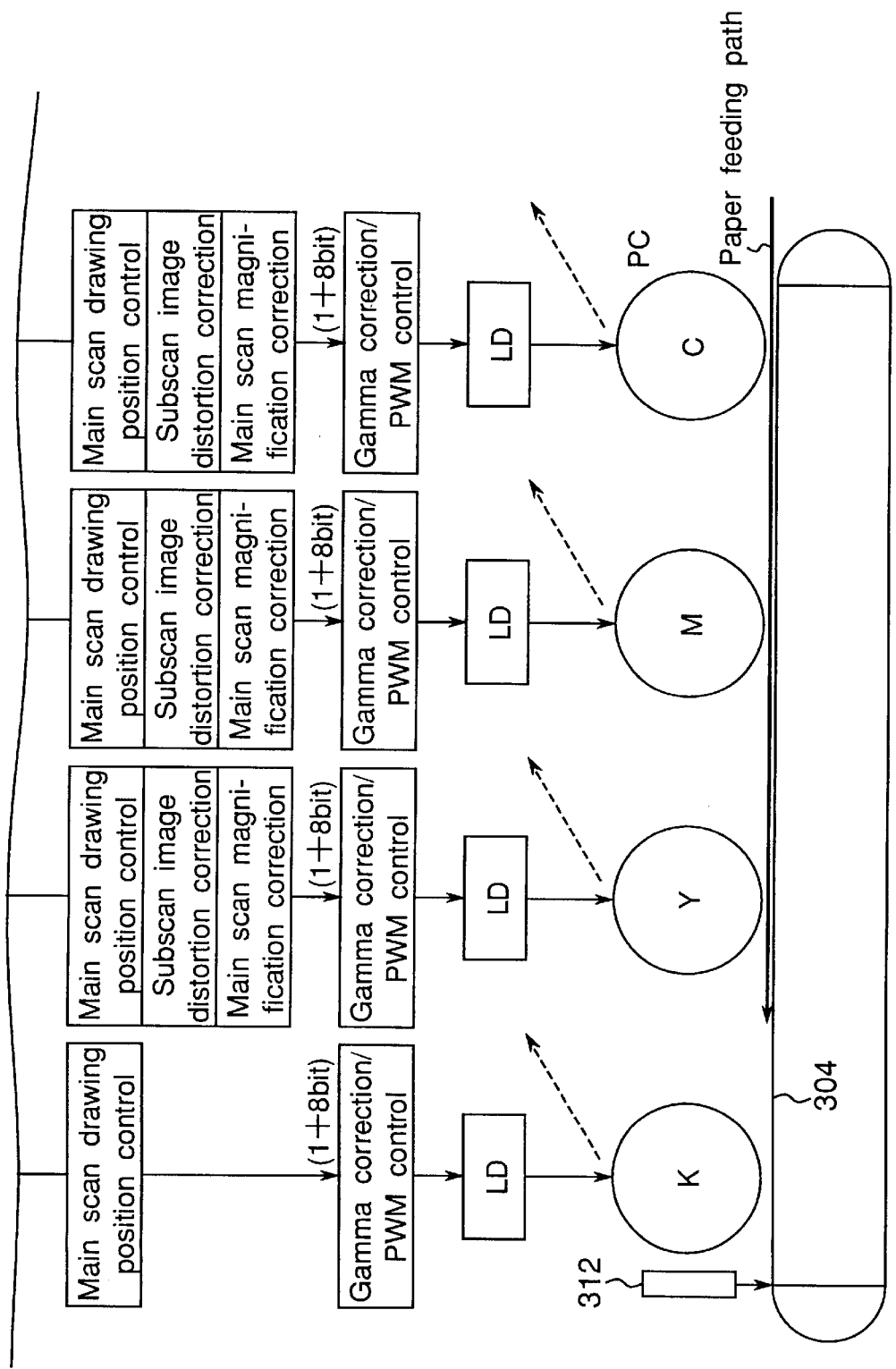

The system explained above is a copying machine for simultaneously outputting four colors per scan. FIGS. 4A and 4B show relationship between the system structure and the print image controller block. As shown in FIGS. 4A and 4B, the C, M, Y and K data from the image reader 200 are simultaneously transmitted to the print image controller in one scan operation. Accordingly, the processing in the print image controller is basically parallel operation for the C, M and Y data. The system needs to transmit the image composed of C, M, Y and K toner components on the paper fed onto the paper feeding belt 304 without the color shift.

However, as shown schematically in FIGS. 5A–5F, the color shifts happen due to various factors. Because the photoconductors are substantially equally spaced above the paper feeding belt 304, the timings for developing the C, M, Y and K toners are shifted by the times depending on distances between the photoconductors. The timings for C, M, Y and K are therefore controlled by using subscan delay modules so that they are delayed by the amounts depending on the distance between the photoconductors in the subscan direction. However, as shown in FIG. 5A, the colors are deviated when for example C is shifted and drawn in the subscan direction. Moreover, the latent images are formed on the photoconductors with laser scan by using one polygon mirror and four beams. Thus, a raster scan direction of the first two colors (C and M) is opposite to that of the latter two colors (Y and K) and, as a result, the colors are shifted due to this mirror image relationship (FIG. 5F). In addition, for example, the print start positions are displaced in the main scan direction due to the laser scan of the colors (FIG. 5E), the magnification power in the main scan direction is distorted (FIG. 5D), a bow distortion takes place in the subscan direction (FIG. 5C), a skew distortion takes place due to the difference in parallelism between the arrangement of the photoconductors and the laser scan (FIG. 5B), and these factors also cause the color shift. These phenomena are corrected by correcting the position and the images for the C, M, Y and K data, in order to prevent the color shift.

Figure 6:
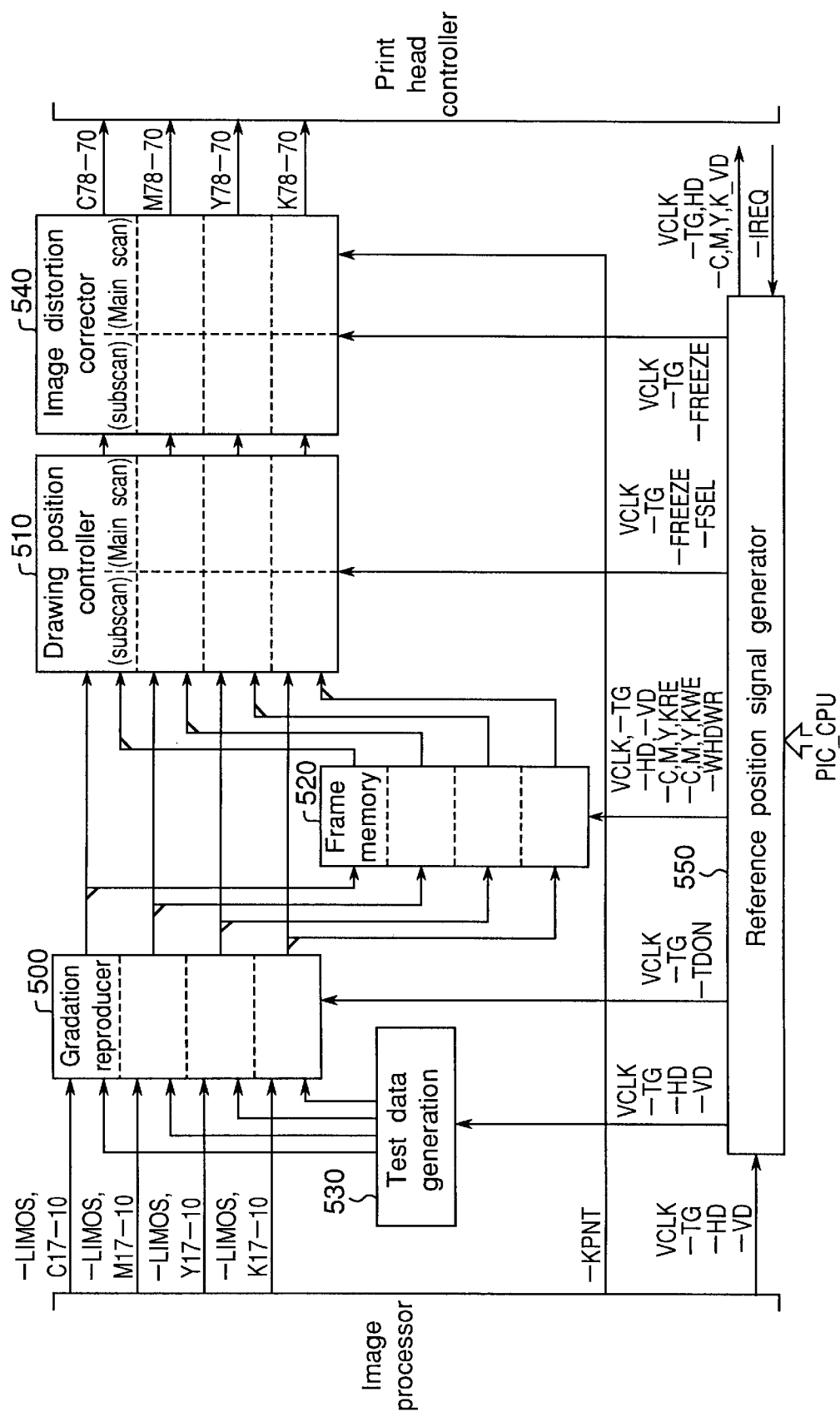
FIG. 6 is a block diagram of the print image controller.

It is the print image controller shown in FIG. 6 that performs these corrections. First, the C, M, Y and K image data transmitted from the image processor 205 are inputted to a gradation reproducer 500. Here, the 8-bit gradation level of the C, M, Y and K data is converted to 3-bit pseudo 256-gradation-level data by a multi-level error diffusion of character separation type in accordance with the -LIMOS signal (gradation reproduction attribute signal). Then, a drawing position controller 510 corrects the position, at which the K component is drawn by the K developing unit located at the most downstream position, on the basis of the paper, in order to correct the shift of the developing timing depending on the distance between the photoconductors (see FIG. 1). The drawing position controller 510 corrects the positions of the other color components for the subscan with respect to the K component. Next, in order to correct the difference in the laser scan direction and the shift of the main scan start position, the C and M images are subjected to main scan mirror image processing. As in the case of the subscan, the position of the K component is corrected on the basis of the paper, while the positions of the other color components are corrected with respect to the K component. A frame memory 520 needs to previously store the image on the front side at the time of a double-sided copy. For this reason, the frame memory 520 has a memory unit whose capacity is equivalent to one surface of A3-size paper, for storing the data from the gradation reproducer 500.

Figure 7:
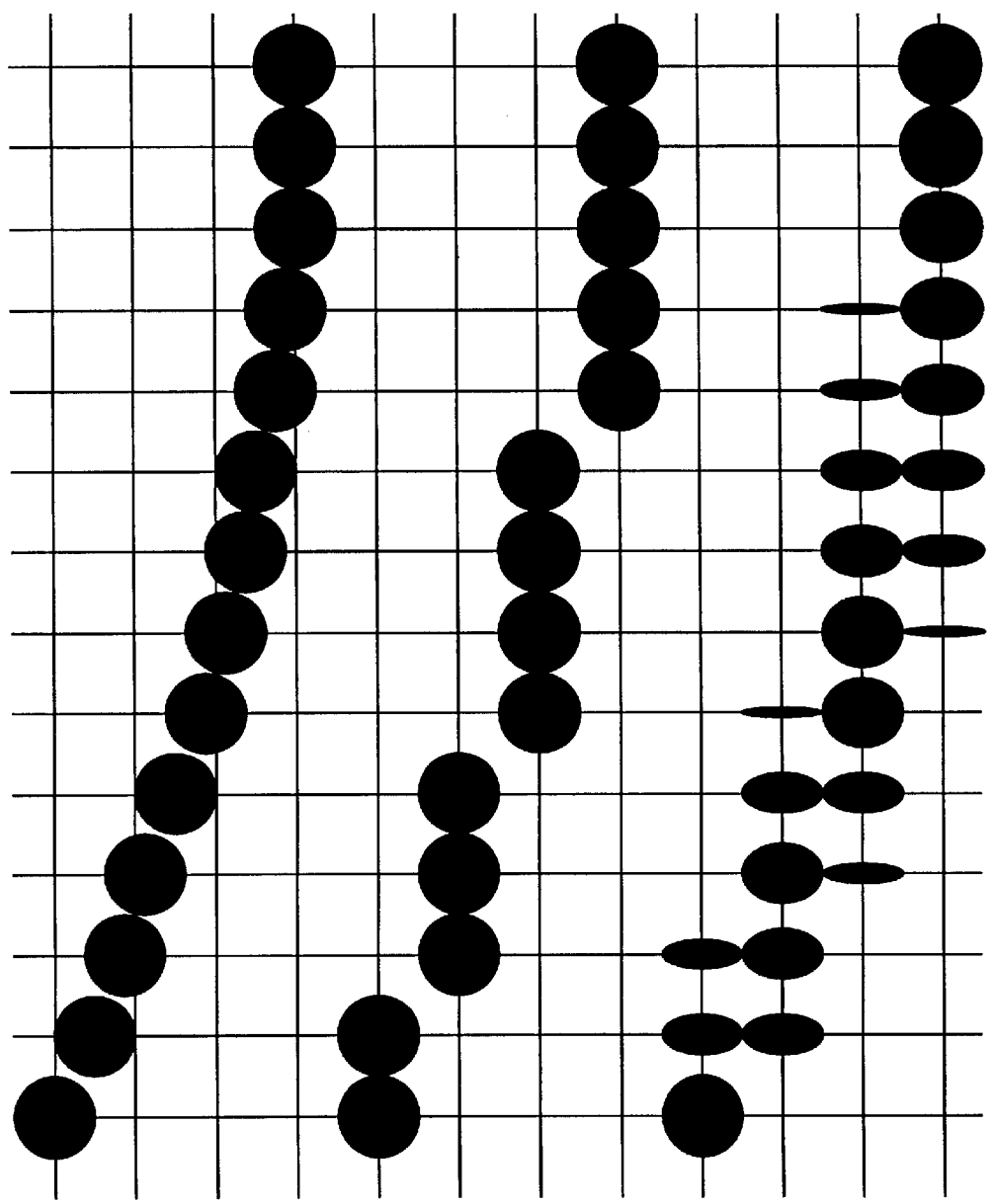
FIG. 7 is a diagram of an example of an image correction by a gradation level distribution.

Test pattern data of C, M, Y and K for resist detection, which are generated by a test data generator 530, are simultaneously transferred onto the paper feeding belt 304. The amounts of color shift of the C, M and Y components from the K component are detected by a resist detecting sensor 312 which is located in a still more downstream site than the K developing unit located at the most downstream position. An image distortion corrector 540 corrects the main scan magnification distortion, the subscan bow distortion and the skew distortion of the C, M and Y components by means of the interpolation by a gradation level distribution in accordance with the result of the color shift detection, as diagrammatically shown in FIG. 7. The K image data alone from the drawing position controller 510 is decoded to the 256-gradation-level data. The K image data or black paint data is selected in accordance with the result of the above-described bill recognition. The C, M, Y and K data, which are finally corrected, are shifted to the image position based on the paper by the print imaging controller/print head controller interface. The C, M, Y and K data are transmitted to the print head controller, and then the image is reproduced. A reference position signal generator 550 generates various reference position signals in accordance with various input signals.

Figure 8:
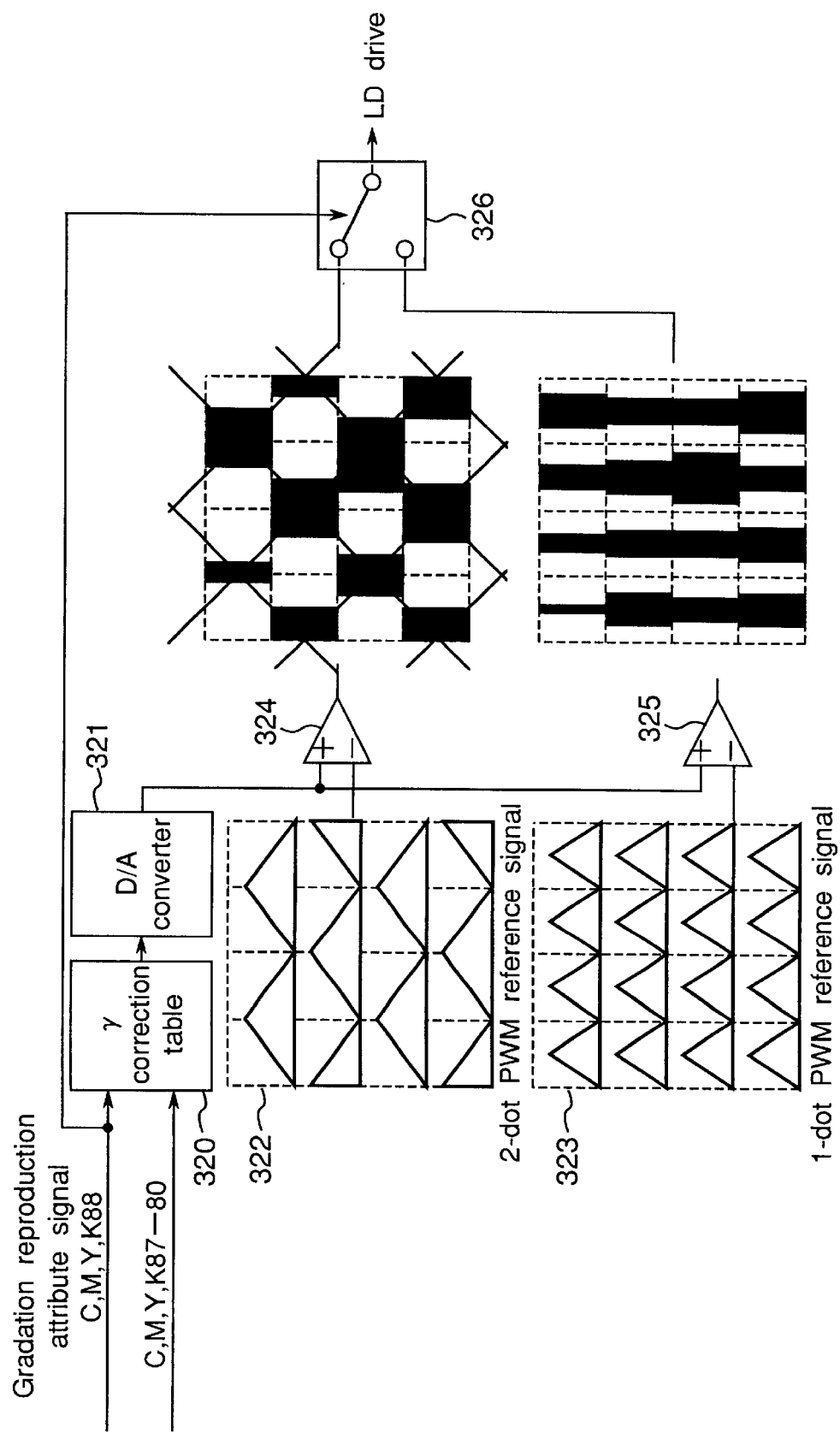
FIG. 8 shows a print head controller.

FIG. 8 shows the print head controller, wherein a gradation level distortion due to gamma-characteristic in the electrophotography process is corrected by a gamma-correction table 320. Then, the gradation level is converted by a D/A converter 321 to an analog level. The most significant bit of each color corresponds to–LIMOS signal (the gradation reproduction attribute signal) transmitted from the image reader. Light modulation method is switched by a switch 326 in accordance with the gradation reproduction attribute signal. When the most significant bit is "L" (=character edge), an LD drive signal is generated by pulse width modulation (PWM) in which a pulse having a cycle of one dot is compared to a reference signal 322 for one dot by a comparator 323. When the most significant bit is "H" (=continuous gradation level), the LD drive signal is generated by pulse width modulation (PWM) in which a pulse having a cycle of two dots is compared to a reference signal 324 for two dots by a comparator 325. By driving a semiconductor laser as explained above, the image is exposed to the light on the photoconductors so as to express the gradation level. For the 2-dot pulse width modulation, a screen angle of 45° is set so that the granular characteristic of the image may be improved. The character edge is reproduced by the 1-dot pulse width modulation which gives priority to resolution and has no defects in characters. For the other regions, the gradation level reproduction is automatically performed. This gradation level reproduction is resistant to an image noise produced by the 2-dot pulse width modulation and the 45-degree screen angle modulation, thus forming the smooth image having excellent granular characteristic.

As is described in detail later, optimum image correction is performed by the character edge reproducer 451 in accordance with the region discrimination result obtained by the image reader 200. The gradation reproducer in the print image controller switches the processing to the multi-level error diffusion or simple quantization depending on the judgment on whether or not the region is the character edge in accordance with the gradation level attribute signal. Finally, the print head controller automatically switches the light modulation on the photoconductor so as to improve the quality of the image.

Figure 9:
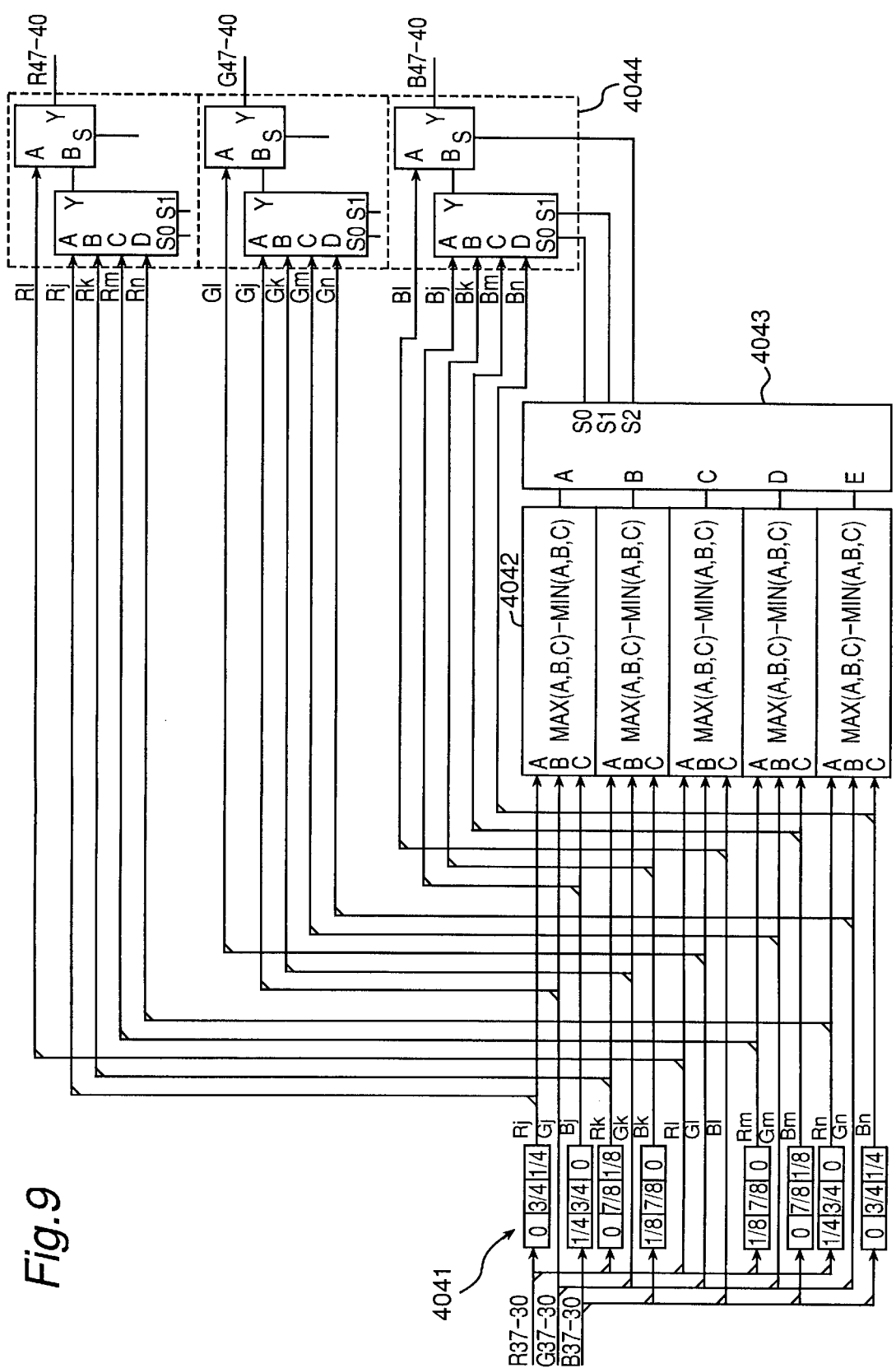
FIG. 9 is a block diagram of a color aberration corrector.
Figure 10:
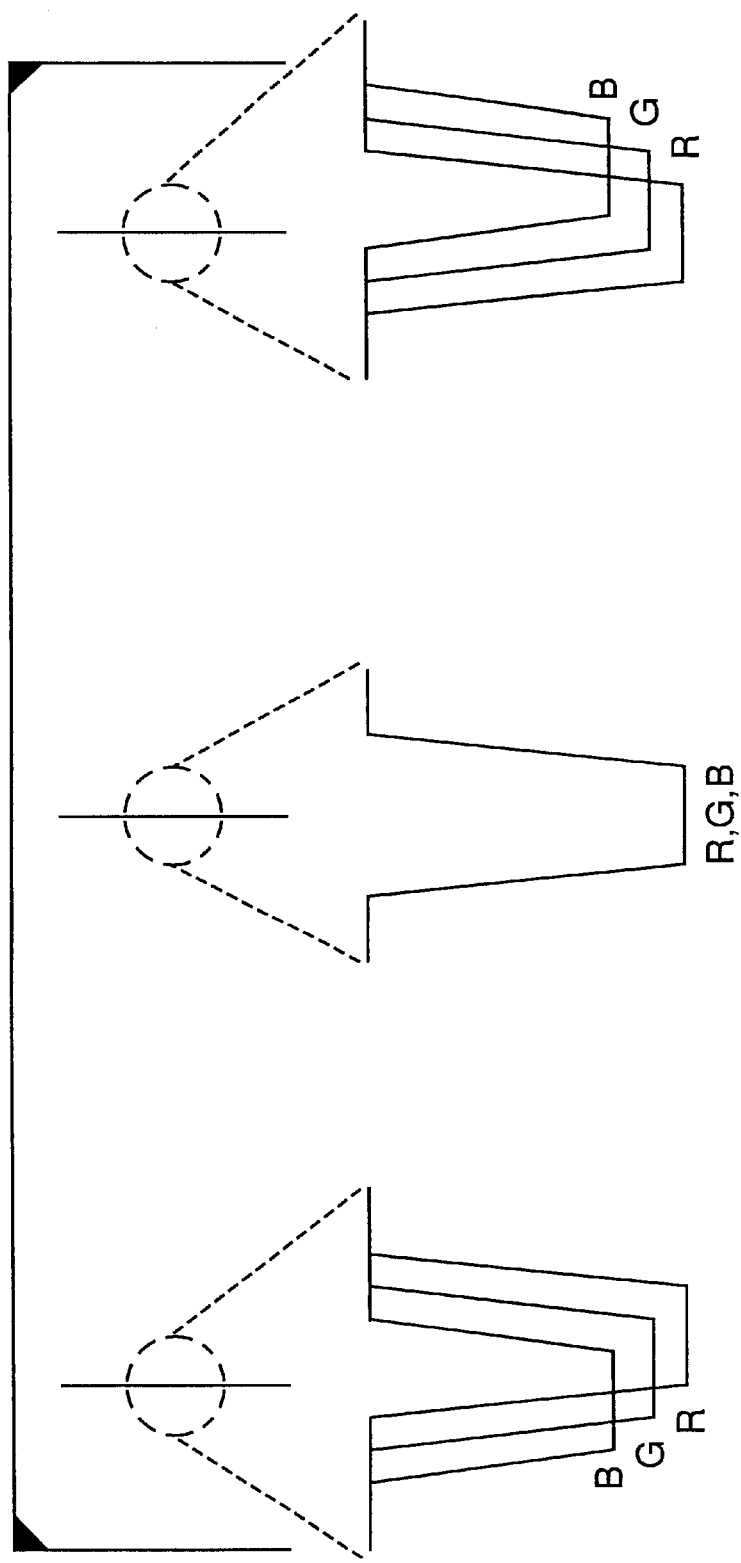
FIG. 10 is a diagram of color aberration in the main scan direction.

FIG. 9 shows a color aberration corrector 404 which receives R, G, B data (R, G, $B_{37-30}$) after the shading correction and the interline correction-and performs color aberration correction. As shown in FIG. 10, color shift happens of the optical system occurs at ends in the main scan direction due to color aberration phenomenon caused by characteristics of the lens for focusing document information onto the CCD sensor 204. That is, according to the wavelength of light, longer wavelengths (R) are condensed to the inside, while shorter wavelengths (B) are condensed to the outside at the ends of the lens in the main scan relative to the center of the lens. Therefore, in an image such as a vertical line, the phases of R., G and B are shifted on the CCD sensor 204. The color aberration correction corrects the color shift.

The color aberration has no problem for an image having a relatively flat density distribution such as a color patch, but it causes color shift at edges of a character or the like. Especially, in the black character discrimination processing to be explained later, color aberration is a factor of erroneous decision on black character edge, and in the automatic color selection, a black dot information is decided as a color dot information to deteriorate the precision of the decision. Further, in the system, expansion and reduction in the main scan direction is performed by changing resolution of digital image data. Therefore, color shift becomes more pronounced at ends of an image when the image is expanded. Then, in the system, the color aberration corrector 404 is operated just after image reading, and before digital image processing such as the automatic color selection, black character decision, and magnification change.

In a method for correcting color aberration, data on color aberration in the main scan direction (correction coefficients) are stored beforehand in a memory device for each dot. Then, R and B data are integrated with adjacent pixels based on the correction coefficients, to adjust phase with the G data.

$$R(n)=a1(n)*R(n-1)+a2(n)*R(n)+a3(n)*R(n+1),$$

$$G(n)=G(n),$$

and $$B(n)=a3(n)*B(n-1)$$
$$+a2(n)*B(n)+a1(n)*B(n+1),$$

wherein n denotes position of R, G, B dot relative to the reference position of main scan, and a1(n), a2(n) and a3(n) denote correction coefficients for n-th dot in the main scan direction.

However, the distribution of coefficients for correcting the predetermined color aberration state are different among machines due to scattering in characteristics of the lens in the fabrication process. Therefore, it is necessary for this method to store the correction coefficients beforehand by determining the color aberration for each machine, and the production efficiency is very bad.

Then, in the system, five kinds of R, B phase conversion are performed, and chroma data W=(MAX(R, G, b) −MIN (R, G, B)) of each R, G and B data is determined. The R, G and B data having the smallest chroma data are decided as R, G and B data for the smallest phase, and the R, G and B data are selected as the color aberration correction data. This is based on a theory that there is no phase shift of R, G and B in a condition that color aberration is corrected, so that (MAX(R, G, b)−MIN(R, G, B)) is small. Then, color aberration is performed irrespective of scattering of the lens performance among machines.

In concrete, first, five kinds of R, B conversion is performed as shown below by a R, G, B data phase converter 4041.

(1) A case in the side of reference position in the main scan (shift by ¼ dot)

$$Rj(n)=0.25*R(n-1)+0.75*R(n),$$

$$Gj(n)=G(n),$$

$$Bj(n)=0.75*B(n)+0.25*B(n+1),$$

And $$Wj(n)=MAX(Rj(n), Gj(n), Bj(n))-MIN\ (Rj(n), Gj(n), Bj(n))-MIN-(Rj(n), Gj(n), Bj(n)).$$

(2) A case in the side of reference position in the main scan (shift by ⅛ dot)

$$Rk(n)=0.125*R(n-1)+0.875*R(n),$$

$$Gk(n)\ G(n),$$

$$Bk(n)=0.875*B(n)+0.125*B(n+1),$$

And $$Wk(n)=MAX(Rk(n), Gk(n), Bk(n))-MIN(Rk(n), Gk(n), Bk(n)).$$

(3) A case at the central position in the main scan $$Rl(n)=R(n),$$

$$Gl(n)=G(n),$$

$$Bl(n)=B(n),$$

And $$Wl(n)=MAX(Rl(n), Gl(n), Bl(n))-MIN(Rl(n), Gl(n), Bl(n)).$$

(4) A case in the side reverse to reference position in the main scan (shift by ⅛ dot)

$$Rm(n)=0.875*R(n+1)+0.125*R(n),$$

$$Gm(n)=G(n),$$

$$Bm(n)=0.125*B(n)+0.875*B(n-1),$$

And $$Wm(n)=MAX(Rm(n), Gm(n), Bm(n))-MIN(Rm(n), Gm(n), Bm(n)).$$

(5) A case in the side reverse to reference position in the main scan (shift by ¼ dot)

$$Rn(n)=0.25*R(n+1)+0.75*R(n),$$

$$Gn(n)=(n),$$

$$Bn(n)=0.75*B(n)+0.25*B(n-1),$$

And $$Wn(n)=MAX(Rn(n), Gn\ (n), Bn(n)-MIN(Rn(n), Gn(n), Bn(n)).$$

Then, a difference circuit 4042 calculates a different between the maximum and the minimum, and a MIN data selector 4043 outputs discrimination signal $S_{2-0}$ to a selector 4044 to output the selected R, G and B. That is, if MIN(Wj(n):Wn(n))=Wj(n), selection signal S (="100") for selecting Rj(n), Gj(n), Bj(n) is outputted, if MIN(Wj(n):Wn(n))=Wk(n), selection signal S (="101") for selecting Rk(n), Gk(n), Bk(n) is outputted, if MIN(Wj(n):Wn(n))=Wl(n), selection signal S (="000") for selecting Rl(n), Gl(n), Bl(n) is outputted, if MIN(Wj(n):Wn(n))=Wm(n), recognition signal S (="110") for selecting Rm(n), Gm(n), Bm(n) is outputted, if MIN(Wj(n):Wn(n))=Wn(n), selection signal S (="111") for selecting Rn(n), Gn(n), Bn(n) is outputted.

Next, automatic underground control (AE, automatic exposure) and automatic color selection (ACS) are explained. For these controls, a prescan is performed. Before starting a copy operation, when a copy button is pressed, after the exposure lamp is turned on, the document scan unit in the document feeder 100 moves to and scans on the shading correction plate to read correction data. Then, histogram data and ACS memory data are generated on the document, and the content of the automatic underground control and the automatic color selection are determined from the data. Then, the document scan unit returns to the start position and starts a scan for copy operation. This rescan is performed at a speed of four times that of the normal scan, and R, G, B image are sent to the histogram generator 412 and to the automatic color selector 413 at 400 dpi in the main scan direction and at 100 dpi in the subscan direction.

Figure 11:
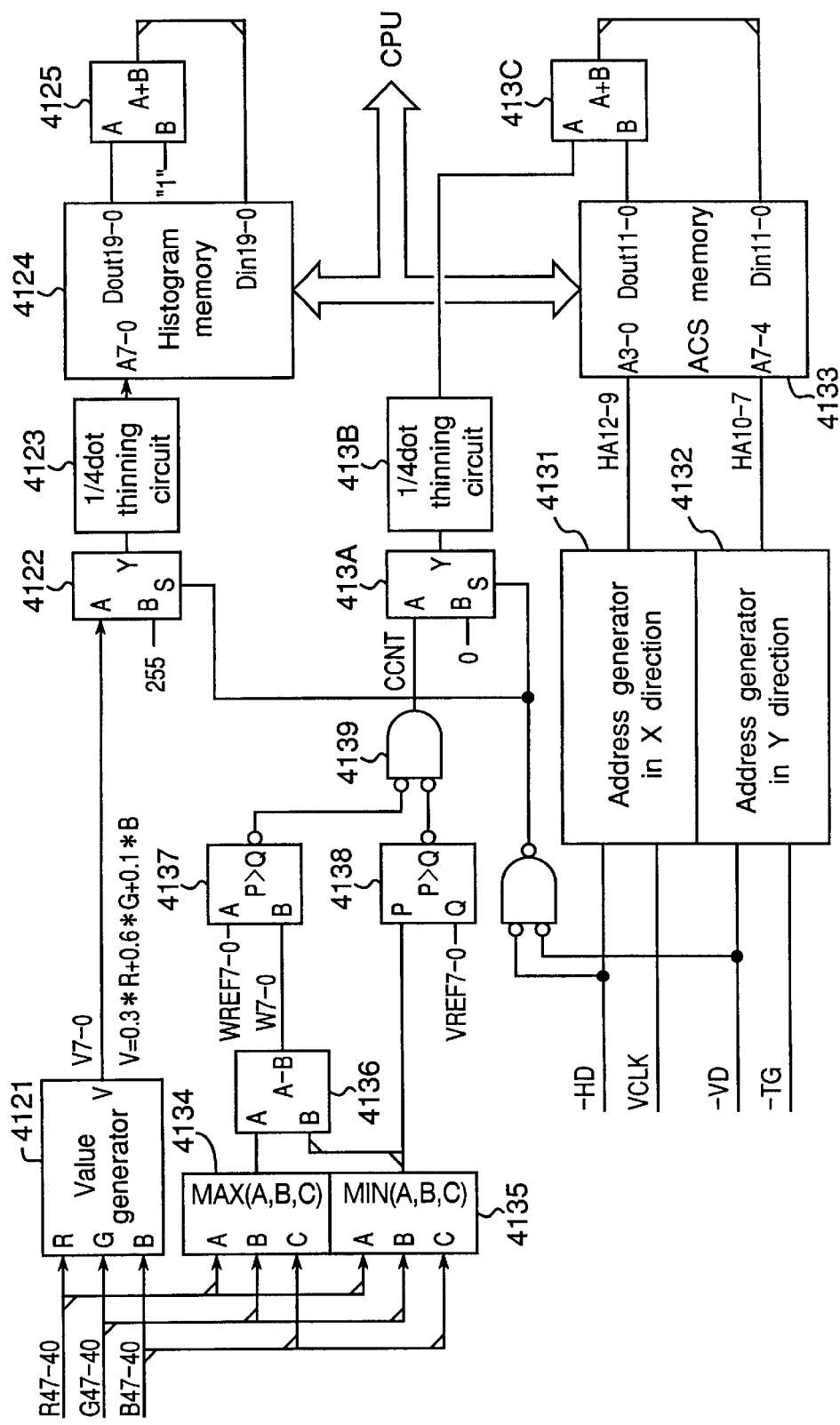
FIG. 11 is a block diagram of a histogram generator and an automatic color selector.
Figure 12:
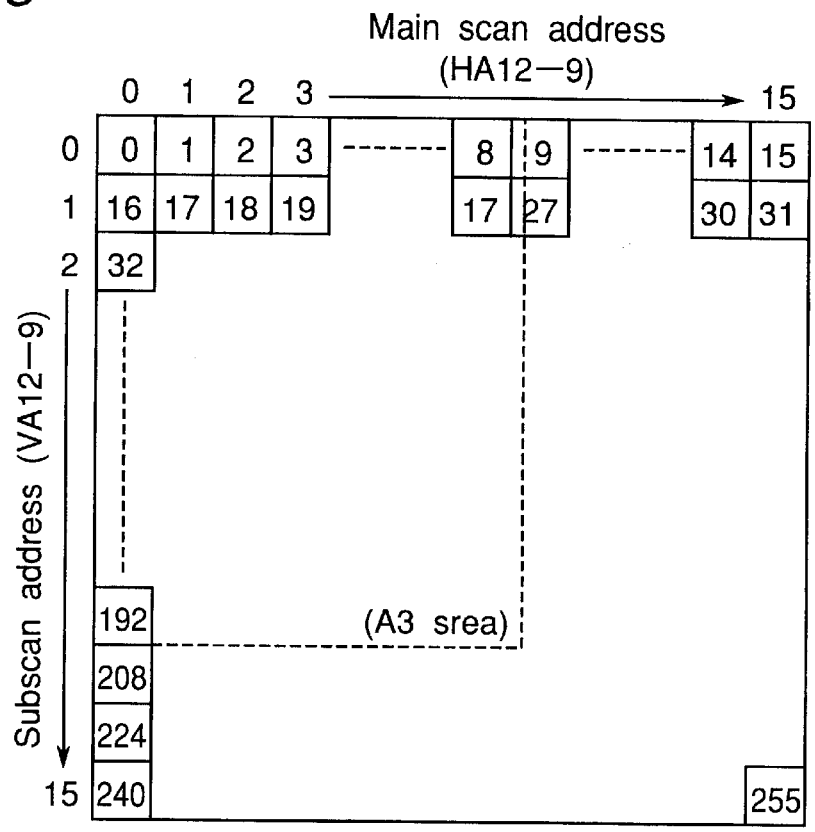
FIG. 12 is a diagram of address of an ACS memory device.

Next, generation of the ACS memory data is explained. In the prescan, the histogram generator 412 and the automatic color selector 413 shown in FIG. 11 determines the number of color dots for each block from the R, G and B data in the document area. An address generator 4131 for X direction of the document generates address $HA_{12-0}$ in an effective area of main scan effective area signal–HD of document reading in synchronization to the synchronization clock VCLK for image data. Similarly, an address generator 4132 for Y direction of the document generates address $VA_{10-0}$ in an effective area of subscan effective area signal –VD of document reading in synchronization to the main scan synchronization clock VCLK –TG. (Because the prescan is performed at four times the speed, for an A3 document, about 4680 is counted in X direction and about 1660 is counted in Y direction.) Upper bits $HA_{12-9}$ and $VA_{10-7}$ of the addresses outputted from the address generators 4131 and 4132 are sent to read/write addresses $A_{3-0}$, $A_{7-4}$ of an ACS memory 4133. Then, a block of 412 dots and 512 lines in the main scan and subscan directions corresponds to an address in the ACS memory 4133 (refer to FIG. 12). By using a MAX circuit 4134, a MIN circuit 4235 and a subtractor 4136, MAX(R, G, B) and MIN(R, G, B) are generated from R, G, $B_{47-40}$ received from the color aberration corrector 404. Further, $$W7-0=MAX(R, G, B)-MIN(R, G, B)$$

is generated. Then, by using comparators 4137, 4138 and an AND gate 4039, it is decided whether or not the following conditions are satisfied:

(First condition: High chroma) $W_{7-0 \geq WREF7-0}$, and (Second condition: Large density) MIN(R, G, B)$\leq VREF_{7-0}$.

If the dot satisfies the conditions, CCNT="1" (color dot) is outputted, while if the dot does not satisfy the conditions, CCNT="0" (monochrome dot) is outputted. By using the selector 413A, the CCNT signal is forces to "0" (monochrome dot) outside an area of –HD (main scan effective area) and –VD (subscan effective area), and the data are thinned in correspondence to 100 dpi in the main scan direction by a ¼ thinning circuit 413B. Then, they are added by an adder 413C with the data read at the current address in the ACS memory 4133. $WREF_{7-0}$ and $VREF_{7-0}$ are set by the central processing unit. When the prescan is started, the ACS memory 4133 is initialized by writing "0" to all the addresses. Then, after the subscan, a data at an address in the ACS memory 4133 represents the number of color dots in a corresponding block. However, because the size of the ACS memory 4133 is 4K in contrast to 16 K (=412*412/4/4) of data size of one block, the data is clipped at 4K. That is, the ratio of color dots in a block can be counted to ¼ (=25%). The central processing unit reads data in the ACS memory 4133 obtained with the subscan and determines a result of ACS decision.

The automatic color selection (ACS) selects a monochrome copy or a color copy by determining based on the result of rescan whether a document is a color document or a monochrome document. Especially, when monochrome and color documents are layered together in the document feeder 100, appropriate copies can be obtained without instructed by a user. Data at each address in the ACS memory 4133 shows the number of color dots of each block, and a document is decided to be a color document if the number of color dots satisfies the following conditions:

(1) The number of color dots of a block is larger than a first reference level REF1.

(2) A sum of the number of color dots of four blocks adjacent in the up, down, right and left directions is larger than the first reference level REF1, and one of the numbers of color dots in the four blocks is larger then REF1/4.

If C(N) denotes data stored in the ACS memory 4133 after the subscan at an address N (0–255), the condition (1) is satisfied when $$MAX(C(0), C(1), \ldots, C(255))>REF1.$$

Figure 13:
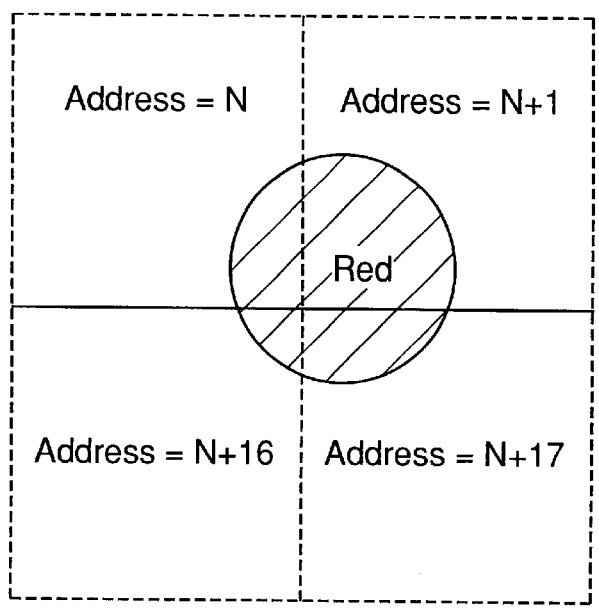
FIG. 13 is a diagram of a situation where a color portion extends over a plurality of blocks.

The reference value REF1 is set to $(X*16)^2/16=X^2*16$ because the minimum color area in a color document is X mm square and 1 mm corresponds to 16 dots. The second condition (2) compliments the first condition, and it is assumed that a color portion in a documents extend -over four blocks in the worst case (refer to FIG. 13). Then, for an address N, if C(N)+C(N+1)+ . . . +C(N+16)+C(N+17) >REF1 is satisfied and if MAX(C(N),C(N+1), . . . ,C(N+16),C(N+17))>0.25*REF1, the document is decided as a color document. By using the conditions (1) and (2), it is prevented that a color information of a very small area such as an engraved seal is decided erroneously as a monochrome document.

Next, a histogram generator 412 is explained. The histogram generator 412 shown in FIG. 11 obtains a value histogram from the R, G, B data in the document area on the prescan. In a histogram memory 4124, address represents value gradation level and data represents the frequency of each gradation level (histogram data). A value generator 4121 generates value signal $V_{7-0}$ from the R, G, $B_{47-40}$ received from the color aberration corrector 404. The histogram is generated not on R, G, B data, but on value data, because the AE processor performs correction on data separated to value and color difference signals. The value signal V is substituted by a selector 4122 with white data (255) outside an effective area in the main and subscan directions. Then, the value signal is sent to the address of the histogram memory 4124 through a ¼ dot thinning circuit 4123. An adder 4125 reads data at an address received from the histogram memory 4124, adds "1", and writes the result to the same address. Thus, the output data from the histogram memory 4124 represents frequency of each value gradation level (address). The bit width of memory needs 21 bits (2M) for generating value histogram of all the dots for 100 dpi in the main and subscan directions for the maximum document size (A3), but when the frequency exceeds 20 bits (1M), the count is clipped at 1M. Before prescan is started, the histogram memory 4124 is initialized by writing "0" to the address of all the gradation levels in the histogram memory 4124. When the prescan is completed, the central processing unit reads the frequency data at each gradation from the histogram memory 4124.

Figure 14:
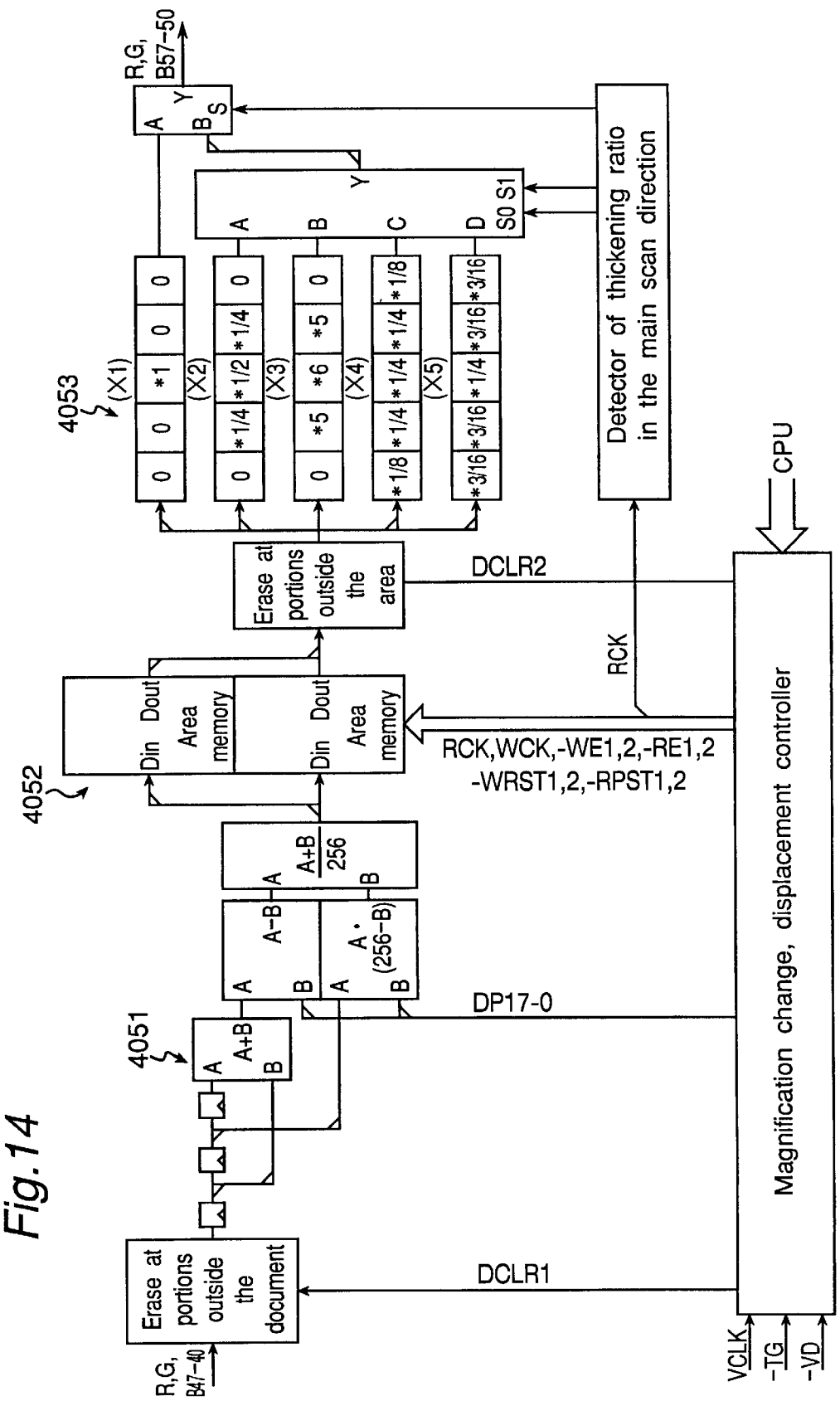
FIG. 14 is a block diagram of a magnification change and displacement controller.

FIG. 14 shows a magnification change and displacement controller 405. The R, G, B data from the color aberration corrector 404 are erased outside the document and reduced in a reduction interpolator 4051. Then, a magnification change and displacement processor 4052 controls the read timing of the image data to change the magnification and to displace them. Next, the image data are erased outside the document and enlarged in an enlargement interpolator 4053. Then, the image data are sent to the HVC converter 422.

Figure 15:
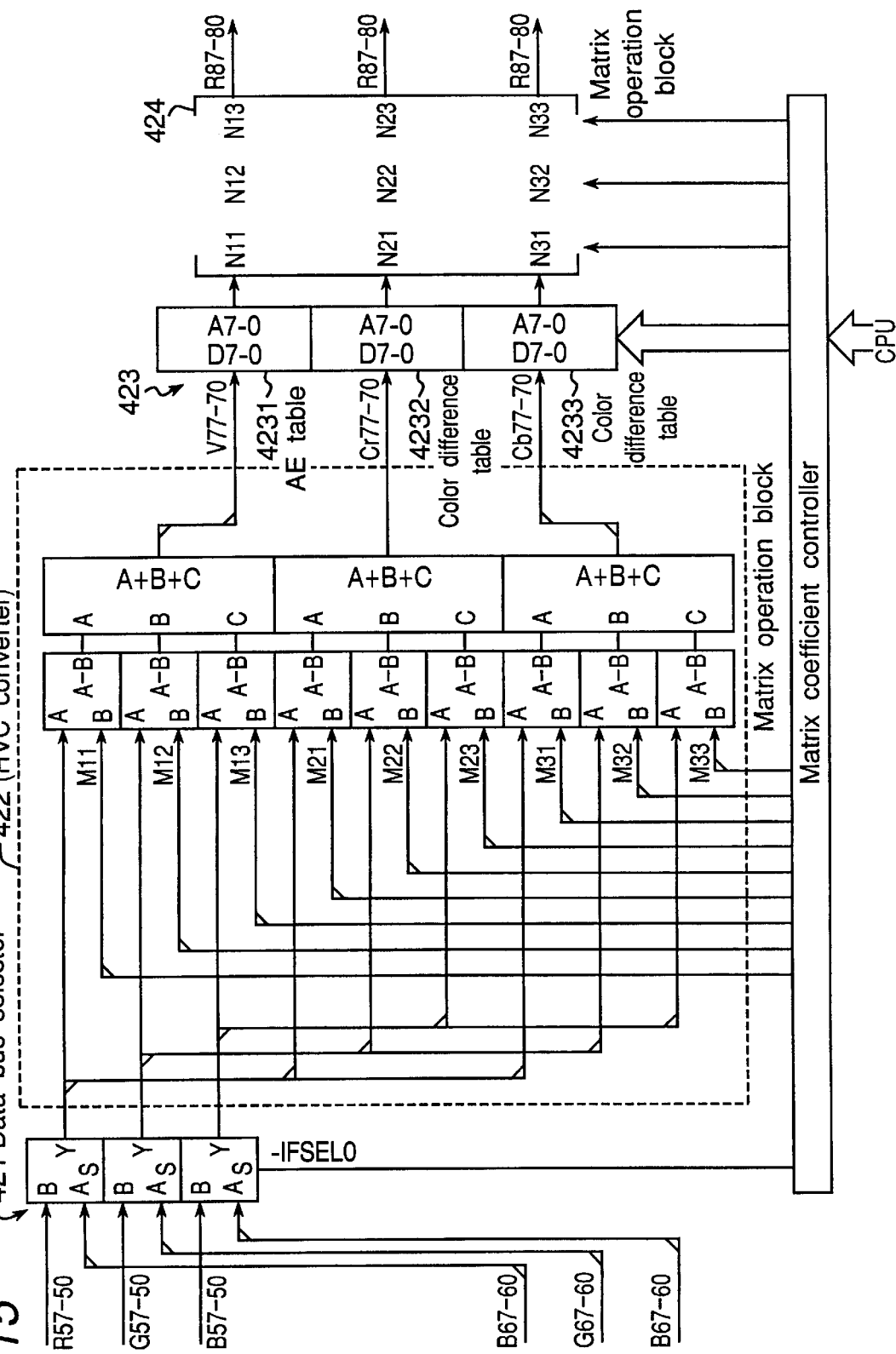
FIG. 15 is a block diagram of an AE processor and an HVC converter.

Next, with reference to FIG. 15, the AE processor 423 is explained which controls the background density automatically. The content of the AE operation is determined according to the histogram data and the results of automatic color selection obtained in the prescan.

A data selector 421 receives the image data R, G, $B_{57-50}$ after the magnification change and the displacement and the data R, G, B transmitted from the image interface 462 and selects one of them according to −IFSEL0 set by the central processing unit.

Next, an HVC converter 422 converts or separates the R, G and B data to value signal V and two kinds of color signals Cr and Cb. The conversion is performed according to a following 3*3 matrix calculation.

$$\begin{pmatrix} V \\ Cr \\ Cb \end{pmatrix} = \begin{pmatrix} M11 & M12 & M13 \\ M21 & M22 & M23 \\ M31 & M23 & M33 \end{pmatrix} * \begin{pmatrix} R \\ G \\ B \end{pmatrix},$$

where M11=0.3, M12=0.6, M13=0.1, M21=1, M22=−0.86, M23=−0.14, M31=−0.33, M32=−0.67 and M33=1.

Because the R, G, B data are separated to value component and color components with use of the conversion, image control can be performed independently for H, V and C in the next stage for value control (AE control), hue control, and chroma control.

Figure 16:
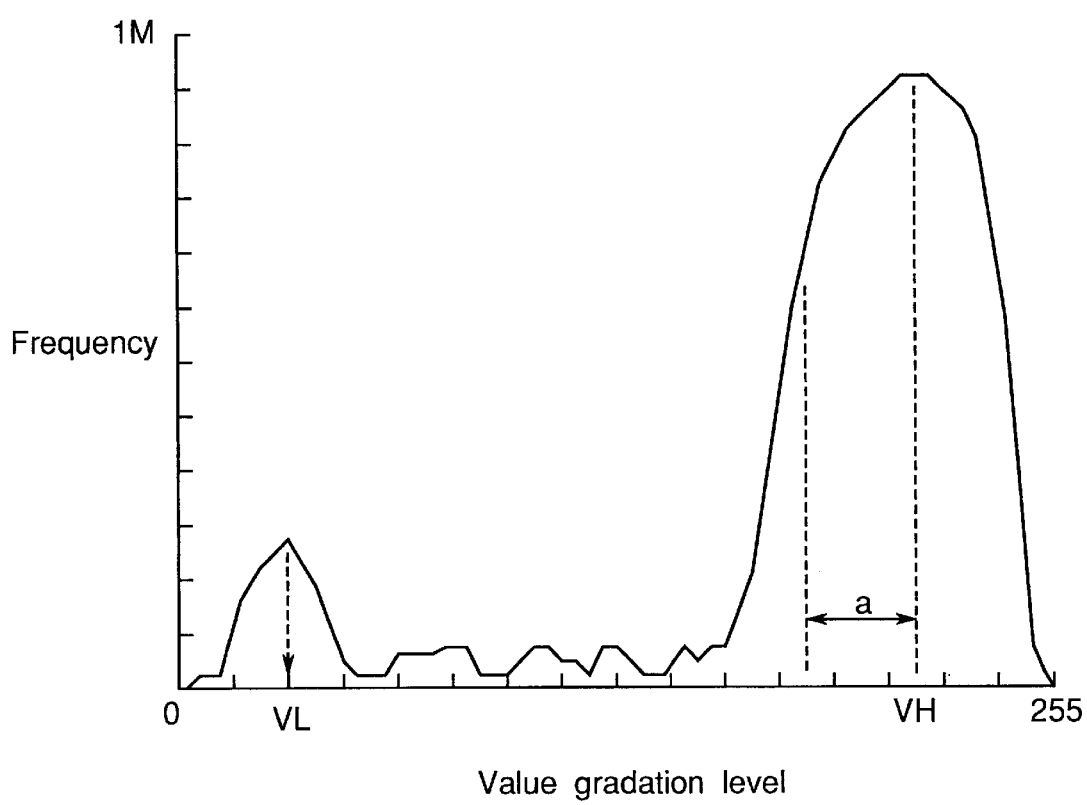
FIG. 16 is a diagram of an example of a histogram.

Next, the AE control is explained. The V signal $V_{77-70}$ is generated similarly by the value generator 4121 in the histogram generator 412. The HVC converter 421 converts the R, G, B signals to V, Cr, Cb signals once and performs the AE processing (value control) on the V data. For example, the value histogram of the document obtained by the histogram generator 412 in the prescan is obtained as shown in FIG. 16, where it is guessed that the document background level is VL and that the maximum density level is VH. Then, a lookup table for the AE processing is set as follows.

Monochrome mode:

$Vout(D_{7-0})=\{256/(VH-VL-a)\}*\{Vin(A_{7-0})-VL\}$.

Color mode:

$Vout(D_{7-0})=\{256/(VH-a)\}*Vin(A_{7-0})$.

When a copy operation is specified in color mode or when the document is decided to be a color document in the automatic color selection, the AE table 4231 sets AE table data so that the gradation around the background level is set to 255 in order to delete the background automatically. When a copy operation is specified in monochrome mode or when the document is decided to be a monochrome document in the automatic color selection, the AE table 4231 sets AE table data so that the maximum density level is zero and the background level is 255 in order to enhance the density of characters and to delete the background density automatically.

As explained above, in the AE operation using the analysis of histogram data, the value component of a document is controlled automatically to have an appropriate background density or an appropriate copy density. Therefore, the hue and chroma characteristics of the document are not affected by the AE processing, and the AE processing can be performed without a sense of incongruity.

When copy density is specified with the operation panel not in the AE mode, the AE processor 423 can perform the value control with manual specification, by downloading predetermined data to the table.

When chroma is adjusted, the content of color difference tables 4232 and 4233 for Cr and Cb are set as follows.

$D_{7-0}=p*A_{7-0}$, wherein pure color is set for p>1, while dark color is set for p<1.

When hue is adjusted, a calculation is performed on the matrix coefficients for the HVC conversion as shown below, and the HVC conversion matrix is set again.

$$\begin{pmatrix} M11 & M12 & M13 \\ M21 & M22 & M23 \\ M31 & M23 & M33 \end{pmatrix} = \begin{pmatrix} 1 & 0 & 0 \\ 0 & -\cos q & -\sin q \\ 0 & \sin q & \cos q \end{pmatrix} * \begin{pmatrix} 0.3 & 0.6 & 0.1 \\ 1 & -0.86 & -0.14 \\ -0.33 & -0.67 & 1 \end{pmatrix},$$

where q denotes hue rotation angle.

Adjustment values for hue and chroma are set according to image adjustment values set with the operation panel. An inverse HVC converter converts inversely the V, Cr and Cb data after the automatic exposure processing and the adjustment for hue and chroma to the original R, G and B data. That is, as shown below, a matrix operation inverse to the above-mentioned HVC conversion is performed to the R, G and B data.

$$\begin{pmatrix} R \\ G \\ B \end{pmatrix} = \begin{pmatrix} N11 & N12 & N13 \\ N21 & N22 & N23 \\ N31 & N23 & N33 \end{pmatrix} * \begin{pmatrix} V \\ Cr \\ Cb \end{pmatrix},$$

where $$\begin{pmatrix} N11 & N12 & N13 \\ N21 & N22 & N23 \\ N31 & N23 & N33 \end{pmatrix} = \begin{pmatrix} 0.3 & 0.6 & 0.1 \\ 1 & -0.86 & -0.14 \\ -0.33 & -0.67 & 1 \end{pmatrix}^{-1}.$$

The R, G and B data (R, G, $B_{87-80}$) after the inverse conversion are sent to a color corrector and to a region discriminator 441.

Figure 17A:
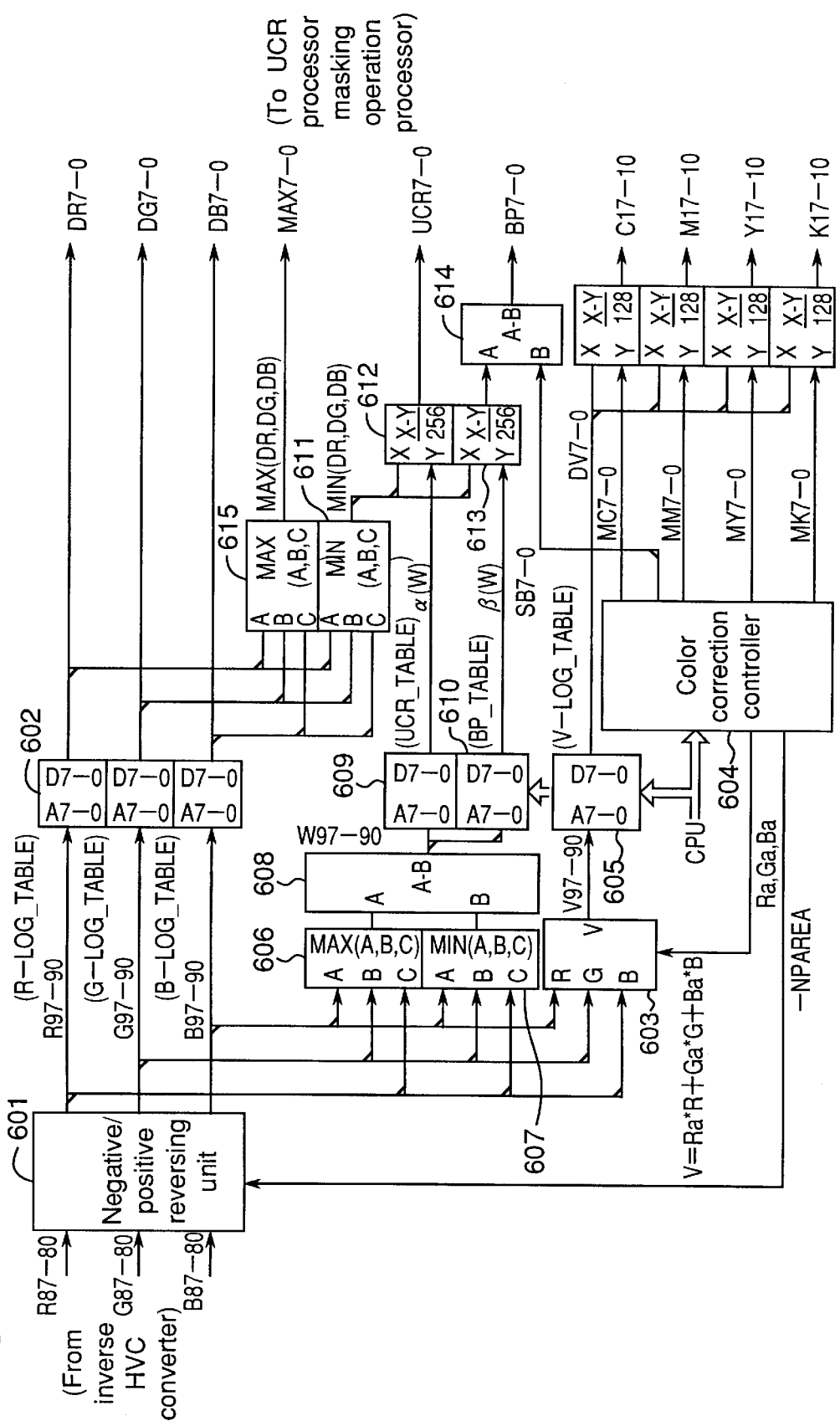
Figure 17B:
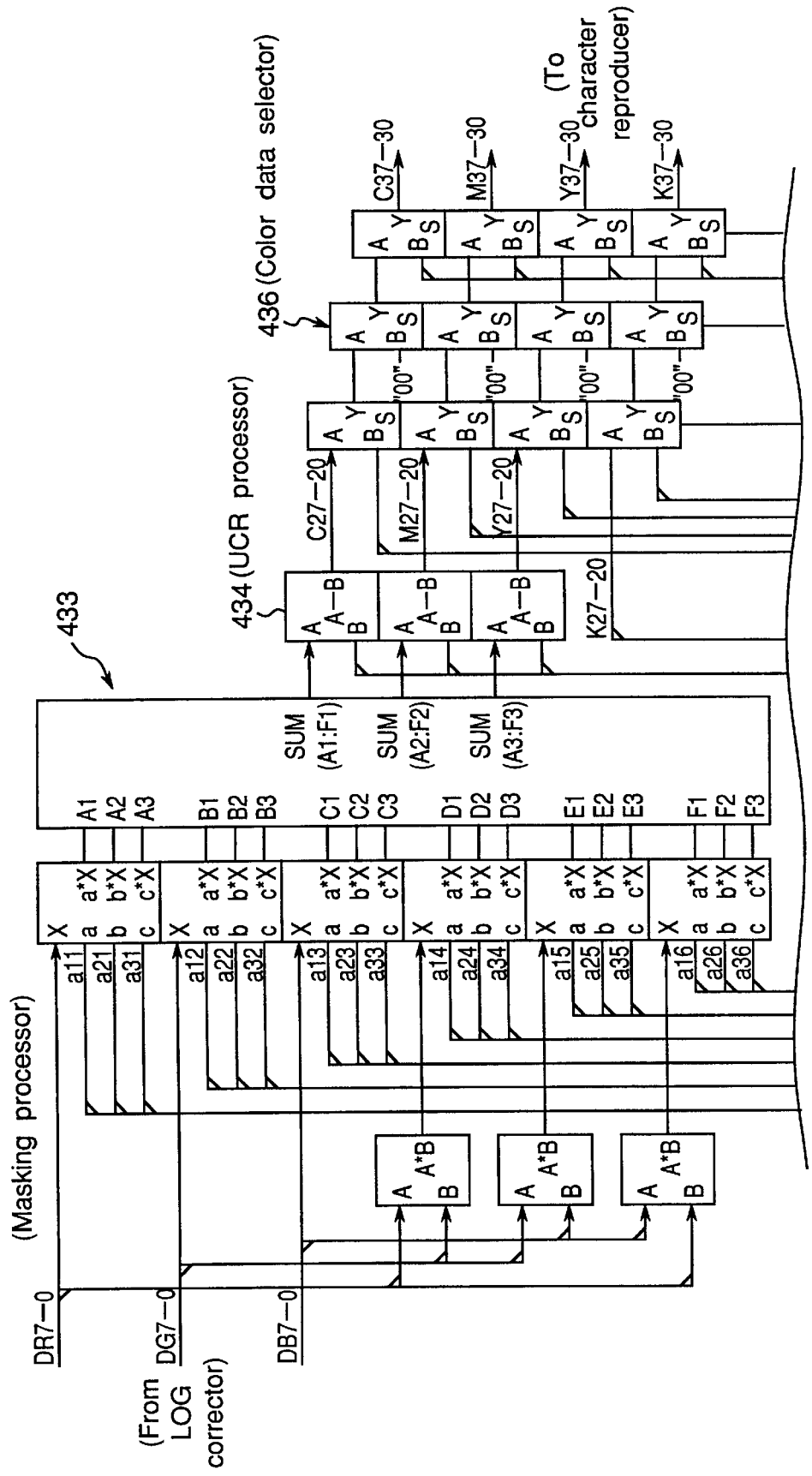

FIGS. 17A to 17C show the color corrector. FIG. 17C shows the signal to be supplied to the portion shown in FIG. 17B. The color correction represents generally image correction performed in the LOG corrector 431, the black quantity extractor 432, the masking operation processor 433, the black print/under color removal processor 434 and the color data selector 436. In a negative/positive reversing unit 601 in the color corrector, the R, G and B input data, R, G and $B_{87-80}$, are controlled in accordance with a status of a negative/positive reversal area signal–NPAREA which a central processing unit sets through a color correction controller, and the output data, R, G and $B_{97-90}$, are controlled in the following manner, whereby the negative/positive reversal is performed.

$$-NPAREA="L" \rightarrow R, G, B_{97-90}=255-R, G, B_{87-80},$$

and $$-NPAREA="H" \rightarrow R, G, B_{97-90}=R, G, B_{87-80}.$$

Next, because the R, G and B data are the signals to be changed linearly with respect to reflectance of a document, the R, G and B data are inputted to an R, G, B-LOG__ TABLEs 602 and transformed to gradation level data DR, DG and $DB_{7-0}$ which respond linearly to the change in the gradation level. The transformation is expressed as the following equation:

$$D_{7-0}=\{-\log(Wh*(A_{7-0}/256))-D_{min}\}*256/(D_{max}-D_{min}),$$

where $D_{max}$ denotes a maximum gradation level range, $D_{min}$ denotes a minimum gradation level range and Wh denotes the reference reflectance of the document in the shading corrector 402.

In order to generate a gradation level signal $V_{97-90}$ for the monochrome reproduction, a value generator 603 calculates the gradation level signal $V_{97-90}$ from the R, G and B data in the accordance with the following equation:

$$V_{97-90}=Ra*R_{97-90}+Ga*G_{97-90}+Ba*B_{97-90},$$

where Ra, Ga and Ba denote parameters of R/G/B mixture ratio to be set by a color correction controller 604. Ra, Ga and Ba are generally set to Ra=0.3, Ga=0.6 and Ba=0.1, thereby providing the value data close to the distribution of spectral luminous efficiency.

$V_{97-90}$ is inputted to a V-LOG__TABLE 605 and transformed to gradation level data $DV_{7-0}$ for the purpose of logarithm correction, as in the case of the R, G and B data. $DV_{7-0}$ is multiplied by data MC, MM, MY and $MK_{7-0}$ on ratios of C, M, Y and K for determining color separation data C, M, Y and $K_{17-10}$ for the monochrome reproduction. For example, red monochrome reproduction can be accomplished by setting $MC_{7-0}=MK_{7-0}=0$ and $MM_{7-0}=MY_{7-0}=128$.

On the other hand, the difference between the maximum and minimum colors of the R, G and B data is calculated by circuits 606 to 608. The difference is inputted as chroma data $W_{97-90}$ to UCR/BP__TABLEs 609 and 610. These tables are used to control the amount of under color removal and the amount of black paint for the UCR/BP processing in accordance with the status of $W_{97-90}$. Here, the under color removal is operated. That is, the minimum color (Min(DR, DG, DB)) is detected from the DR, DG and DB data with logarithm correction by a minimum value circuit 611. The detected data is defined as a basic black paint quantity. A certain ratio (BP quantity) is treated as the K data. Black toner is added to the printer by multipliers 612 and 613 (black paint), and a certain ratio of the basic black quantity (UCR quantity) is subtracted from the C, M and Y data which have been subjected to the masking operation from DR, DG and DB. The outputs of the UCR/BP__TABLEs 609 and 610 control these ratios and are defined by a function of $W_{97-90}$. If the output of the UCR__TABLE is α(W), the output of the BP__TABLE is β(W) and the K data difference $SB_{7-0}$ from the color correction controller is k, the following equations hold.

$$UCR_{7-0}(UCR \text{ quantity})=\text{MIN}(DR, DG, DB)*\alpha(W)/256,$$

and $$BP_{7-0}(BP\text{quantity})=\text{MIN}(DR, DG, DB)*\beta(W)/256-.k$$

The difference is determined by a subtractor 614. When the read R, G and B data are achromatic color (white and black), i.e., when the chroma signal $W_{97-90}$ is low, the printer had better reproduce the color by the use of the K toners alone, because less toner adheres to the paper and thus the print image looks more black and sharp. In such a case, it is therefore desirable that the value α(W)/β(W) is increased whereby the UCR/BP quantities are increased. On the contrary, in the case of chromatic color, the large values α(W) and β(W) yield dull color reproduction. In other words, the high chroma signal $W_{97-90}$ would reduce the value α(W)/β(W). As described above, α(W) and β(W) are used for the optimum control in the UCR__TABLE 609 and the BP__TABLE 610, respectively, in accordance with the chroma signal $W_{97-90}$.

At the same time when the basic black quantity MIN(DR, DG, DB) is calculated, the DR, DG and DB maximum color data MAX(DR, DG, DB) is also calculated by a maximum value circuit 615. This data $MAX_{7-0}$ is transmitted to the following character edge reproducer. The data $MAX_{7-0}$ is used as black character correction data which replaces the K component as the BP quantity in the black character discrimination region. The DR, DG and $DB_{7-0}$ subjected to logarithm correction are transmitted to the masking operation processor 433 in order that they approximate to the spectral distribution of the color toner of the printer and thus improve color reproducibility.

In the masking operation processor 433, a nonlinear masking, which uses the nonlinear terms of DR, DG and DB, i.e., DR*DG, DG*DB and DB*DR, is performed by using masking coefficients inputted from the color correction controller 604 in order to improve approximate accuracy. The DR, DG and DB data are transformed into the C, M and Y data.

$$\begin{pmatrix} C \\ M \\ Y \end{pmatrix} = \begin{pmatrix} a_{11} & a_{12} & a_{13} & a_{14} & a_{15} & a_{16} \\ a_{21} & a_{22} & a_{23} & a_{24} & a_{25} & a_{26} \\ a_{31} & a_{32} & a_{33} & a_{34} & a_{35} & a_{36} \end{pmatrix} * \begin{pmatrix} DR \\ DG \\ DB \\ DR*DG/256 \\ DG*DB/256 \\ DB*DR/256 \end{pmatrix} \quad (1)$$

The masking coefficients are experimentally determined in such a manner that a test color print formed by the image former 300 is read by the image reader 200 and the data difference between the image former 300 and the image reader 200 is minimum.

In the UCR processor 434, the UCR quantity is then subtracted from the C, M and Y data subjected to the masking operation. The resultant data is then outputted together with BP quantity=K data as color separation data C, M, Y and $K_{27-20}$ for the color copy. Thereafter, in the case of a monochrome image area (–MCAREA="L"), the color data selector 436 replaces the C, M, Y and K data by color separation data C, M, Y and $K_{17-10}$ for the monochrome reproduction. In the case of an image erase area (–CLRAREA="L"), the color data selector 436 replaces the C, M, Y and K data by "0". When the input of the sequential C, M, Y and K data transmitted from the image interface 462 is selected (−IFSEL1="L"), the C, M, Y and K data are replaced by $IFD_{7-0}$. Then, color separation data C, M, Y and $K_{37-30}$ are transmitted together with the black character correction data $MAX_{7-0}$, to the character edge reproducer 451.

Figure 18A:
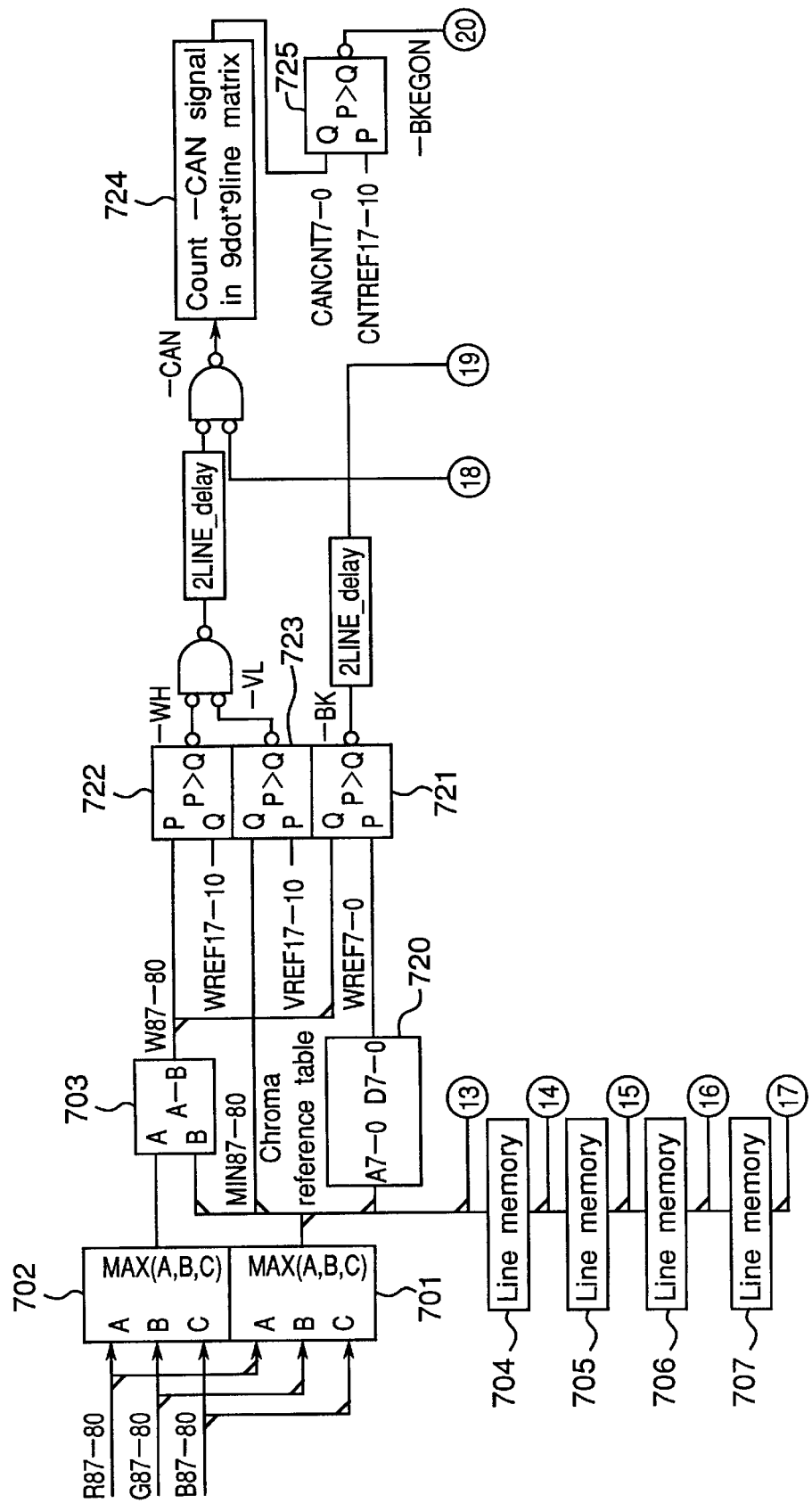
FIGS. 18A and 18B are parts of a block diagram of a region discriminator.
Figure 18B:
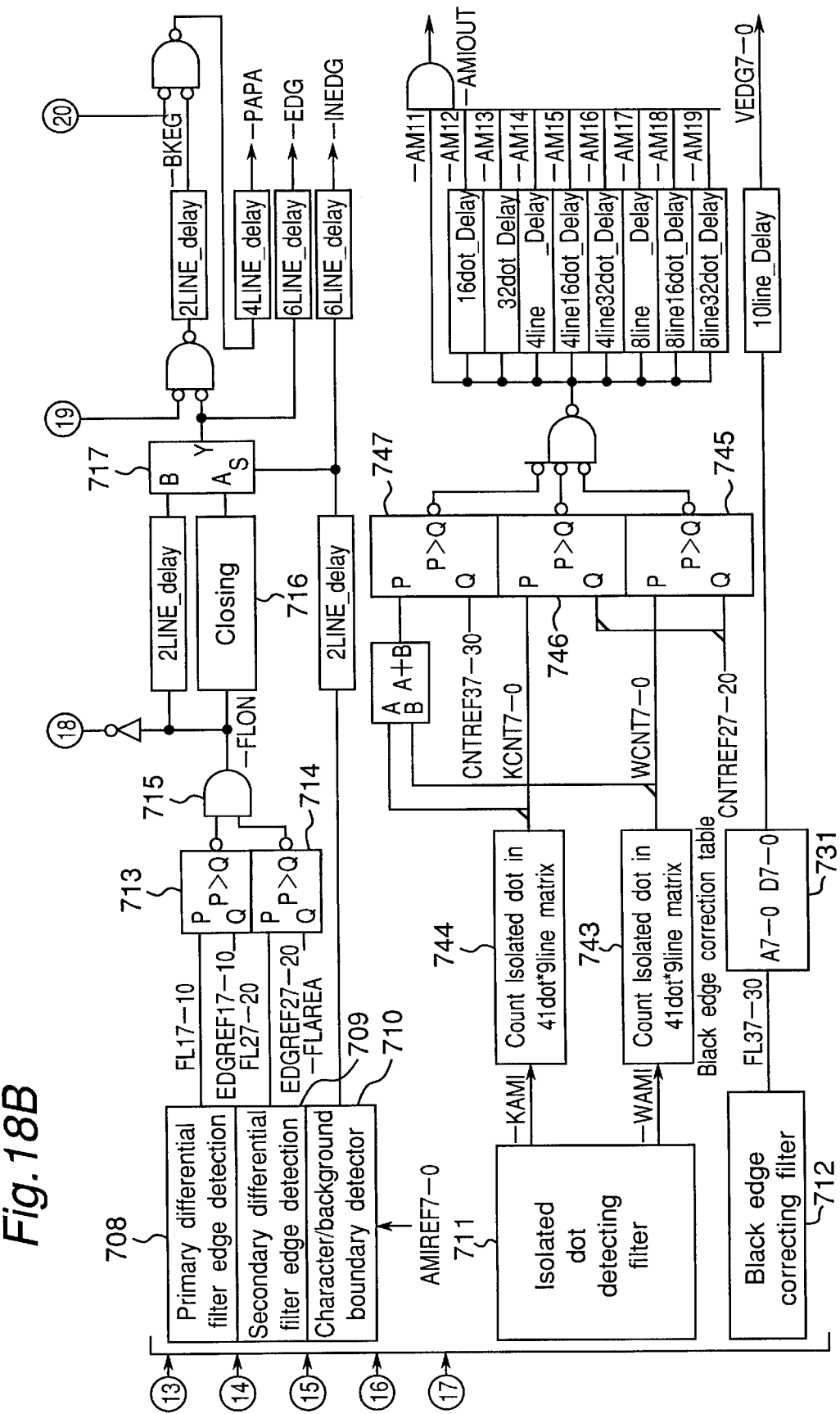

FIGS. 18A and 18B show the region discriminator 441. The R, G and B data, R,. G and $B_{87-80}$, transmitted from the inverse HVC converter 424 are subjected to the region discrimination such as the black character discrimination, the color character discrimination, the dot discrimination and the switching of the gradation level reproduction.

First, extraction of the value and chroma components required for the region discrimination is described. A minimum color $Min_{7-0}$ of input R, G and B signals is used as the value component needed to detect the character edge and to detect isolated dots during the dot discrimination. The minimum value $Min_{7-0}$ is obtained by a minimum value circuit 701. The minimum color $Min_{7-0}$ is used because discrimination is not influenced by the colors in the document. For example, if the document has the black color character, the R, G and B signals have substantially the same low gradation level. However, if the document has the red color character, the R signal is bright and the G and B signals are dark. Accordingly, when the minimum value of the R, G and B signals is used, both the red and black characters depend only on a character density and respond to substantially the same value level. Thus, the character and the dot can be judged in accordance with the colors on various documents. A difference $W_{87-80}$ (i.e., Max(R, G, B)−Min(R, G, B)) between the maximum and minimum colors of the R, G and B data obtained by a maximum value circuit 702 is determined by a subtractor 703. The document chroma (the judgment on whether or not the image is black) needed for the black character discrimination is judged based on the difference $W_{87-80}$.

Next, the black character discrimination in the region discriminator 441 is described. The contents of the black character discrimination are generally classified into the character judgment (edge judgment), the prevention of the erroneous black judgment and erroneous black character discrimination, and the generation of a black edge correction signal.

First, the judgement of character (edge) is described. A value component $Min_{87-80}$ is expanded in a two-dimensional matrix of 5 dots*5 lines by the use of line memories 704 to 707. The value components of five lines are inputted to a primary differential filter 708, a secondary differential filter 709, a character/background boundary discriminator 710, an isolated dot detecting filter 711, and a black edge correcting filter 712.

Figure 19:
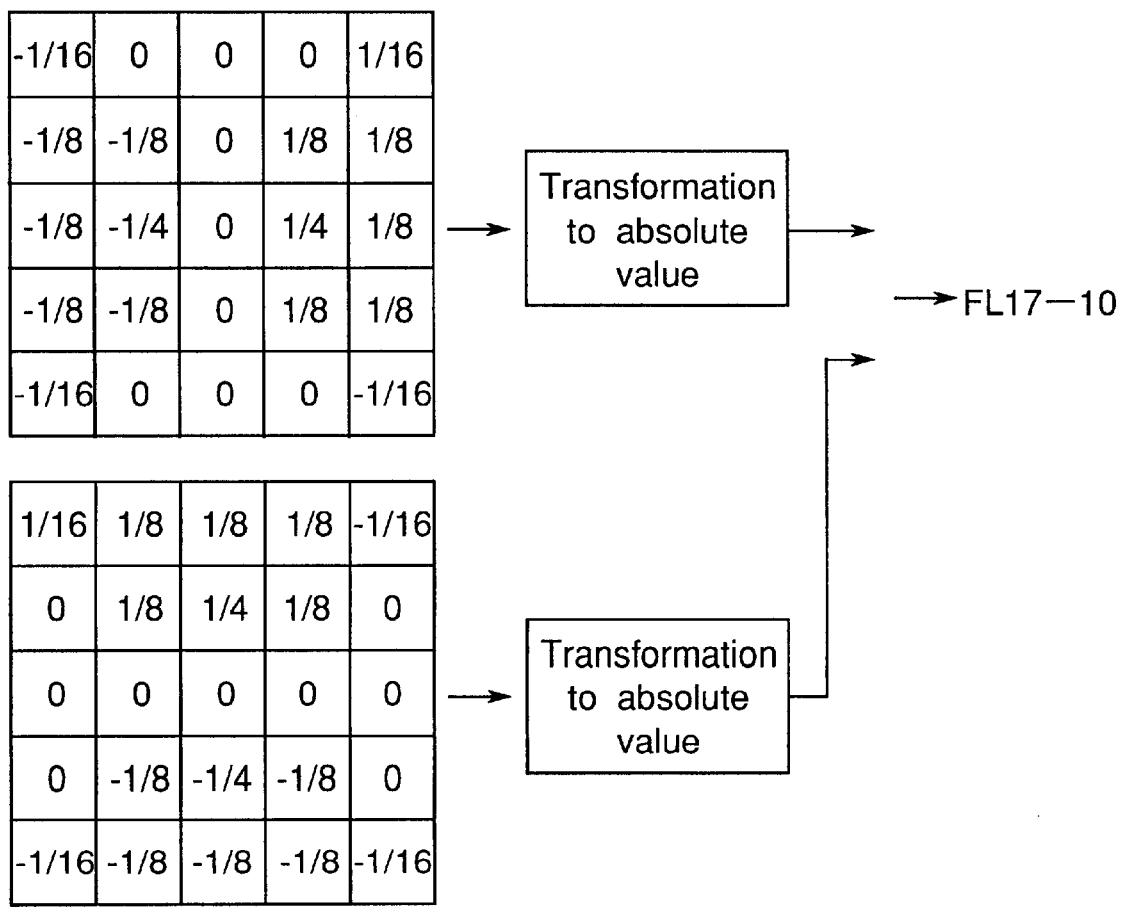
FIG. 19 is a diagram of a primary differential filter.
Figure 20:
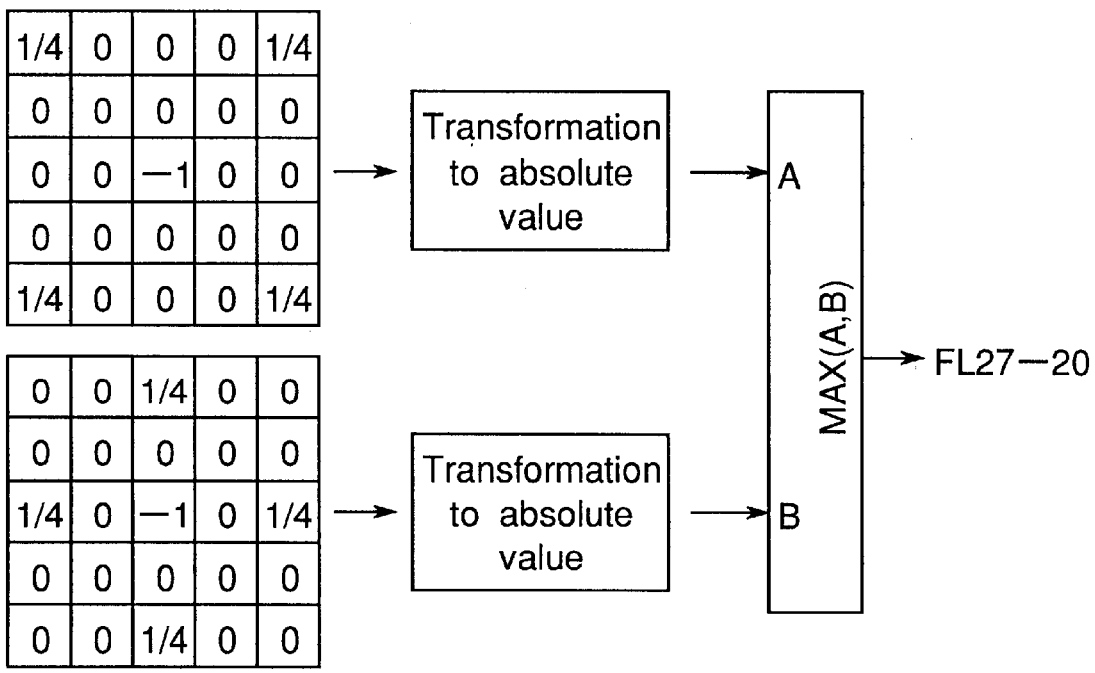
FIG. 20 is a diagram of a secondary differential filter.

In the primary differential filter 708, as shown in FIG. 19, the skew of the pixels adjacent to an objective pixel (central pixel) is detected in the main scan and subscan directions independently of each other. The value is calculated by adding absolute values thereof and is outputted as a primary differential edge quantity $FL_{17-10}$. In the secondary differential filter 709, as shown in FIG. 20, a secondary differential value of the objective pixel is determined independently of one another in the vertical, horizontal and diagonal directions. The maximum value of the absolute values is outputted as a secondary differential edge quantity $FL_{27-20}$. Comparators 713 and 714 compare the edge quantities with edge reference data $EDGREF_{17-10}$ and $EDGREF_{27-20}$. If either edge quantity is larger than a reference level, −FLON= "1" is outputted as the character edge through a buffer circuit 715.

Figure 21:
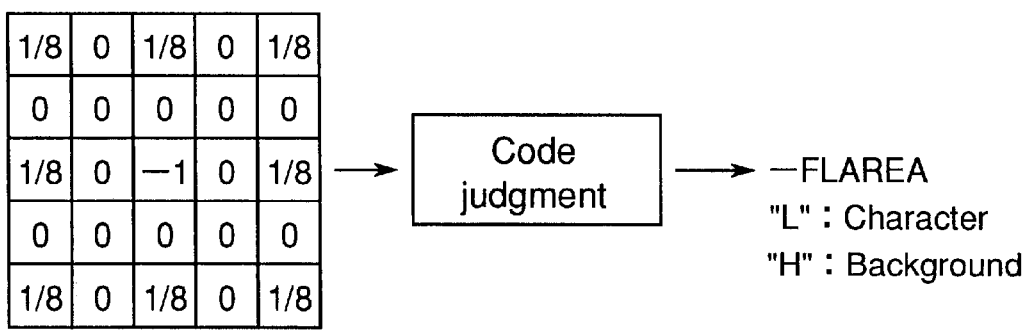
FIG. 21 is a diagram on operation of a character/background boundary identifier.

In the character/background boundary discriminator 710, as shown in FIG. 21, an integral value (average value) of the secondary differential filters in four directions is determined. If the code is "L", the edge is discriminated as the character-side edge (hereinafter referred to as an inside edge). If the code is "H", the edge is discriminated as the background-side edge (hereinafter referred to as an outside edge). Then, −FLAREA is outputted. The signal −FLAREA is delayed by a predetermined line. The signal is outputted to the character edge reproducer as a character/background boundary discrimination signal −INEDGE.

Figure 22:
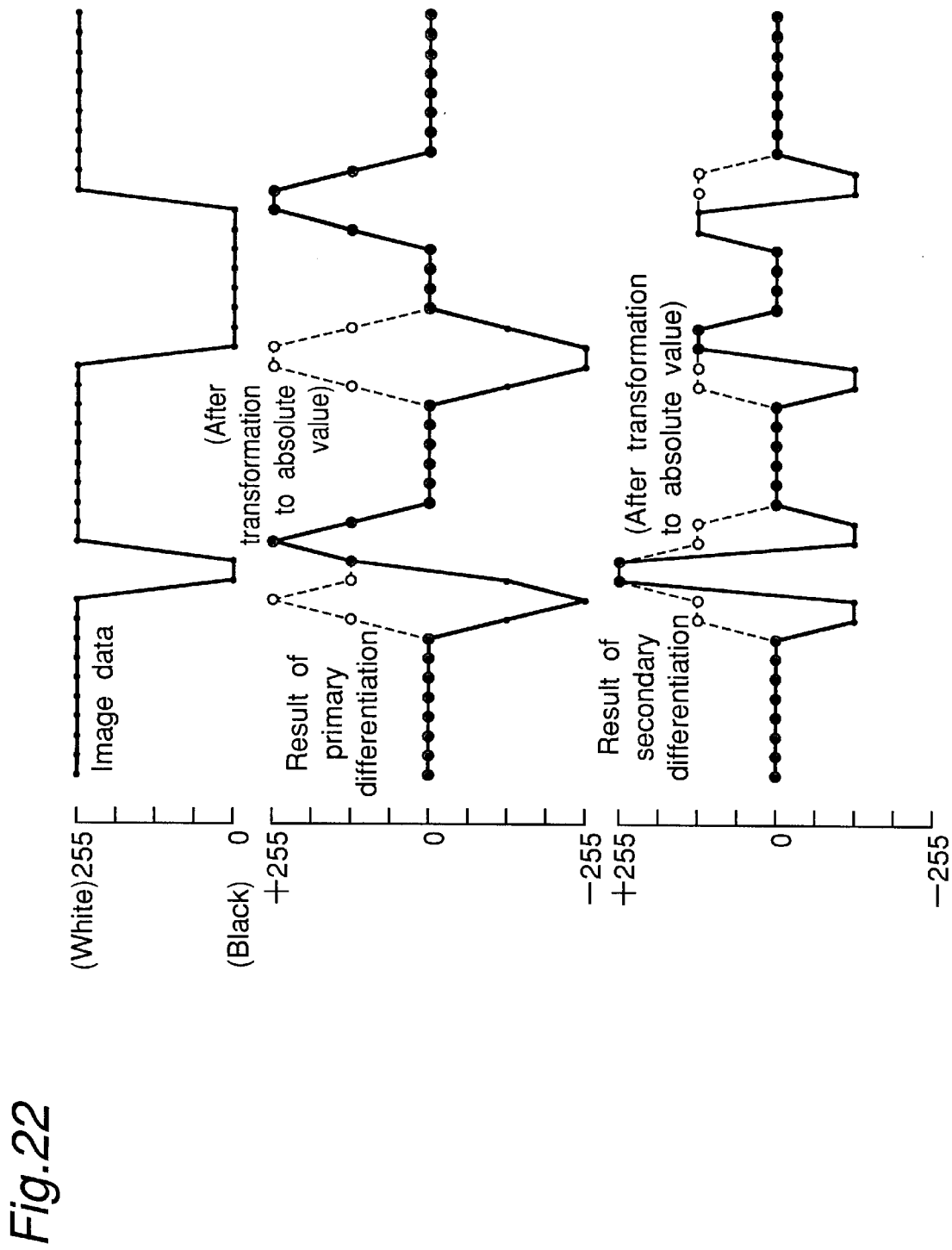
FIG. 22 is a diagram on operation of a combination of two differential filters.

Two differential filters are used for the character edge detection due to the following reason. As shown in FIG. 22, the primary differential filter 708 is used to detect the gradation level difference between the pixels adjacent to the objective pixel. The filter 708 judges a region near the boundary between the line and the background as the edge. The secondary differential filter 709 is used to detect the sum of the objective pixel and the gradation level differences between the pixels adjacent to the objective pixel. The filter 709 detects the reversed code in regions adjacent to the region near the boundary between the line and the background. In the case of a thin line, the filter 709 detects the line itself as the edge. Accordingly, the combination of two types of filters enables the character edge to be judged continuously from a thin line to a thick line. Furthermore, a boundary can be judged in accordance with a change in the code near a boundary between the edge of secondary differential and the background.

Figure 23:
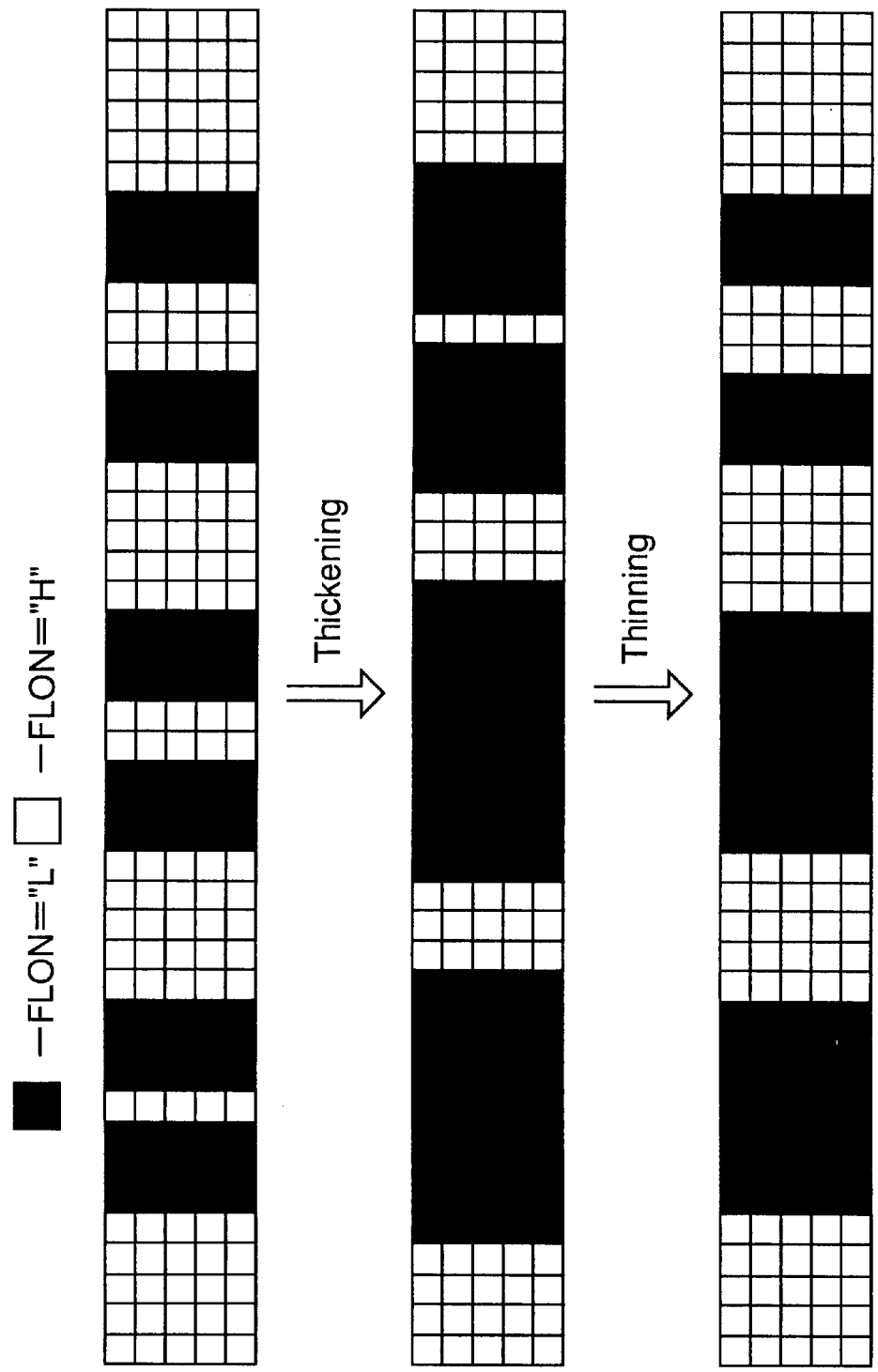
FIG. 23 is a diagram for illustrating operation of a character edge processing.

The signal −FLON, which has once detected an edge, is transmitted to a closing processor 716. In the closing, the result of −FLON="L" (the character-side edge) is first thickened by the use of the matrix of 3 dots*3 lines. If the 3*3 matrix includes even one dot of −FLON="L", this thickening forces the result of −FLON of the central dot to be replaced by "L". In short, the result of −FLON="L" is thickened by one dot for a previous line and for a following line. In three examples shown in the uppermost portion in FIG. 23, there are shown one dot, two dots and three dots of −FLON="H" (the background-side edge) in the main scan direction. In these examples, the region of −FLON="L" is increased by one dot with the thickening. Then, the result of the edge judgment after the thickening is again expanded in the matrix of 3 dots*3 lines, whereby the result is conversely thinned. This thinning forces the result to be replaced by "H", if the 3*3 matrix includes even one dot (−FLON="H") that is not an edge in the character side. In short, contrary to the thickening, the result of −FLON="L" is thinned by one dot in the previous and following lines. The signal can be thus converted to the character edge (−FLON="L"), only when the dot is judged as the dot (−FLON="H") that is not the character-side edge within the distance of two dots or less in the main scan and subscan directions, as shown in FIG. 23.

One of the results is selected by a selector 717 in accordance with the character/background boundary discrimination signal (−FLAREA), where the results include a result after the character edge closing (delay by two lines on the matrix expansion) and a result obtained by simply delaying the result before the character edge closing by two lines. That is, the closed character edge judgment result is used as the final character edge signal in the inside edge (−FLAREA="L"), while the non-closed character judgment result is used as the final character edge signal in the outside edge (−FLAREA="H"). After a predetermined line delay, a −EDG signal is transmitted to the character edge reproducer 451.

Figure 24:
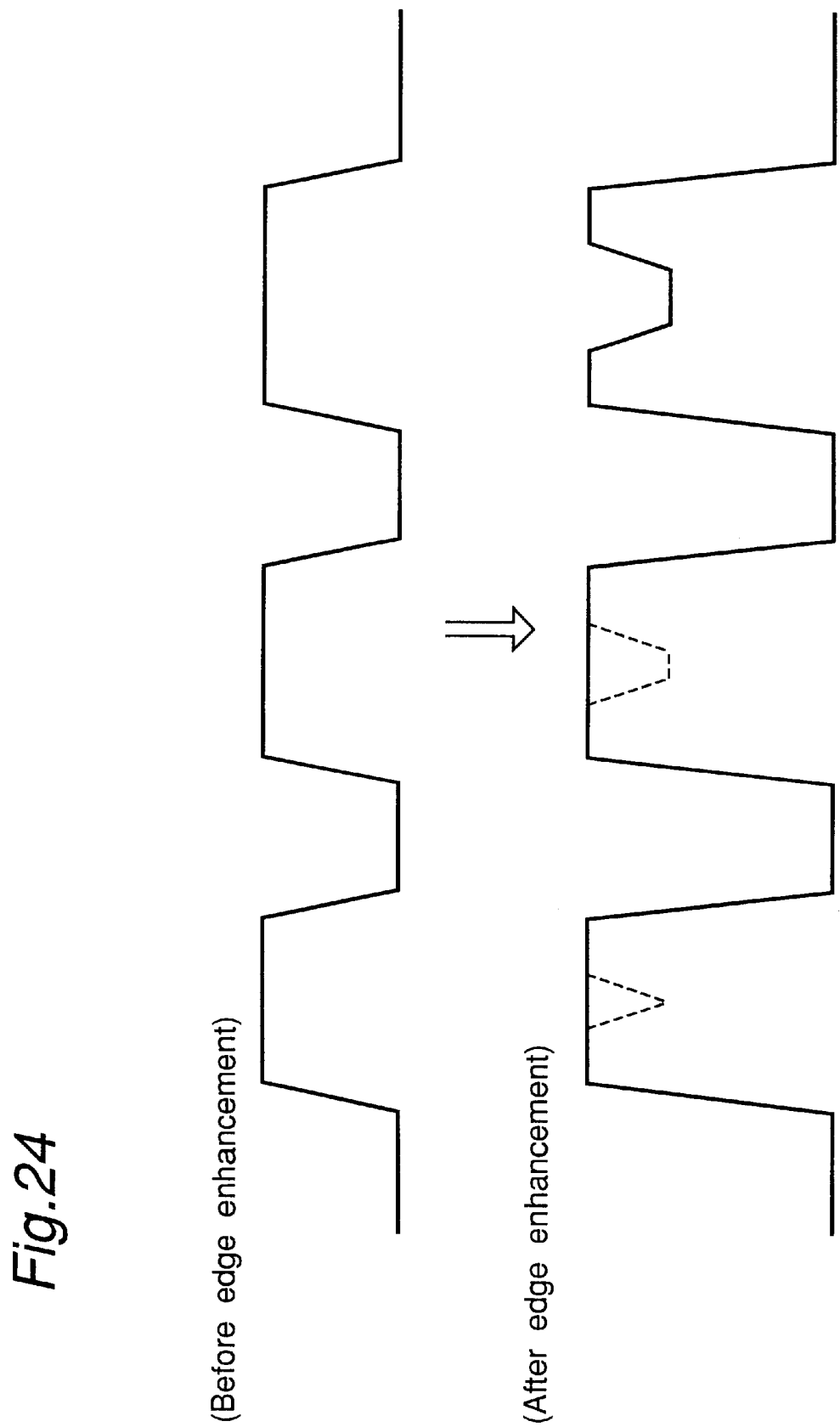
FIG. 24 is a diagram on a concavity made due to an edge emphasis.

This processing is performed for the following purpose. Edge is emphasized on a pixel judged as the character edge by the character edge reproducer 451 as described below. At this time, the edge emphasis allows a character to be bordered, thereby enhancing the contrast. However, when a character has a thickness of about 5 to 7 dots, at the center of the character, there are pixels of one or two dots that are not subjected to edge emphasis. This gives an impression that the reproduced character is hollow (see FIG. 24). The judgment is therefore corrected. That is, only an inside edge is judged as the character edge, so that edge emphasis is performed on the pixels at the character edge surrounded by two or less dots in the main scan and subscan directions. Thereby, the above-mentioned phenomenon is eliminated, and thus the reproducibility of characters is improved. However, if this correction is provided to an outside edge, the image in the region between the lines such as a line pair is vanishes.

Figure 25:
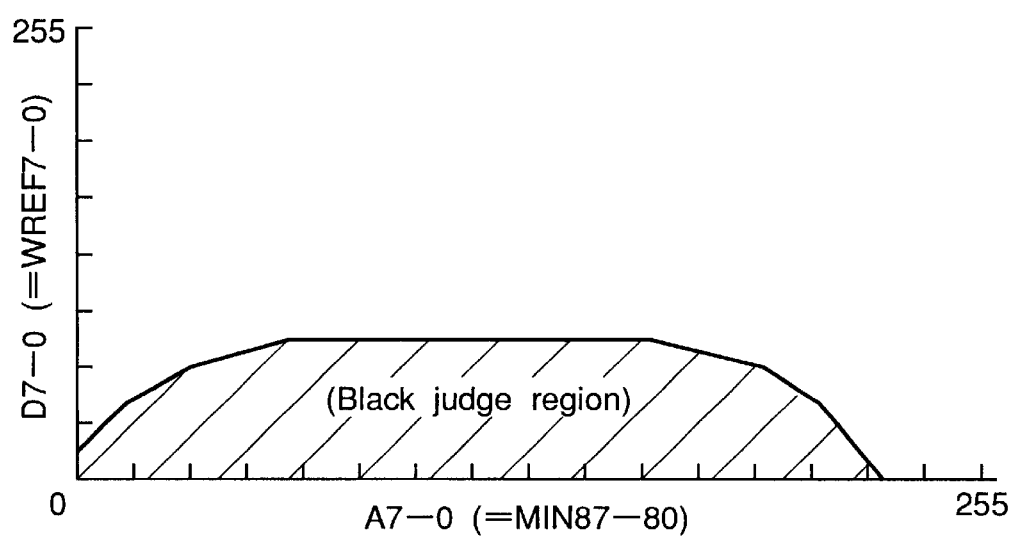
FIG. 25 is a graph of a chroma reference table.

Next, the black judgment in the region discriminator 441 is described. Whether or not the image is black is determined, by comparing the difference $W_{87-80}$ between the maximum and minimum colors of the R, G and B data with chroma reference data $WREF_{7-0}$ which the minimum color data $MIN_{87-80}$ is converted to by a chroma reference table 720. As shown in FIG. 25, the chroma reference table 720 has a low reference at the low and high value levels and has zero above a certain value level. In the comparison of the reference data to $W_{87-80}$ the level at which the image is judged as black can be varied depending on the value level. Thus, the image is not judged as black at all above the certain value level because this level represents the background. Thereby, the table 720 deals with the increase in the chroma difference due to a little phase difference among the R, G and B data in a character edge (at intermediate gradation levels), while it judges the value level collectively. Although this table is set by a central processing unit, its contents can be varied in accordance with a background level adjustment value obtained by the foregoing automatic exposure processing. The comparison between $WREF_{7-0}$ and $W_{87-80}$ is performed by a comparator 721. If the image is black ($WREF_{7-0>W87-80}$),–BK="L" is outputted. After the four-line delay for the delay quantity of the edge detection, if the result of the character edge judgment after the closing is "L", the character edge is once judged as a black character edge, or –BKEG="L".

Next, the prevention of erroneous black character judgment in the region discriminator 441 is described. When the black character discrimination alone is performed, a character edge having low chroma (green, royal purple, etc.) may be misjudged. Therefore, when color dots of uniform density are detected, if the central pixel in the area having a large number of color dots of uniform density is judged as a black character, the result is canceled. First, $W_{87-80}$ is compared by a comparator 722 with chroma reference data $WREF_{17-10}$ set by a central processing unit. If the chroma is high ($W_{87-80}$> $WREF_{17-10}$), WH is set to "L". A comparator 723 compares $MIN_{87-80}$ to value reference data $VREF_{17-10}$ set by the central processing unit. If the value is low ($MIN_{87-80}$< $VREF_{17-10}$), –VL is set to "L". If a pixel has –VL="L" and WH="L" and is judged as a non-edge (–FLON="H") by the edge detection, it is judged as a color solid pixel, –CAN= "L".

The data are expanded in a matrix of 9 dots*9 lines by the circuit 714, and the number of dots of –CAN="L" in the matrix is determined. The value $CANCNT_{7-0}$ is compared, by a comparator 725, to a count reference value $CNTREF_{17-10}$ set by the central processing unit. If the number of color dots of uniform density is more than the count reference value ($CANCNT_{7-0}$>$CNTREF_{17-10}$), –BKEGON is set to "H". The result (–BKEGON="L") of the black character discrimination, which has been once judged, is canceled. On the other hand, if the number of color dots of uniform density is less than the count reference value, the result is allowed and transmitted to the character edge reproducer as the final result (–PAPA="L") of the black character discrimination.

Figure 26:
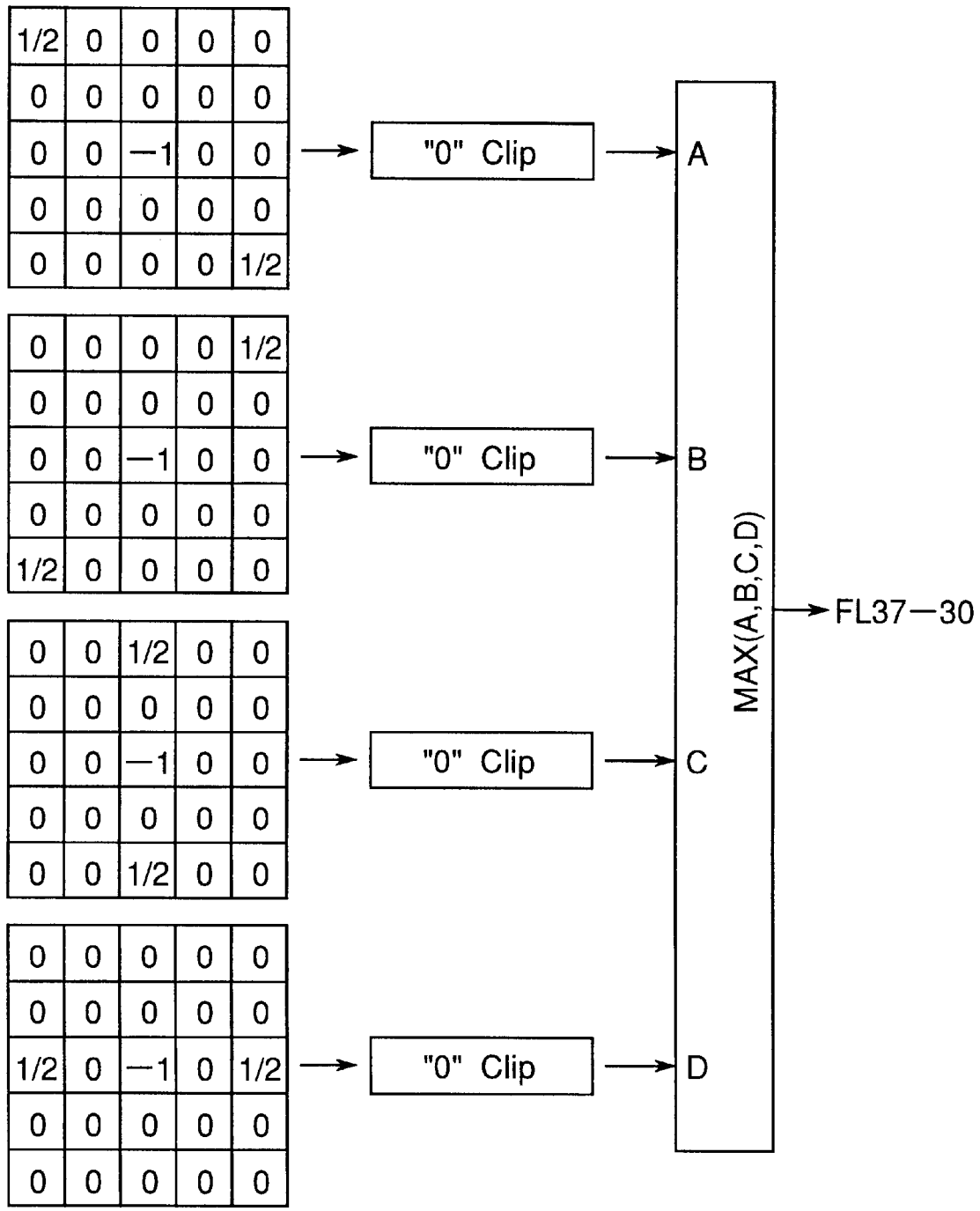
FIG. 26 is a diagram for illustrating black judgment.

Next, the generation of the black edge correction signal in the region discriminator 441 is described. As shown in FIG. 26, the black edge correcting filter 712 inputs the minimum color $MIN_{87-80}$ of the R, G and B data to the secondary differential filters in four directions. The results of the filters obtained independently are clipped to "0" (a negative value is clipped to "0"). The maximum value of each directional result is inputted as black edge correction data $FL_{37-30}$ to a black edge correction table 731 by a maximum value circuit 730. The result of the conversion by the table is taken as $VEDG_{7-0}$. After a predetermined line delay, the result is outputted as the edge correction data for the black character to the character edge reproducer. The data is used as an amount of the edge emphasis of the black character edge. The maximum value of the four secondary differential filters is used as the edge correction data in order to improve a generation characteristic of the black character copy. As exemplified in FIG. 27, when an edge is enhanced by the secondary differential filter of 45°, the lines are thinned at an intersection of the lines crossing at 90°. If the copies are repeatedly reproduced through generations (i.e., a master copy (a first generation) is copied to obtain a new copy (a second generation), the obtained copy (the second generation) is then copied to obtain another new copy (a third generation), and the third generation and the followings are repeatedly reproduced in the same manner), the lines are noticeably thinned at crossing points and thus the character is difficult to be read. When the edge is enhanced by the secondary differential filter of 0°/90°, the intersection of the lines crossing at 90° is lost. This is also not preferable from- the viewpoint of the generation characteristic. The maximum value of the result of the four filters is used as the edge correction quantity, in order to prevent the image deterioration caused due to this phenomenon.

The edge correction signal for the black character is determined from the minimum color of the R, G and B data due to the following reason. Since R, G and B are value information, a edge change quantity of the R, G and B data in a filter is more sensitive to the background level (white background) on which the more intense character edge emphasis is needed, while it is less sensitive to a high gradation level on which the less intense enhancement is needed than that of the C, M, Y and K data subjected to logarithm correction.

The black edge correction table 731 is provided in order to convert the filter data $FL_{37-30}$ so that the amount of edge emphasis may be a proper value in the black character edge emphasis. The contents of the table 731 are set by the central processing unit.

A Laplacian filter used generally in the edge emphasis is an inverse filter of the secondary differential filter. The image data subjected to edge emphasis by the character edge reproducer is the gradation level data of C, M, Y and K. This data is the inverse of the value data $MIN_{87-80}$ (having the opposite white/black gradation levels). Thus, the secondary differential filter can be used.

Figure 28:
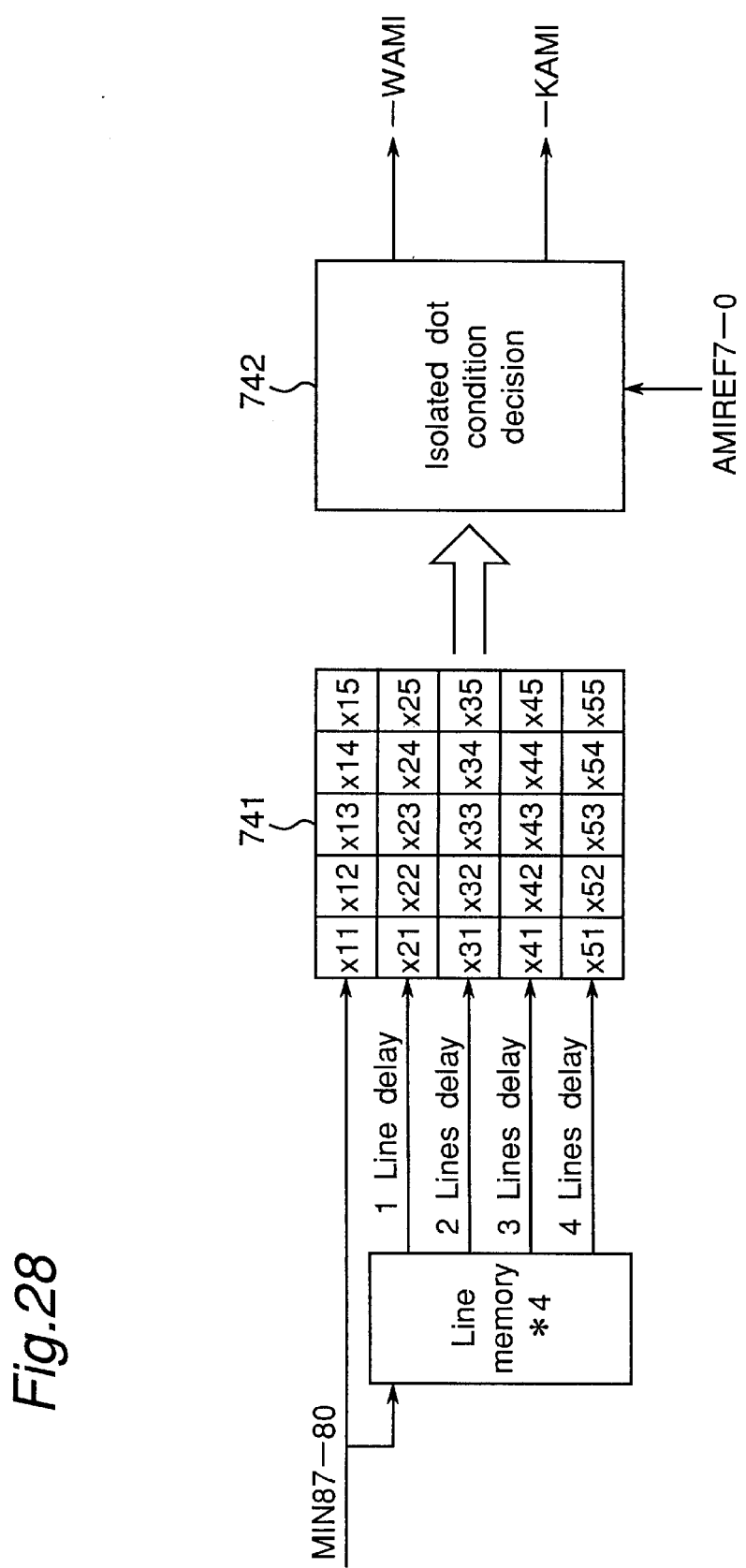
FIG. 28 is a diagram on an isolated dot condition decision for discriminating a dot.

Next, the dot discrimination in the region discriminator 441 is described. The minimum color $MIN_{87-80}$ of the R, G and B data is inputted to the isolated dot detecting filter 711 in the same manner as the edge detection. As shown in FIG. 28, $MIN_{87-80}$ is expanded in a matrix 741 of 5 dots*5 lines. Then, an isolated dot condition decision section 742 judges whether or not each pixel is an isolated dot having the same image distribution as that of the central pixel of the dots in a dot print.

The isolated dot detecting filter 711 judges whether or not the pixel satisfies two types of isolated dot conditions, in order to judge whether the pixel is a valley (white isolated dot) or a peak (black isolated dot) in the dot print.
First Condition: The gradation level of a central pixel $X_{33}$ is higher (white isolated dot condition) or lower (black isolated dot condition) than the gradation levels of eight peripheral pixels around the central pixel $X_{33}$:

$$X_{33} \geq MAX (X_{12}, X_{23}, X_{24}, X_{32}, X_{34}, X_{42}, X_{43}, X_{44}),$$

and $$X_{33} \leq MIN (X_{12}, X_{23}, X_{24}, X_{32}, X_{34}, X_{42}, X_{43}, X_{44}),$$

Second Condition: The gradation level of a central pixel X is higher (white isolated dot condition) or lower (black isolated dot condition) than an average level of the gradation level distributions in eight peripheral directions:

$$X_{33} > MAX(X_{11}+X_{12}, X_{13}+X_{23}, X_{15}+X_{24}, X_{31}+X_{32}, X_{34}+X_{35}, X_{51}+X_{42}, X_{53}+X_{43}, X_{55}+X_{44})/2 + AMIREF_{7-0};$$

and $$X_{33} > MIN(X_{11}+X_{12}, X_{13}+X_{23}, X_{15}X_{24}, X_{31}+X_{32}, X_{34}+X_{35}, X_{51}+X_{42}, X_{53}+X_{43}, X_{55}X_{44})/2 - AMIREF_{7-0},$$

where isolated dot reference data $AMIREF_{7-0}$ for determining the isolated dot conditions is an image parameter set by the central processing unit. The pixel, which satisfies two types of conditions described above, is transmitted to the following step as the white isolated dot (-WAMI="L") or the black isolated dot (-KAMI="L").

Two types of isolated dot information is then expanded into the matrix of 41 dots*9 lines. As in the case where the number of "L" dots of a -CAN signal is counted for the prevention of the black character misjudgment, counters 743 and 744 count the number of "L" dots of -WAMI and -KAMI. The count values are $WCNT_{7-0}$ and $KCNT_{7-0}$ (if the count values are 255 or more, they are clipped to 255). The data $WCNT_{7-0}$ and $KCNT_{7-0}$ as to the number of white and black isolated dots are compared in parallel, by comparators 745 and 746, to reference data $CNTREF_{27-20}$ as to the number of isolated dots. If $WCNT_{7-0}$ or $KCNT_{7-0}$ is larger than $CNTREF_{27-20}$, the image is judged as the dot print image and AMI1="L" is outputted. That is, a condition of the dot image discrimination is that the number of the pixels (-WAMI="L" or -KAMI="L"), which have the same image distribution as that of the dots in the dot image, is equal to or larger than a fixed value $CNTREF_{27-20}$ in a certain unit area (41 dots*9 lines).

A rough value of the reference $CNTREF_{27-20}$ as to the number of isolated dots is described. The image read condition of the system is 400 dpi. Assuming that the dot print conditions are that the screen angle is 45° and that the number of screen lines is W, at least $2*(W/SQRT(2))^2$ dots are thus present in an area of one inch square (400*400 dots). Therefore, $CNTREF_{27-20}$ is expressed as the following equation.

$$CNTREF_{27-20} = (369/160,000)*W^2.$$

If W=100, the reference value is 23. This value is obtained when the isolated dot detecting filter 711 ca detect the dot pixels with accuracy of 100%. Thus, the value which is a little lower than the calculated value is, in fact, a proper value. It is necessary to change the reference value, depending on the magnification power or the like. For the enlargement, the value $CNTREF_{27-20}$ is smaller than $CNTREF_{27-20}$ for a life size reproduction because of a small number of isolated dots per unit area. On the contrary, $CNTREF_{27-20}$ for the reduction is larger than $CNTREF_{27-20}$.

It is difficult for the isolated dot detecting filter 711 to judge a dot pixel as an isolated dot, in the case of a print image having a small number of screen lines of the dots (a great distance between the dots) and a dot-area ratio of about 50%. A particular case is the intermediate-gradation-level dot print having about 65 to 85 screen lines. When the document to be printed has the intermediate gradation level, the isolated dot detecting filter 711 judges that the white and black isolated dots are substantially equally mixed because the dot-area ratio is about 50%. Consequently, the number of white isolated dots is substantially equal to that of black isolated dots. Thus, the value does not reach to the above-mentioned value $CNTREF_{27-20}$. Thus, previously, the pixel has or has not been judged as a dot at about the intermediate gradation levels in the dot print. This may produce image noises. In order to solve this problem, the following processing is additionally performed. First, a sum of the number of white isolated dots $WCNT_{7-0}$ and that of black isolated dots $KCNT_{7-0}$ is determined. Then, the sum is compared to another reference data $CNTREF_{37-30}$ as to the number of isolated dots by a comparator 747, thereby judging whether or not the document is a dot print image.

Figure 29:
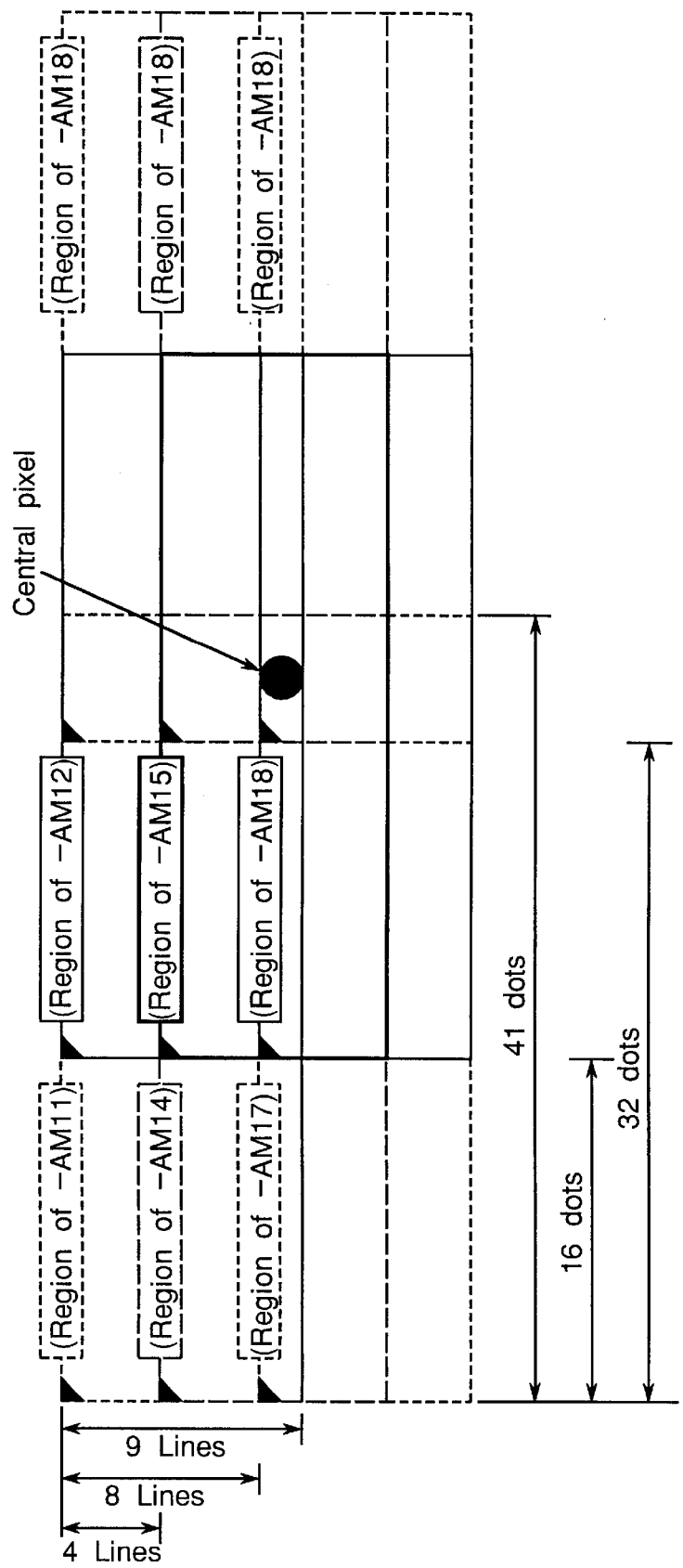
FIG. 29 is a diagram on dot discrimination which is performed when a central pixel is shifted.

After it is once judged whether a pixel is a dot (-AMI= "L") or not (-AMI="H"), -AMI1 signal is inputted to eight types of delay blocks. Under delay control by predetermined lines and dots, if any one of the dot results $-AMI_{1-9}$ is "L", i.e., the dot, the document is judged as a dot print, and -AMIOUT="L" is transferred to the subsequent character edge reproducer. This means, as shown in FIG. 29, that whether or not one of the numbers of isolated dots exceeds a certain level is judged in a region shifted according to the central pixel to be judged by a certain number. Therefore, even if a dot print portion is included in a document, the accuracy of the dot discrimination is not decreased near a boundary of the dot print portion.

The processing in the region discriminator 441 has been described above. In the block diagrams shown in FIGS. 18A and 18B, signals needed for the discriminations are synchronized to one another. Thus, the delay control by predetermined numbers of lines or dots is performed. For example, for the dot discrimination, the discrimination result -AMIOUT is delayed with respect to the input R, G and B data by ten lines in total, two lines by the line memory, four lines by the count of the isolated dots, and four lines for shifting the discrimination region from the central pixel. For the black character discrimination, the discrimination result -PAPA is delayed with respect to the input R, G and B data by ten lines in total: two lines by the line memory, two lines by the closing, two lines for synchronizing the count result of the -CAN signal for preventing the misjudgment, and four lines for synchronizing the dot result.

In this manner, the discrimination results of character edge discrimination signal -EDG, black character discrimination signal -PAPA, character/background boundary discrimination signal -INEDG, dot discrimination signal -AMIOUT and black edge correction signal $VEDG_{7-0}$, are delayed so as to prevent phase shift at the output positions. The results are transmitted to the subsequent character edge reproducer 451.

Figure 30A:
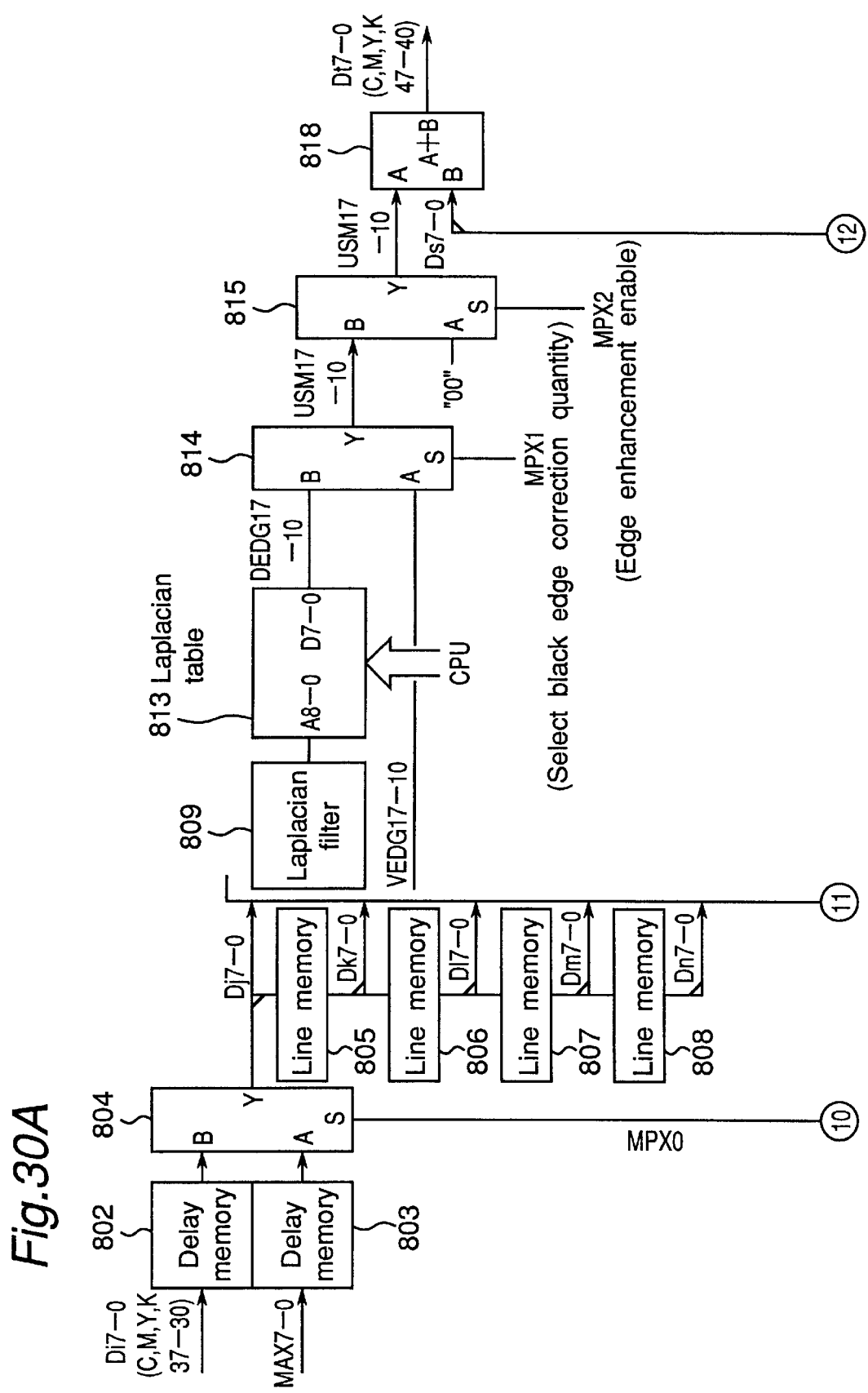
FIGS. 30A and 30B are parts of a block diagram of a character edge reproducer.
Figure 30B:
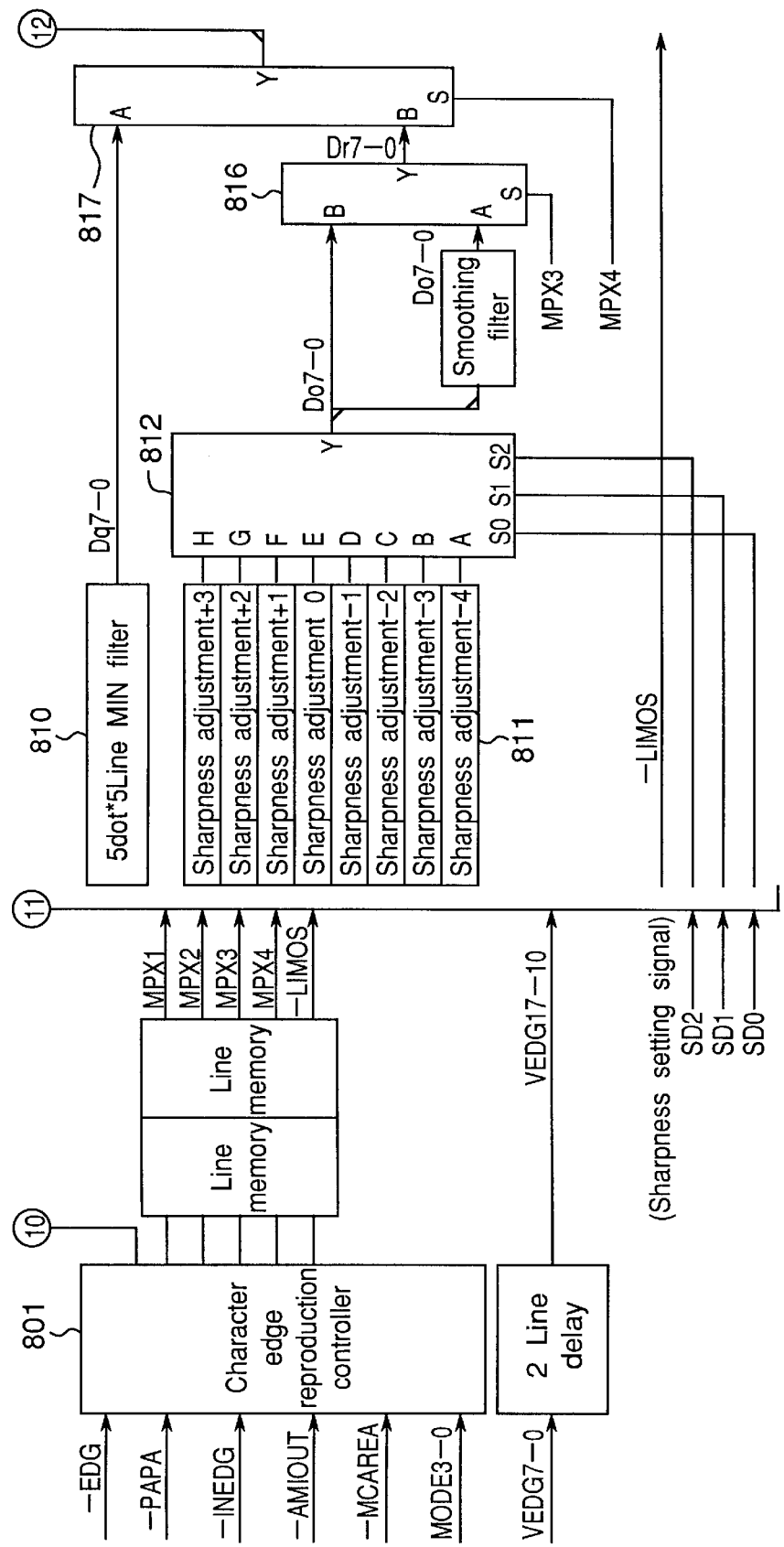

FIGS. 30A and 30B show the character edge reproducer 451. The character edge reproducer 451 performs appropriate image correction on the C, M, Y and K data after color correction in accordance with the result of the discrimination in the region discriminator 441. Although C, M, Y and K are processed in parallel, the C, M and Y signals are processed in the same manner, while the K signal is differently processed. The region discrimination result is inputted to a character edge reproduction controller 801. The result is converted to a select signal for switching the corrections in the character edge reproducer 451. The contents of this conversion are changed in accordance with the status of document mode signal $MODE_{3-0}$ and monochrome image area signal –MCAREA which are inputted together with the region discrimination result. The document mode signal is used in order that a user specifies a document on the platen glass plate by the operation panel. This signal includes not only a character mode, a map mode, a character photograph mode, a photographic paper photograph mode, a print photograph mode, etc. but also a negative film mode and a positive film mode for an optional film projector, a mode (printer function) for inputting the image from an external apparatus, etc. Herein, the general character photograph mode is described.

First, a structure of the character edge reproducer 451 is described. Data $Di_{7-0}$ (C, M, Y and $K_{37-30}$) and maximum color data $MAX_{7-0}$ are inputted to delay memories 802 and 803 in order that they are synchronized to the region discrimination results. The data $Di_{7-0}$ have been obtained by converting/correcting the R, G and B data to the C, M, Y and K data in the color corrector, and the data $MAX_{7-0}$ have been obtained by logarithm correction on the R, G and B data. A selector 804 selects $Di_{7-0}$ or $MAX_{7-0}$ for each color. $MAX_{7-0}$ is the signal selected in stead of the normal K image data in a region which has been subjected to the black character discrimination by the black character correction data. The output $Di_{7-0}$ of the selector 804 is inputted to four line memories 805 to 808, which are dependently connected, in order to expand a matrix of 5 lines*5 dots. The data (Dj, Dk, Dl, Dm and $Dn_{7-0}$) of five lines from the line memories are inputted to a Laplacian filter 809, a Min filter 810 for the 5 dots*5 lines and a sharpness adjuster 811. A predetermined sharpness adjustment image is selected by a selector 812 in accordance with the status of a sharpness setting signal $SD_{2-0}$ depending on the sharpness level set by the operation panel. $Do_{7-0}$ is outputted for each of the C, M, Y and K data.

The Min filter 810 selects the data of the minimum gradation level from the data expanded in the 5*5 two-dimensional matrix, and it outputs $Dq_{7-0}$. This is used for the removal of the outside data of the character edge in order to remove the color components (C, M and Y) and to improve the contrast during the black character discrimination. The Laplacian filter 809 (shown in detail in FIG. 31) is a spatial filter for edge emphasis using a 5*5 matrix. The filter results of the colors are once inputted to a Laplacian table 813 in order to convert the data to optimum data as the edge emphasis quantity. The data is then outputted as $DEDG_{17-10}$. A selector 814 selects the edge emphasis signal $DEDG_{17-10}$ obtained from the Laplacian filter of each color or the black edge correction signal $VEDG_{7-0}$ from the region discriminator. Then, the selector 814 outputs $USM_{17-10}$. The difference between $DEDG_{17-10}$ and $VEDG_{7-0}$ is as follows. The former is the edge correction signal for the color gradation level components (C, M, Y and K), while the latter is the value edge correction signal obtained from the R, G and B data by the secondary differential filter.

Then, selector 815 selects whether or not the edge is emphasized. The selector 815 outputs the final edge correction signal $USM_{27-20}$. On the other hand, the output data $Do_{7-0}$ of the selector 812 is inputted to a selector 816 and a smoothing filter (shown in detail in FIG. 32). The data $Do_{7-0}$ is selected together with the smoothing filter result $Dp_{7-0}$ by the selector 816. Then, $Dr_{7-0}$ is outputted. The result $Dq_{7-0}$ or $Dr_{7-0}$ of the 5*5 Min filter is selected by a selector 817 and then outputted as $Ds_{7-0}$ to an adder for the edge emphasis. Finally, an adder 818 adds the edge correction data $USM_{27-20}$ of each color to $Ds_{7-0}$ which the color image data are directly corrected into. Then, $Dt_{7-0}$ (C, M, Y and $K_{47-40}$) are outputted.

Accordingly, selection signals $MPX_{4-MPX0}$ for controlling the character edge reproducer perform following control.

MPX0 (the selection of black character correction data): If MPX0 is "L", the first selector 804 selects $MAX_{7-0}$ (or the maximum color data after the logarithm correction on R, G and B data). If it is "H", the selector 804 selects $Di_{7-0}$ (C, M, Y and $K_{37-30}$, C, M, Y and K data after the color correction).

MPX1 (the selection of black edge correction quantity): If MPX is "L", the second selector 814 selects the black edge correction data $VEDGI_{7-0}$ from the region discriminator. If it is "H", the selector 814 selects the correction data $DEDG_{7-0}$ for the edge emphasis from the Laplacian filter 809 of the input C, M, Y and K data.

MPX2 (the permission of edge emphasis): If MPX2 is "L", the third selector 815 selects the inhibition of edge emphasis (the edge correction quantity=0). If it is "H", the selector 815 selects the permission of edge emphasis.

MPX3 (the selection of smoothing filter): If MPX3 is "L", the fourth selector 816 selects the smoothing filter result. If it is "H", the selector 816 selects that the result of the sharpness adjustment is allowed to pass through.

MPX4 (the selection of Min filtering): If MPX4 is "L", the fifth selector 817 selects the result of the MIN filter in 5 dots*5 lines. If it is "H", the selector 817 selects that the result of the foregoing fourth selector 816 is allowed to pass through.

As described above, the data inputted to the character edge reproducer is selected in accordance with MPX0. It is selected in accordance with MPX1 and MPX2 whether the correction data for the edge emphasis for the input data is selected or inhibited. The correction of the input data itself is selected in accordance with MPX3 and MPX4. The contents of the processing in the character edge reproducer are therefore determined by the conversion of five types of select signals MPX4 to MPX0 for determining the correction in accordance with the result of the region discrimination in the character reproduction controller.

It is described below how the character edge reproducer 451 actually controls the character edge reproduction.

In color character photograph mode ($MODE_{3-0}$="2" and –MCAREA="H"), a document region is judged from the result of the region discrimination in the following way: In the data, –AMIOUT denotes dot discrimination signal, –PAPA denotes black character discrimination signal, –EDG denotes character edge discrimination signal, –INEDG denotes character/background discrimination signal.

| -AMIOUT | -PAPA | -EDG | -INEDG | Document region |
|---|---|---|---|---|
| "L" | "H" | — | — | Dot region |
| "L" | "L" | — | "L" | Black character in dot image |
| "H" | "L" | — | "L" | Black character |
| "H" | "H" | "L" | "L" | Color character |

-continued

| -AMIOUT | -PAPA | -EDG | -INEDG | Document region |
|---|---|---|---|---|
| "H" | — | "L" | "H" | Outside of character edge |
| "H" level portion | "H" | "H" | — | Continuous gradation |

Then, the K data in the color character photograph mode is controlled by MPX4–MPX0 in the following manner.

| Document region | MPX0 | MPX1 | MPX2 | MPX3 | MPX4 | -LIMOS |
|---|---|---|---|---|---|---|
| Dot region | "H" | "H" | "L" | "L" | "H" | "H" |
| Black character in dot image | "L" | "H" | "H" | "H" | "H" | "H" |
| Black character | "L" | "L" | "H" | "H" | "H" | "L" |
| Outside of character | "H" | "H" | "L" | "H" | "H" | "L" |
| Continuous gradation level portion | "H" | "H" | "L" | "H" | "H" | "H" |

Further, the C, M and Y data in the color character photograph mode are controlled by MPX4–MPX0 in the following manner.

| Document region | MPX0 | MPX1 | MPX2 | MPX3 | MPX4 | -LIMOS |
|---|---|---|---|---|---|---|
| Dot region | "H" | "H" | "L" | "L" | "H" | "H" |
| Black character in dot | "H" | "H" | "L" | "H" | "L" | "H" |
| Black character | "H" | "H" | "L" | "H" | "L" | "L" |
| Outside of character | "H" | "H" | "H" | "H" | "H" | "L" |
| Continuous gradation level portion | "H" | "H" | "L" | "H" | "H" | "H" |

This means following facts.

(1) For a dot region, each input color data is smoothed and the edge emphasis is not permitted.

(2) For a black character in a dot image, an edge component is removed from the C, M and Y components by the 5*5 Min filter. The K component is replaced by MAX(DR, DG, DB).

(3) For a black character, the edge component is removed from the C, M and Y components by the 5*5 Min filter. The K component is subjected to edge emphasis by the value component and replaced by MAX(DR, DG, DB).

(4) For a color character, the C, M and Y components are subjected to edge emphasis by the Laplacian filter of each color. The input data of the K component is allowed to pass through.

(5) For an outside of a character, the edge component is removed by the 5*5 Min filter.

(6) For a continuous gradation level portion, the input data of each color is allowed to pass through.

Next, it will be explained how the character edge reproducer 451 corrects each document region judged in accordance with the result of the region discrimination.

First, processing on a dot region is described. In an area judged as a dot region, moiré pattern is prevented by the smoothing. The causes of moiré pattern are generally classified into three types:

(1) Interaction between a sampling period (resolution) and a dot period when the image is read by the CCD sensor.

(2) Interaction between the frequency characteristic of the spatial filter such as a Laplacian filter for edge emphasis and the dot period.

(3) Interaction between a gradation level reproduction period and the dot period when the gradation levels are reproduced by the printer.

The type (1) is little visually noticeable at the resolution level of about 400 dpi.

The type (2) differs depending on the size and directivity of the filter for edge emphasis. However, it can be solved by inhibiting the edge emphasis in dot areas in a document. Thus, the edge emphasis is inhibited in the dot regions.

The type (3) depends on the pulse width modulation cycle in the print head controller for determining the gradation level reproduction period. In the dot areas, moiré patterns are liable to occur due to the 2-dot pulse width modulation as described below. Thus, as shown in FIG. 32, three-dots in the main scan direction are subjected to integration type smoothing in order to previously attenuate high frequency components of the dot frequency. Thereby, the interference with the gradation level reproduction period is avoided.

Next, processing on a black character region in a dot image is described. At present, it is not perfectly possible to distinguish a type of a document having black characters printed on a light color background with a dot-like pattern from another type of a document having black dots printed thereon, because detection of an isolated dot for detecting dots coexists with character edge detection. Consequently, an intermediate processing is applied to an area in which the black character discrimination and the dot detection coexists. In the area, the smoothing is not performed so that a black character is prevented from being blurred. The edge emphasis is not performed so that moiré patterns are prevented. In order to prevent color blur of a black character, the black component is replaced by the maximum color data obtained from the R, G and B data after logarithm correction, and the edge component of the color components (C, M, Y) is attenuated with a Min filter.

Next, black character discrimination in the character edge reproducer 451 is described. In the black character discrimination, the C, M and Y components are attenuated and removed by the Min filter 810 in order to correct the blurred color in an edge. The components are removed by the Min filter 810, thereby preventing the phenomenon caused by the too much reduction of the components, i.e., preventing partial whitening of the periphery of the character. The K component is replaced by the maximum color in R, G and B after the logarithm correction. The edge is enhanced in accordance with the value edge correction signal obtained from the minimum color of R, G and B. Thus, the data can be corrected into the clear black data which is resistant to copy generation. The clear black characters are thus reproduced on a copy as if they were reproduced by the use of black color alone.

It is explained here why the value edge correction signal obtained from the data MIN(R, G, B) is used as the edge emphasis quantity. As mentioned above on the region discriminator, the value edge is sensitive to the background (white background). On the other hand, it is insensitive to gradation change at high densities and hard to generate image noises. The value edge itself has characteristics to improve contrast and to prevent narrowing a line, compared to the gradation level image data after logarithm correction.

Figure 33:
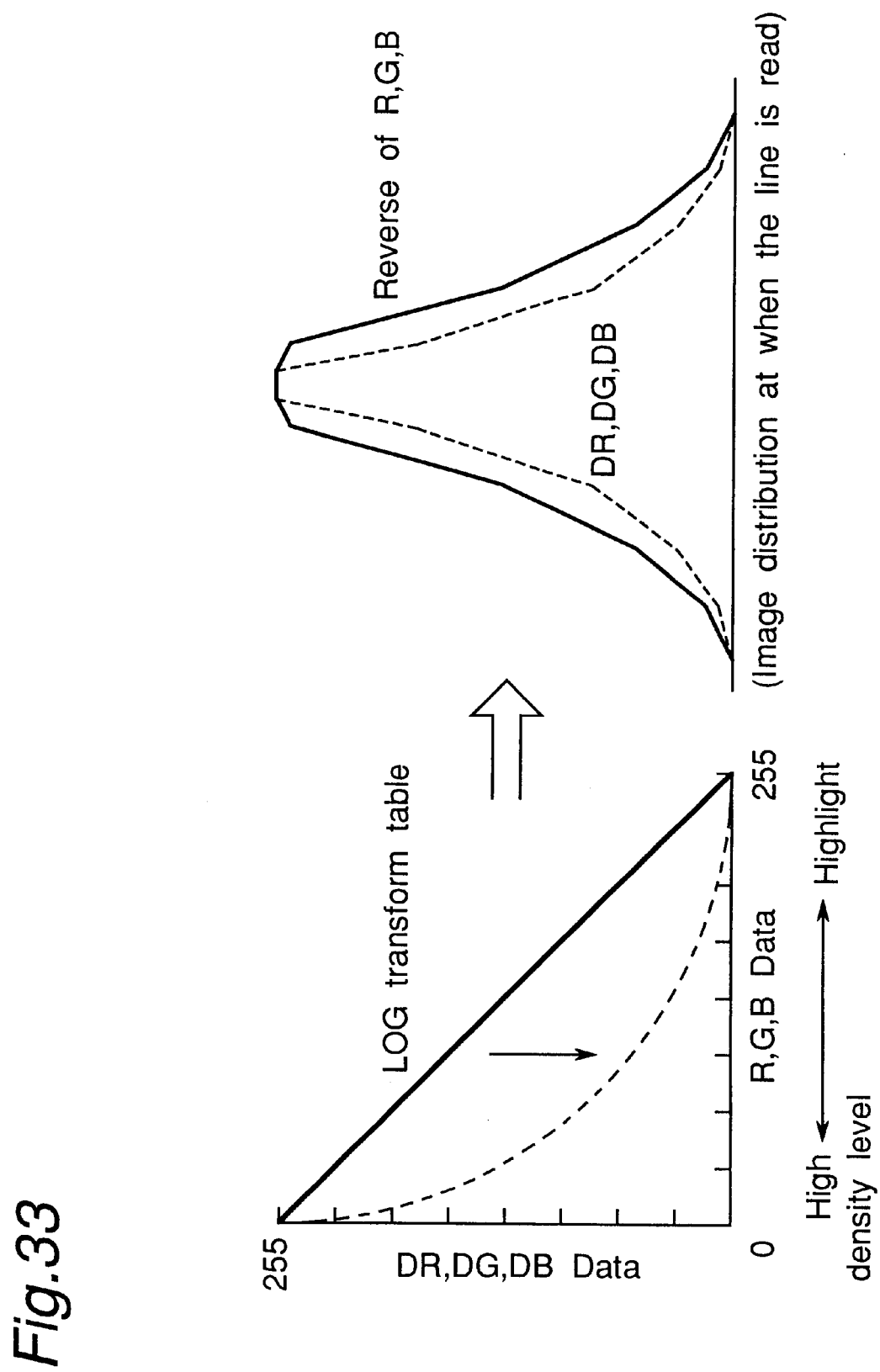
FIG. 33 is a diagram for showing an influence of logarithm correction on the edge.

Both are affected by the logarithm correction, and the influence of the logarithm correction on a line read can easily be seen in FIG. 33. In order to improve the generation of the character image, it seems better that contrast of characters is enhanced relative to the white background and that the edge is enhanced a little over. Therefore, the edge is enhanced by the edge correction of the value component. In this case, because MIN(R, G, B) is used as the value component, the thickened image distribution is obtained when a line is read.

Figure 34:
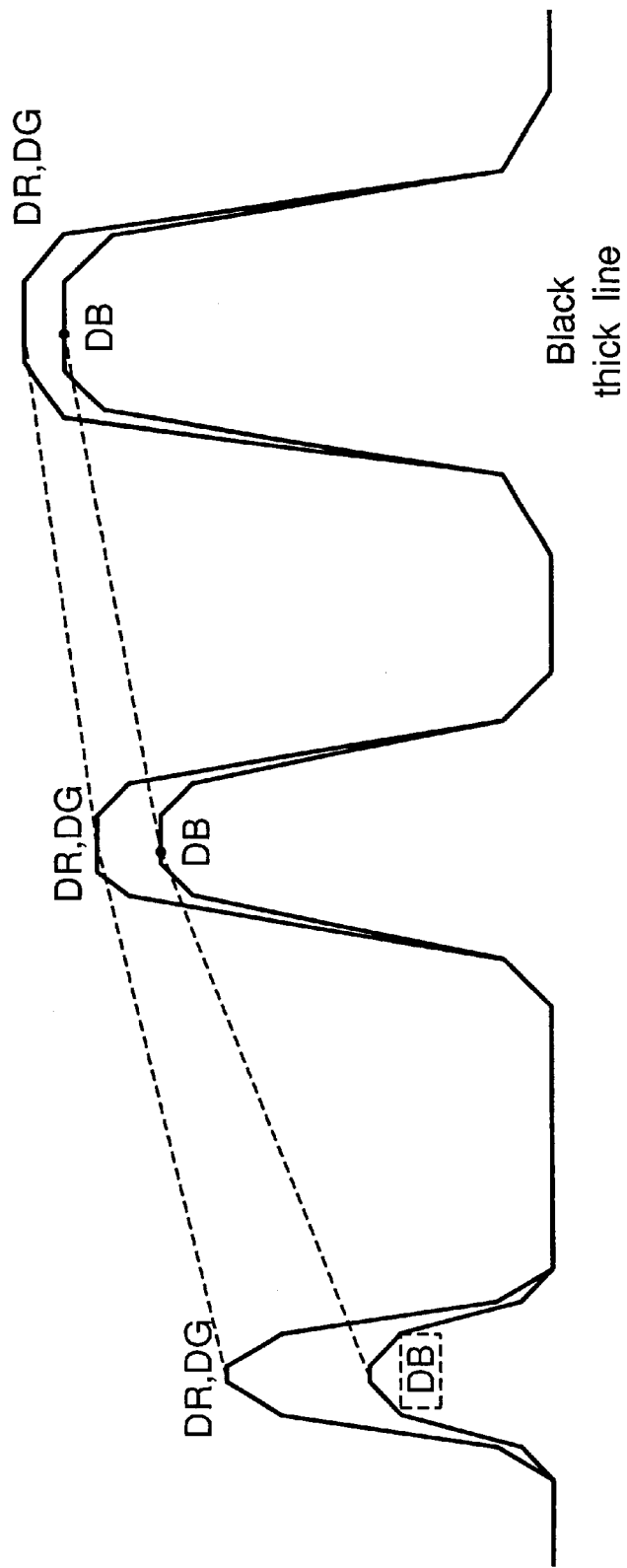
FIG. 34 is a diagram on improvement of reproducibility at an edge of a black thin line.
Figure 35:
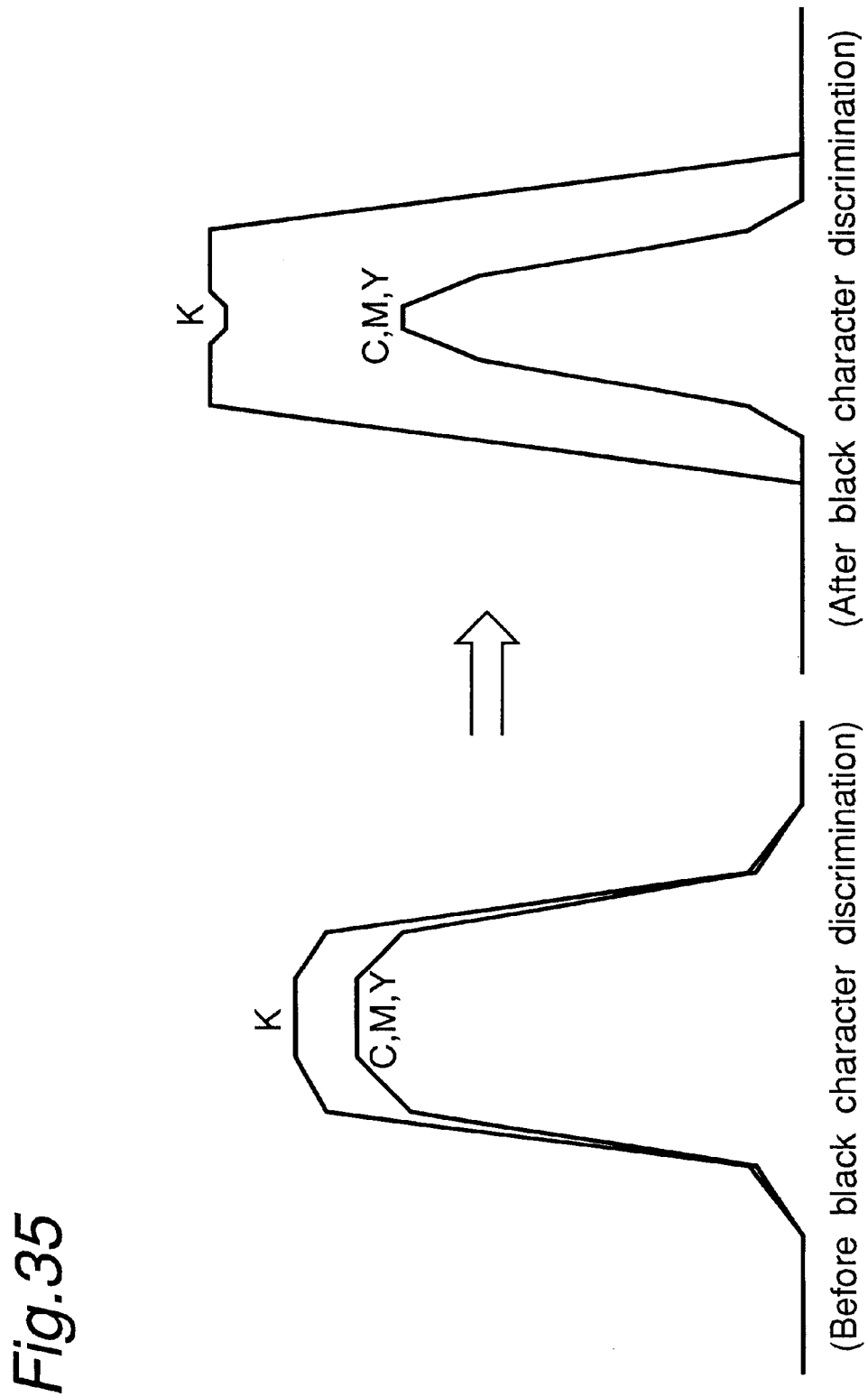
FIG. 35 is a diagram on the correction of the blurred color by black character discrimination.

Next, it is described why the K component is replaced by the data MAX(DR, DG, DB) before the edge emphasis. The gradation level of the K component is determined by the black paint processor in the color corrector. This value is 100% of the black paint quantity BP at maximum, i.e., MIN(DR, DG, DB). Accordingly, the K data after the color correction has the following relationships: MAX(DR, DG, DB)>=MIN(DR, DG, DB)>=K data. Therefore, there is a tendency that MAX(DR, DG, DB) having the higher gradation level is suitable for the character reproduction than the normal K data. More particularly, as shown in FIG. 34, this is more evident for the reproduction of a thin line. The reason is that there are differences in the resolutions among R, G and B due to the characteristic of the lens for forming the image on the CCD sensor. Thus, when a black thin line is read, only data of low contrast is obtained as MIN(DR, DG, DB) due to the resolution difference. Thus, a black thin line is unclearly reproduced and, as a result, it lacks clearness. Since the normal K data has the extremely low gradation level, the improvement of the contrast by the edge emphasis is limited. The K data is therefore replaced by MAX(DR, DG, DB) not affected by this influence, whereby the reproducibility of a black thin line is improved much, thus realizing the black character reproduction that does not depend on the line width. FIG. 35 shows correction of blurred color in the black character discrimination.

Next, it is described how a color character region is processed. A region which is not a dot region, not a black-character region and an in-character edge region are regarded as a color character region, and in the region, the C, M and Y color components are subjected to the edge emphasis. In this case, the edge correction data for the edge emphasis is processed in accordance with the result of a Laplacian filter of each color so as to prevent the color change at the edge due to the edge emphasis. The as-received data of the K component is allowed to pass through.

First, a processing at an outside region of a character edge is described. At the side of the background (outside edge) decided by the discrimination between the character and the background in a character edge, a 5-lines*5-dots Min filter is used in order to achieve an unsharp mask effect (to increase the gradation level change at the edge) for improving the contrast of the character reproduction and the edge emphasis at the inside of the character. Because the minimum gradation level in the peripheral pixels is selected in the periphery of the edge, the gradation level is not extremely reduced in the periphery of the edge due to the substitution in accordance with the result of the Min filter of each color. Therefore, typically, the edge emphasis by the Laplacian filter can prevent the periphery of a character from turning white.

Next, it is described how the continuous gradation level region is processed. A pixel which does not belong to any of the five types of document regions described above is judged as a continuous gradation level portion, wherein without a particular correction, the as-received data of each color is allowed to pass through.

Next, processing of the gradation reproduction attribute signal –LIMOS is described. The gradation reproduction attribute signal is transmitted together with the image data of C, M, Y and K for the purpose of automatically switching the gradation level reproduction to a following print imaging controller and the gradation reproduction cycle in the print head controller. This signal is "L" level in a non-dot region (–AMIOUT="H"), in a character edge region (–EDG="L") and in an inside edge region (–INEDG="L"). The signal gives an instruction to perform the gradation level reproduction which gives priority to the resolution and does not distort the character. The pseudo 256-gradation-level processing called the multi-value error diffusion is typically performed for the gradation level reproduction in the print imaging controller. In the character edge corresponding to –LIMOS="L", the simple quantization is, however, performed thereby preventing the edge from being distorted.

The 2-dot pulse width modulation reproduction whose screen angle is set to 45° is typically performed in the print head controller. However, the 1-dot pulse width modulation reproduction giving priority to the resolution is performed in a region corresponding to –LIMOS="L". The processing is switched for an inside edge in the character edge, whereby the gradation reproduction cycle of the print head controller is switched at a character edge boundary. Thus, a gradation level jump due to difference in the gamma-characteristic becomes harder to be noticeable.

In this manner, the C, M, Y and K data (C, M, Y and $K_{47\text{-}40}$) after the optimum image correction in accordance with the result of the region discrimination in the character edge reproducer are subjected to the image adjustment in a color balance/gamma adjuster 452 in accordance with the setting from the operation panel. Then, they are transmitted together with the –LIMOS signal to the print imaging controller. Thereafter, the data are subjected to the exposure control for forming an image on each color photoconductor by means of the light modulation using the semiconductor laser in the print head controller.

As explained above, color aberration correction is performed on digital color image data before subjecting them to various image data processing such as discrimination of a specified document, automatic color selection or magnification change. Therefore, precision of discrimination is improved. When image is enlarged by the magnification change, color blurring can be prevented.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. An image reader comprising:
    a color image sensor which outputs image signals in correspondence to a plurality of colors;
    an optical system which focuses an image optically onto said color image sensor;
    a color aberration corrector which corrects image signals received from said color image sensor to cancel a displacement of focal point of the optical images of the colors caused by color aberration of said optical system; and
    a magnification changer which changes a magnification power of the image signals corrected by said color aberration corrector.

2. An image reader according to claim 1, wherein said color image sensor outputs image signals in correspondence to colors of red, green and blue.

3. An image reader according to claim 2, wherein said color aberration corrector performs the correction by shifting the image signals of red and blue relative to those of green.

4. An image reader according to claim 1, wherein said color aberration corrector performs the correction in a plurality of ways beforehand and selects the best in results of the correction.

5. An image reader according to claim 1, wherein said color image sensor is a line sensor having imaging elements arranged in a line, and said magnification changer changes the magnification power in a direction of the line.

6. An image reader comprising:

a color image sensor which outputs image signals in correspondence to a plurality of colors;

an optical system which focuses an image optically onto said color image sensor;

a color aberration corrector which corrects image signals received from said color image sensor to cancel a displacement of focal point of the optical images of the colors caused by color aberration of said optical system; and a color decider which decides, based on the image signals corrected by said color aberration corrector, whether the image is a color image or not.

7. An image reader according to claim 6, wherein said color image sensor outputs image signals in correspondence to colors of red, green and blue.

8. An image reader according to claim 7, wherein said color aberration corrector performs the correction by shifting the image signals of red and blue relative to those of green.

9. An image reader according to claim 6, wherein said color aberration corrector performs the correction in a plurality of ways beforehand and selects the best in results of the correction.

10. An image reader according to claim 6, wherein said color decider decides whether the image is a monochrome image or a color image.

11. An image reader comprising:

a color image sensor which outputs image signals in correspondence to a plurality of colors;

an optical system which focuses an image optically onto said color image sensor;

a color aberration corrector which corrects image signals received from said color image sensor to cancel a displacement of focal point of the optical images of the colors caused by color aberration of said optical system; and an image discriminator which decides, based on image signals corrected by said color aberration corrector, whether the image is a specified image or not.

12. An image reader according to claim 11, wherein said color image sensor outputs image signals in correspondence to colors of red, green and blue.

13. An image reader according to claim 12, wherein said color aberration corrector performs the correction by shifting the image signals of red and blue relative to those of green.

14. An image reader according to claim 11, wherein said color aberration corrector performs the correction in a plurality of ways beforehand and selects the best in results of the correction.

15. An image reader according to claim 11, wherein the specified image is an image of a bill.

* * * * *

UNITED STATES PATENT AND TRADEMARK OFFICE
CERTIFICATE OF CORRECTION

PATENT NO. : 6,323,959 B1
DATED : November 27, 2001
INVENTOR(S) : Katsuhisa Toyama et al.

It is certified that error appears in the above-identified patent and that said Letters Patent is hereby corrected as shown below:

Column 1,
Line 3, after "on", delete "an".
Line 24, after "erroneously", insert -- read --.
Line 24, after "as", delete "a".
Line 30, delete "date", and insert -- data --.
Line 43, delete "comprises", and insert -- comprise --.

Column 3,
Line 7, delete "is", and insert -- are --.
Line 11, delete "is", and insert -- are --.
Line 13, delete "is", and insert -- are --.
Line 37, delete "late", and insert -- plate --.
Line 38, delete "ame", and insert -- same --.
Line 49, delete "209", and insert -- 206 --.
Line 51, delete "209", and insert -- 206 --.
Line 59, delete "is", and insert -- are --.

Column 4,
Line 8, after "by", delete "a".
Line 22, delete "312", and insert -- 314 --.
Line 65, after "converter", insert -- 401 --.

Column 5,
Line 2, delete "209", and insert -- 206 --.
Line 8, delete "is", and insert -- are --.
Line 10, delete "is", and insert -- are --.
Line 11, after "403,", delete -- each --.
Line 11, delete "is", and insert -- are --.
Line 32, delete "is", and insert -- are --.
Line 34, delete "is", and insert -- are --.
Line 37, delete "is", and insert -- are --.
Line 38, delete the second instance of "is", and insert -- are --.
Line 62, after "sensor", insert -- 204 --.

Column 6,
Line 21, after "under", insert -- a --.
Line 61, delete "fro", and insert -- for --.

UNITED STATES PATENT AND TRADEMARK OFFICE
CERTIFICATE OF CORRECTION

PATENT NO. : 6,323,959 B1
DATED : November 27, 2001
INVENTOR(S) : Katsuhisa Toyama et al.

It is certified that error appears in the above-identified patent and that said Letters Patent is hereby corrected as shown below:

Column 7,
Line 13, after "show", insert -- a --.
Line 18, after "basically", insert -- a --.
Line 32, after "when", insert -- , --.
Line 32, after "example", insert -- , --.
Line 53, delete "is", and insert -- are --.

Column 8,
Line 14, delete "312", and insert -- 314 --.
Line 22, delete "is", and insert -- are --.
Line 24, delete "is", and insert -- are --.
Line 38, delete "to-LIMOS", and insert -- to –LIMOS --.
Line 45, delete "322", and insert -- 323 --.
Line 46, delete "323", and insert -- 324 --.
Line 50, delete "324", and insert -- 322 --.
Line 50, delete "325", and insert -- 324 --.
Line 61, delete "45-degree", and insert -- 45º --.

Column 9,
Line 10, delete "correction-and", and insert -- correction and --.
Lines 11 and 12, delete "shift happens", and insert -- shifts --.
Line 12, delete "occurs at ends", and insert -- occur at the ends --.
Line 20, delete "R.,", and insert -- R, --.
Line 65, delete "is", and insert -- are --.

Column 10,
Line 27, delete "Gk(n)G(n),", and insert -- Gk(n) = G(n), --.
Line 59, delete "Gn(n) = (n),", and insert -- Gn(n) = G(n), --.
Line 64, delete "Wn(n)=MAX(Rn(n), Gn(n), Bn(n)-MIN(Rn(n), Gn(n), Bn(n))", and insert -- Wn(n)=MAX(Rn(n), Gn(n), Bn(n))-MIN(Rn(n), Gn(n), Bn(n)) --.
Line 66, delete "different", and insert -- difference --.

UNITED STATES PATENT AND TRADEMARK OFFICE
CERTIFICATE OF CORRECTION

PATENT NO. : 6,323,959 B1
DATED : November 27, 2001
INVENTOR(S) : Katsuhisa Toyama et al.

It is certified that error appears in the above-identified patent and that said Letters Patent is hereby corrected as shown below:

Column 11,
Line 25, delete "image", and insert -- images --.
Line 35, delete "signal-HD", and insert -- signal - HD --.
Line 50, delete "4235", and insert -- 4135 --.
Line 51, delete "MAX(R, G, B)and", and insert -- MAX(R, G, B) and --.
Line 58, delete "4039", and insert -- 4139 --.
Line 60, delete "$W_{7-0} \geq WREF_{7-0}$", and insert -- $W_{7-0} \geq WREF_{7-0}$ --.
Line 66, delete "forces", and insert -- forced --.

Column 12,
Line 12, delete "is", and insert -- are --.
Line 23, delete "instructed", and insert -- instruction --.
Line 42, delete "documents extend", and insert -- document extends --.
Line 42, delete "–over", and insert -- over --.

Column 15,
Line 4, delete "signal-NPAREA", and insert -- signal –NPAREA --.
Line 31, delete the first instance of "the".
Line 59, delete "is", and insert -- are --.

Column 16,
Line 18, delete "$BP_{7-0}$ (BP quantity)=MIN (DR, DG, DB)*$\beta$(W)/256-.k", and insert -- $BP_{7-0}$ (BP quantity)=MIN (DR, DG, DB)*$\beta$(W)/256–k --.
Line 11, delete "color", and insert -- colors --.
Line 28, delete "This", and insert -- The --.
Line 28, delete "is", and insert -- are --.
Line 29, delete "is", and insert -- are --.
Line 57, delete "is", and insert -- are --.
Line 60, delete "is", and insert -- are --.

Column 17,
Line 9, delete "R, . G", and insert -- R, G --.
Line 44, delete "judgement", and insert -- judgment --.

Column 19,
Line 18, delete "is".
Line 21, after "determined", delete ",".
Line 22, after "data", insert -- , --.
Line 64, delete "714", and insert -- 724 --.

UNITED STATES PATENT AND TRADEMARK OFFICE
CERTIFICATE OF CORRECTION

PATENT NO. : 6,323,959 B1
DATED : November 27, 2001
INVENTOR(S) : Katsuhisa Toyama et al.

It is certified that error appears in the above-identified patent and that said Letters Patent is hereby corrected as shown below:

Column 20,
Lines 18 and 19, after "731", delete "by a maximum value circuit 730".
Line 22, delete "is", and insert -- are --.
Line 40, delete "from–", and insert -- from --.
Line 47, delete "a", and insert -- an --.
Line 62, delete "is", and insert -- are --.
Line 62, delete "This", and insert -- These --.
Line 63, delete "is", and insert -- are --.

Column 21,
Line 33, delete "is an", and insert -- are --.
Line 33, delete "parameter", and insert -- parameters --.
Line 38, delete "is", and insert -- are --.
Line 67, delete "ca", and insert -- can --.

Column 23,
Line 23, delete "in stead", and insert -- instead --.
Line 56, delete "is", and insert -- are --.

Column 24,
Line 13, after "perform", insert -- the --.
Line 39, delete "is", and insert -- are --.
Line 39, delete "It is", and insert -- The data are --.
Line 41, delete "is", and insert -- are --.

Column 25,
Lines 7 and 8 (continuation of the Table), delete:
" "H" "H" "H" — Continuous gradation
level portion" and insert
-- "H" "H" "H" — Continuous gradation
　　　　　level portion --.
Line 10, delete "is", and insert -- are --.
Line 37, (line 7 of the Table), after "dot", insert -- image --.
Line 45, after "means", insert -- the --.
Line 46, delete "each", and insert -- the --.
Line 46, delete "is", and insert -- are --.
Line 58, delete "is", and insert -- are --.
Line 62, delete "is", and insert -- are --.

UNITED STATES PATENT AND TRADEMARK OFFICE
CERTIFICATE OF CORRECTION

PATENT NO. : 6,323,959 B1
DATED : November 27, 2001
INVENTOR(S) : Katsuhisa Toyama et al.

It is certified that error appears in the above-identified patent and that said Letters Patent is hereby corrected as shown below:

Column 26,
Line 49, after "by", delete "the".
Line 56, delete "is", and insert -- are --.

Column 27,
Line 25, delete the second instance of "is", and insert -- are --.
Line 30, delete the second instance of "is", and insert -- are --.
Line 66, delete "is", and insert -- are --.

Column 28,
Line 4, after "When", insert -- an --.

Signed and Sealed this

Second Day of July, 2002

Attest:

Attesting Officer

JAMES E. ROGAN
Director of the United States Patent and Trademark Office